United States Patent [19]

Hefner, Jr. et al.

[11] Patent Number: 5,342,904
[45] Date of Patent: Aug. 30, 1994

[54] POLYMER MODIFIED ADDUCTS OF EPOXY RESINS AND ACTIVE HYDROGEN CONTAINING COMPOUNDS CONTAINING MESOGENIC MOIETIES

[75] Inventors: Robert E. Hefner, Jr.; Jimmy D. Earls, both of Lake Jackson, Tex.

[73] Assignee: The Dow Chemical Company, Midland, Mich.

[21] Appl. No.: 44,429

[22] Filed: Apr. 7, 1993

Related U.S. Application Data

[62] Division of Ser. No. 562,787, Aug. 3, 1990, Pat. No. 5,235,008.

[51] Int. Cl.$^5$ ............... C08F 283/10; C08L 61/00; C08L 63/00; C08L 79/00; C08L 81/00
[52] U.S. Cl. ............... 525/488; 525/489; 525/502; 525/524; 525/525; 525/526; 525/527; 525/528; 525/530; 525/532; 525/533; 528/96; 528/97; 528/98; 528/101; 528/102; 528/103; 528/104; 528/106; 528/107; 528/109; 528/114; 528/115; 528/116; 528/117; 528/118; 528/120; 528/121; 528/122; 528/123
[58] Field of Search ............... 525/530, 922, 532, 533, 525/524–528, 488, 489, 502; 528/99, 100, 112, 113, 119, 96–98, 101–104, 106–107, 109, 114–118, 120–124

[56] References Cited

U.S. PATENT DOCUMENTS

| | | | |
|---|---|---|---|
| 3,256,226 | 6/1966 | Fekete | 525/7 |
| 3,586,527 | 8/1969 | Aronoff | 525/922 |
| 4,950,722 | 8/1990 | Parker | 525/526 |
| 4,962,163 | 10/1990 | Hefner | 525/463 |

*Primary Examiner*—John C. Bleutge
*Assistant Examiner*—Donald R. Wilson

[57] ABSTRACT

Polymer modified adducts are prepared by (A) reacting (1) an epoxy resin having an average of more than one vicinal epoxide group with (2) a compound containing an average of two or more hydrogen atoms reactive with an epoxide group; and (B) partially vinylizing reacting the product from step (A); and (C) polymerizing the partially vinylized product from step (B) with (3) a polymerizable ethylenically unsaturated monomer; with the proviso that at least one of the components (1), (2) or (3) contain one or more mesogenic or rodlike moieties. These adducts are useful as epoxy resin curing agents.

22 Claims, No Drawings

POLYMER MODIFIED ADDUCTS OF EPOXY RESINS AND ACTIVE HYDROGEN CONTAINING COMPOUNDS CONTAINING MESOGENIC MOIETIES

CROSS-REFERENCE TO RELATED APPLICATION

This is a divisional of application Ser. No. 07/562,787 filed Aug. 3, 1990 now U.S. Pat. No. 5,235,008.

FIELD OF THE INVENTION

The present invention concerns polymer modified adducts of epoxy resins which adducts contain one or more mesogenic or rodlike moieties, as well as thermosettable compositions containing one or more of said adducts and products resulting from curing the curable compositions.

BACKGROUND OF THE INVENTION

Adducts of epoxy resins, such as, for example, the diethylenetriamine adduct with the diglycidyl ether of bisphenol A, are known, for example, from page 7–16 of the *Handbook of Epoxy Resins*, by Henry Lee and Kris Neville, published by McGraw-Hill, Inc. (1967). These adducts find use as lower volatility, higher viscosity and modified reactivity curing agents for epoxy resins, relative to the free (unadducted) polyamine, per se. Daniel A. Scola in *Developments in Reinforced Plastics*-4 published by Elsevier Applied Science Publishers Ltd., England, pages 196–206 (1984) describes amine adducts of epoxy resins wherein the epoxy resin was selected from the diglycidyl ether of bisphenol A, tetraglycidyl 4,4'-diaminodiphenylmethane, triglycidyl p-aminophenol, epoxy phenol or cresol novalacs, hydrogenated diglycidyl ether of bisphenol A and combinations thereof and the amine was selected from the aliphatic, cycloaliphatic, aromatic and alkylaromatic diamines. Polymercaptan adducts of epoxy resins are also described, wherein the epoxy resin was selected from the diglycidyl ether of bisphenol A, an epoxy novalac blend, or a blend of the diglycidyl ether of bisphenol A with p-tertiarybutylphenolglycidyl ether and the polymercaptan was selected from 2,2'-dimercaptodiethyl ether, 1,2-dimercaptopropane, 1,3-dimercaptopropanol-2 and bis(2-mercaptoethylsulphide). Certain of the adducts provided cured epoxy resins with improvements in one or more physical and mechanical properties, such as, for example, tensile strength, tensile elongation, flexural strength, impact strength, moisture resistance and chemical resistance, relative to the free (unadducted) polyamine or polymercaptan, per se. J. Klee, et al. in *Crosslinked Epoxies* published by Walter de Gruyter and Co., Berlin, pages 47–54 (1987) describes the synthesis and analytical characterization of adducts of the diglycidyl ether of bisphenol A with primary monoamines including aniline, p-chloroaniline, benzylamine and cyclohexylamine. None of the aforementioned adducts or the epoxy resins cured with said adducts contain mesogenic or rodlike moieties.

It is always desirable to have available epoxy resins which have improved mechanical, chemical or thermal properties or have available an alternate choice of resins which provide adequate properties for the desired use.

SUMMARY OF THE INVENTION

The present invention pertains to polymer modified adducts containing one or more mesogenic or rodlike moieties which are prepared by
(A) reacting
  (1) one or more epoxy resins with
  (2) one or more compounds containing two or more hydrogen atoms which are reactive with an epoxide group selected from the group consisting of
    (a) di- and polyphenols,
    (b) di- and polycarboxylic acids,
    (c) di- and polymercaptans,
    (d) di- and polyamines,
    (e) primary monoamines,
    (f) sulfonamides,
    (g) aminophenols,
    (h) aminocarboxylic acids,
    (i) phenolic hydroxyl containing carboxylic acids,
    (j) sulfanilamides,
    (k) any combination of any two or more of the aforementioned compounds (a), (b), (c), (d), (e), (f), (g), (h), (i), or (j) and the like;
    thereby forming an adduct essentially free of epoxy groups and containing active hydrogen atoms reactive with an epoxy group;
(B) partially vinylizing the resulting adduct from step (A); and
(C) copolymerizing the partially vinylized adduct from step (B) with (3) one or more ethylenieally unsaturated monomers and
wherein one or more of components (1), (2), or (3) contain one or more mesogenic or rodlike moieties.

Another aspect of the present invention pertains to thermosettable (curable) mixtures of one or more of the aforesaid polymer modified adducts containing one or more mesogenic or rodlike moieties with one or more epoxy resins having an average of more than one vicinal epoxide group per molecule.

Another aspect of the present invention pertains to the product or article resulting from thermosetting (curing) one or more of the aforesaid thermosettable (curable) mixtures.

A further aspect of the present invention pertains to products resulting from orienting any of the aforesaid thermosettable (curable) mixtures.

The present invention provides polymer modified adducts of epoxy resins which adducts contain one or more mesogenic or rodlike moieties. These adducts provide cured epoxy resins with improvements in one or more physical, chemical, or mechanical properties, including, for example, tensile and flexural modulus, glass transition temperature, tensile strength and elongation, flexural strength and chemical resistance, relative to epoxy resins cured with adducts free of mesogenic or rodlike moieties. Incorporation of one or more mesogenic or rodlike structures into the curable epoxy resin formulation via the use of the polymer modified adducts containing one or more mesogenic or rodlike moieties of the present invention can provide a susceptibility for molecular level orientation leading to an ordering of the thermoset thereof. Furthermore, the creation of a specific polymeric domain containing mesogenic or rodlike moieties in the adduct can serve to efficiently disperse polymeric material containing mesogenic or rodlike moieties into said adduct or into thermosettable mixtures thereof with one or more epoxy resins.

The term "mesogenic" as is used herein designates compounds containing one or more rigid rodlike structural units which have been found to favor the formation of liquid crystal phases in the case of low molar mass substances. Thus the mesogen or mesogenic moiety is that structure responsible for molecular ordering.

DETAILED DESCRIPTION OF THE INVENTION

A wide variety of polymer modified adducts are prepared using the method disclosed herein.

Preferred as the polymer modified adduct are those prepared by
(A) reacting
  (1) one or more epoxy resins containing one or more mesogenic or rodlike moieties, with
  (2) one or more compounds free of mesogenic or rodlike moieties containing two or more hydrogen atoms which are reactive with an epoxide group;
  thereby forming an adduct essentially free of epoxy groups and containing active hydrogen atoms reactive with an epoxy group;
(B) partially vinylizing the adduct prepared in step (A); and
(C) copolymerizing the partially vinylized adduct from step (B) with (3) one or more polymerizable ethylenically unsaturated monomers.

Also preferred as the polymer modified adduct are those prepared by
(A) reacting
  (1) one or more epoxy resins containing one or more mesogenic or rodlike moieties, with
  (2) one or more compounds containing one or more mesogenic or rodlike moieties and two or more hydrogen atoms which are reactive with an epoxide group;
  thereby forming an adduct essentially free of epoxy groups and containing active hydrogen atoms reactive with an epoxy group;
(B) partially vinylizing the adduct prepared in step (A); and
(C) copolymerizing the partially vinylized adduct prepared in step (B) with (3) one or more polymerizable ethylenically unsaturated monomers.

Also preferred as the polymer modified adduct are those prepared by
(A) reacting
  (1) one or more epoxy resins free of mesogenic or rodlike moieties, with
  (2) one or more compounds containing one or more mesogenic or rodlike moieties and two or more hydrogen atoms which are reactive with an epoxide group;
  thereby forming an adduct essentially free of epoxy groups and containing active hydrogen atoms reactive with an epoxy group;
(B) partially vinylizing the adduct prepared in step (A); and
(C) copolymerizing the partially vinylized adduct prepared in step (B) with (3) one or more polymerizable ethylenically unsaturated monomers.

Also preferred as the polymer modified adduct are those prepared by
(A) reacting
  (1) one or more epoxy resins containing one or more mesogenic or rodlike moieties, with
  (2) one or more compounds free of mesogenic or rodlike moieties containing two or more hydrogen atoms which are reactive with an epoxide group;
  thereby forming an adduct essentially free of epoxy groups and containing active hydrogen atoms reactive with an epoxy group;
(B) partially vinylizing the resulting adduct prepared in step (A); and
(C) copolymerizing the partially vinylized adduct prepared in step (B) with (3) one or more polymerizable ethylenically unsaturated monomers, a part or all of which monomer(s) contain one or more mesogenic or rodlike moieties.

Also preferred as the polymer modified adduct are those prepared by
(A) reacting
  (1) one or more epoxy resins containing one or more mesogenic or rodlike moieties, with
  (2) one or more compounds containing one or more mesogenic or rodlike moieties and two or more hydrogen atoms which are reactive with an epoxide group;
  thereby forming an adduct essentially free of epoxy groups and containing active hydrogen atoms reactive with an epoxy group;
(B) partially vinylizing the adduct prepared in step (A); and
(C) copolymerizing the partially vinylized adduct prepared in step (B) with (3) one or more polymerizable ethylenically unsaturated monomers, a part or all of which monomer(s) contain one or more mesogenic or rodlike moieties.

Also preferred as the polymer modified adduct are those prepared by
(A) reacting
  (1) one or more epoxy resins free of mesogenic or rodlike moieties, with
  (2) one or more compounds containing one or more mesogenic or rodlike moieties and two or more hydrogen atoms which are reactive with an epoxide group;
  thereby forming an adduct essentially free of epoxy groups and containing active hydrogen atoms reactive with an epoxy group;
(B) partially vinylizing the adduct prepared in step (A); and
(C) copolymerizing the partially vinylized adduct prepared in step (B) with (3) one or more polymerizable ethylenically unsaturated monomers, a part or all of which monomer(s) contain one or more mesogenic or rodlike moieties.

Also preferred as the polymer modified adduct are those prepared by
(A) reacting
  (1) one or more epoxy resins free of mesogenic or rodlike moieties, with
  (2) one or more compounds free of mesogenic or rodlike moieties containing two or more hydrogen atoms which are reactive with an epoxide group;
  thereby forming an adduct essentially free of epoxy groups and containing active hydrogen atoms reactive with an epoxy group;

(B) partially vinylizing the adduct prepared step (A), then (C) copolymerizing the partially vinylized adduct prepared in step (B) with (3) one or more polymerizable ethylenically unsaturated monomers, a part or all of which monomer(s) contain one or more mesogenic or rodlike moieties.

EPOXY RESIN COMPONENT

Suitable epoxy resins which can be employed herein include essentially any epoxy-containing compound which contains an average of more than one vicinal epoxide group per molecule. The epoxide-containing groups, usually a glycidyl group, can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, aromatic or cycloaliphatic hydrocarbon group which hydrocarbon group can be substituted with any inert substituent including, but not limited to, halogen atoms, preferably chlorine or bromine, nitro groups and the like or such groups can be attached to the terminal carbon atoms of a compound containing an average of more than one —(O—CHR$^a$—CHR$^a$—)$_t$ group where each R$^a$ is independently hydrogen or an alkyl or haloalkyl group, containing from 1 to about 2 carbon atoms, with the proviso that only one R$^a$ group can be a haloalkyl group, and t has a value from 1 to about 100, preferably from 1 to about 20, more preferably from 1 to about 10, most preferably from 1 to about 5.

It should be understood that in those instances wherein it is required that the epoxy resin or epoxy-containing compound contain a mesogenic moiety that those epoxy resins or epoxy-containing compounds which do not contain a mesogenic moiety are not suitable for that particular purpose.

Particularly suitable epoxy resins which can be employed herein include those compounds having an average of more than one vicinal epoxide group per molecule, such as, for example, the glycidyl ethers or glycidyl amines represented by the following formulas

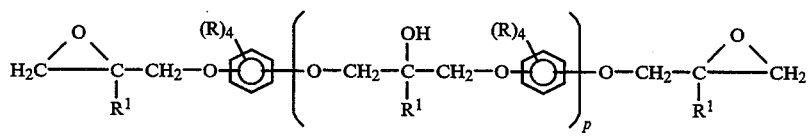

Formula I.

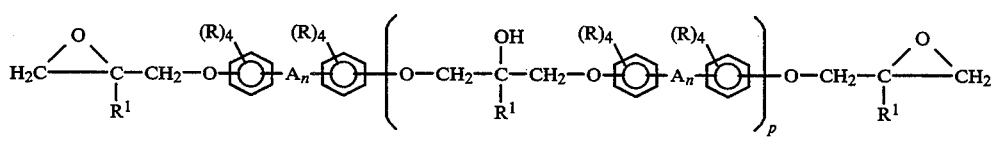

Formula II.

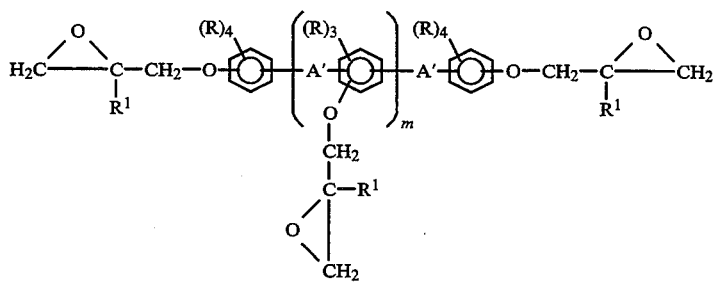

Formula III.

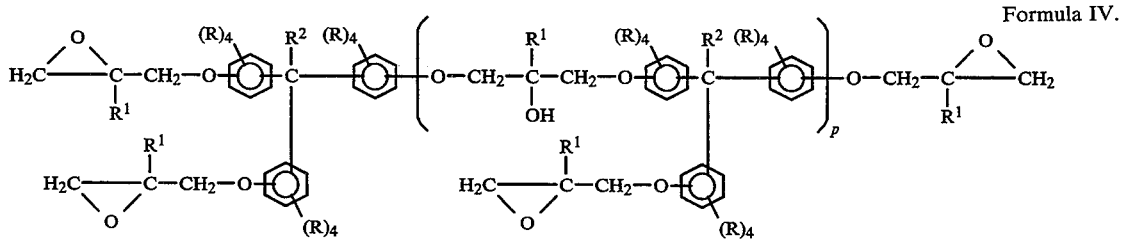

Formula IV.

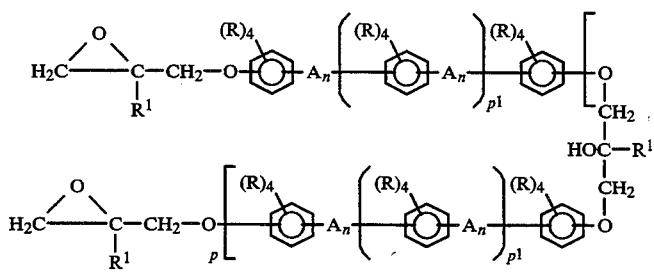

Formula V.

-continued

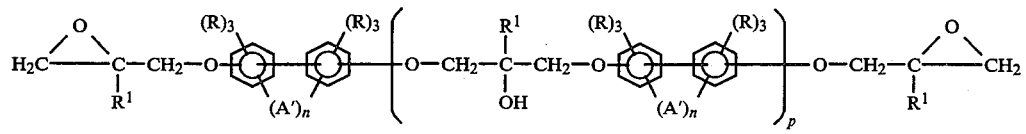
Formula VI.

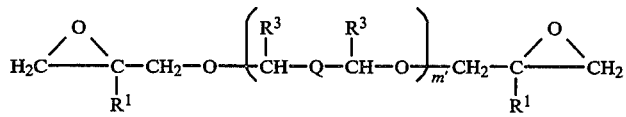
Formula VII.

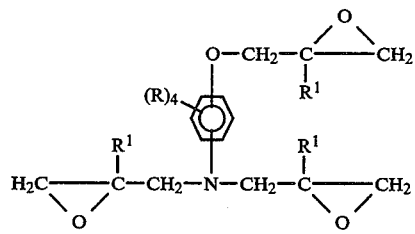
Formula VIII.

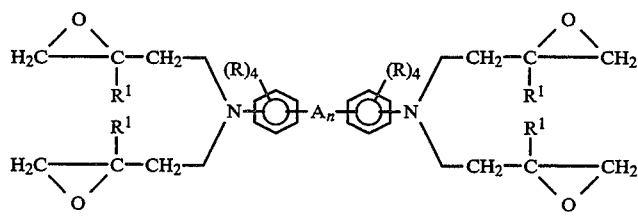
Formula IX.

wherein each A is independently a direct single bond, divalent hydrocarbyl group having from 1 to about 20, preferably from 1 to about 14, more preferably from 1 to about 6, carbon atoms, —O—, —CO—, —SO—, —SO$_2$—, —S—, —S—S—, —CR$^1$=CR$^1$, —C≡C—, —N=N—, —CR$^1$=N—, —O—CO—, —NR$^1$—CO—, —CR$^1$=N—N=CR$^1$—, —CR$^1$=CR$^1$—CO—, —N=CR$^1$—, —CO—O—, —CO—NR$^1$—, —CO—CR$^1$=CR$^1$—, —CO—O—N=CR$^1$—, —CR$^1$=N—O—OC—, —CO—NR$^1$—NR$^1$—OC—, —CR$^1$=CR$^1$—O—OC—, —CO—O—CR$^1$=CR$^1$—, —O—OC—CR$^1$=CR$^1$—, —CR$^1$=CR$^1$—CO—O—, —(CHR$^1$)$_{n'}$—O—CO—CR$^1$=CR$^1$—, —CR$^1$=CR$^1$—CO—O—(CHR$^1$)$_{n'}$—, —(CHR$^1$)$_{n'}$—CO—O—CR$^1$=CR$^1$—, —CR$^1$=CR$^1$—O—CO—(CHR$^1$)$_{n'}$—, —CO—S—, —S—OC—, —CH$_2$, —CH$_2$—CO—O—, —O—OC—CH$_2$—CH$_2$—, —C≡C—C≡C—, —CR$^1$=CR$^1$—CR$^1$=CR$^1$—,

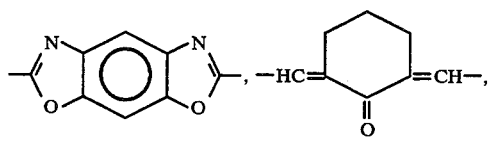

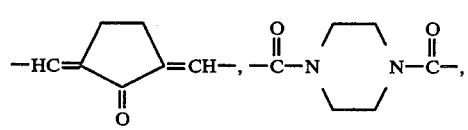

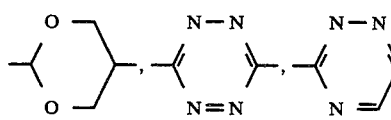

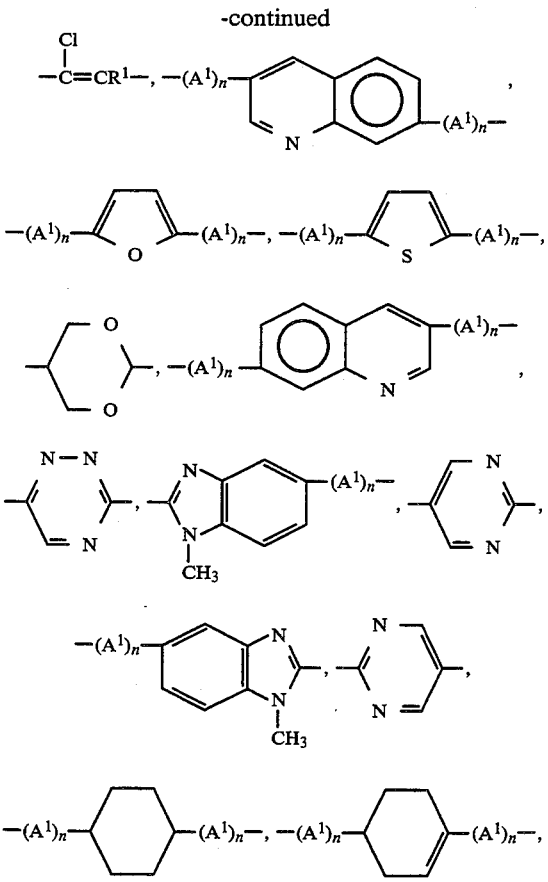

-continued

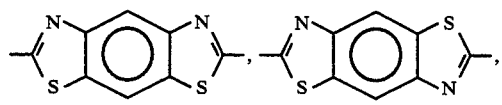

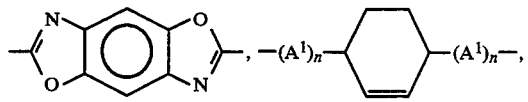

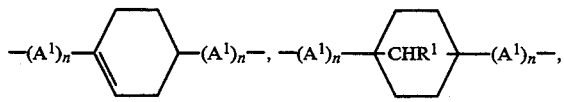

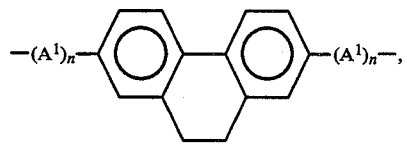

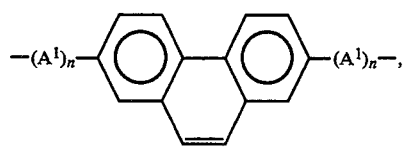

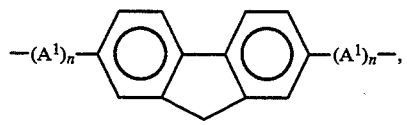

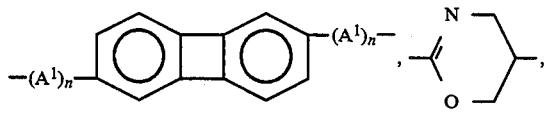

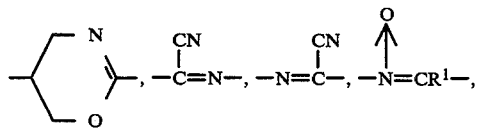

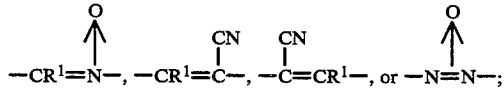

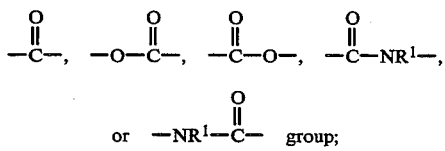

each A' is independently a divalent hydrocarbyl group having from 1 to about 10, preferably from 1 to about 4, carbon atoms; each $A^1$ is independently a $$-\overset{O}{\underset{\|}{C}}-,\quad -O-\overset{O}{\underset{\|}{C}}-,\quad -\overset{O}{\underset{\|}{C}}-O-,\quad -\overset{O}{\underset{\|}{C}}-NR^1-,$$

or $-NR^1-\overset{O}{\underset{\|}{C}}-$ group;

each R is independently hydrogen or a hydrocarbyl or hydrocarbyloxy group having from 1 to about 10, preferably 1 to about 4, carbon atoms, a halogen atom, preferably chlorine or bromine, a nitro group, a nitrile group, a phenyl group or a —CO—$R^1$ group; each $R^1$ is independently hydrogen or a hydrocarbyl group having 1 to about 3 carbon atoms; each $R^2$ is independently hydrogen or a hydrocarbyl group having from 1 to about 10, preferably from 1 to about 3, carbon atoms, a halogen atom, preferably chlorine or bromine; each $R^3$ is independently hydrogen, or a hydrocarbyl or halohydrocarbyl group having from 1 to about 6, preferably 1 to about 2 carbon atoms; Q is a direct bond, —CH$_2$—S—CH$_2$—, —(CH$_2$)n''—, or

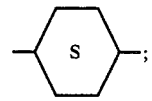

m has a value from about 0.001 to about 6, preferably from about 0.01 to about 3; m' has a value from 1 to about 10 preferably from about 1 to about 4; n has a value of zero or one; p has a value from zero to about 30, preferably from zero to about 5; n' has a value from 1 to about 6, preferably 1 to about 3; n'' has an average value from about 1 to about 10; and $p^1$ has a value from 1 to about 30, preferably from 1 to about 3. The aromatic rings can also contain one or more heteroatoms selected from N, O, S and the like.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic or cycloaliphatic groups can be saturated or unsaturated. When applied to the A' group of Formula VI, the hydrocarbyl group can also contain one or more heteroatoms selected from N, O, S and the like. Likewise, the term hydrocarbyloxy means a hydrocarbyl group having an oxygen linkage between it and the carbon atom to which it is attached.

Representative of the polyepoxide compounds which are free of mesogenic or rodlike moieties include, for exampier the diglycidyl ethers of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide. 3-phenylbisphe nol A, 3,3'5,5'-tetrachlorobisphenol A, 3,3'-dimethoxy hisphenol A, dipropylene glycol, poly(propylene glycol)s , thiodiglycol; the triglycidyl ether of tris(hydroxyphenyl)methane; the triglycidyl ether of p-aminophenol; the tetraglycidyl ether of 4,4'-diaminodiphenylmethane; the polyglycidyl ether of a phenol or substituted phenol-aldehyde condensation product (novolac); the polyglycidyl ether of a dicyclopentadiene or an oligomer thereof and phenol or substituted phenol condensation product; the advancement reaction products of the aforesaid di- and polyglycidyl ethers with aromatic di- or polyhydroxyl- or di- or polycarboxylic acid containing compounds including, for example, bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyldihydroxydiphenyl ether, 3,3',5,5'-dichlorodihydroxydiphenyl ether, 4,4'-bis(p-hydroxyphenyl isopropyl)-diphenyl ether, 4,4'-bis(p-hydroxyphenoxy)-benzene, 4,4'-bis(p-hydroxyphenoxy)diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid; mixtures thereof and the like.

The epoxy resins containing a mesogenic or rodlike moiety which can particularly be employed herein include, for example, those represented by the aforementioned Formulas II, V, VI or IX wherein at least 80 percent of the molecules are para substituted by both the bridging groups (—A—) and the substituent containing the glycidyl group(s)

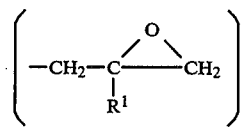

as well as the substituent containing the secondary hydroxy alkylidene group(s)

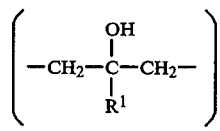

which are present when p or $p^1$ has a value greater than zero. For Formula VI, it is to be understood that para substitution is with respect to the direct bond between the aromatic rings.

The bridging groups (—A—) in the formulas for the epoxy resins containing mesogenic or rodlike moieties form a rigid central linkage between the aromatic ring pairs, that is, A is a direct single bond, —C≡C—, —$CR^1$=N—, —N=N—, —O—CO—, —$NR^1$—CO—, —$CR^1$=N—N=$CR^1$—, —$CR^1$=$CR^1$—CO—, —$CR^1$=$CR^1$—, —N=$CR^1$—, —CO—O—, —CO—$NR^1$—, —CO—$CR^1$=$CR^1$—, —CO—O—N=$CR^1$—, —$CR^1$=N—O—OC—, —CO—$NR^1$—$NR^1$—OC—, —$CR^1$=$CR^1$—O—OC—, —CO—O—$CR^1$=$CR^1$—, —O—OC—$CR^1$=$CR^1$—, —$CR^1$=$CR^1$—CO—O—, —(CHR$^1$)$_{n'}$—O—CO—$CR^1$=$CR^1$—, —$CR^1$=C-$R^1$—CO—O—(CHR$^1$)$_{n'}$—, —(CHR$^1$)-$_{n'}$—CO—O—$CR^1$=$CR^1$, —$CR^1$=C-$R^1$—O—CO—(CHR$^1$)n'—, —CO—S—, —S—OC—, —CH$_2$—CH$_2$—CO—O—, —O—OC—CH$_2$—CH$_2$—, —C≡C—C≡C—, —$CR^1$=$CR^1$—$CR^1$=$CR^1$—,

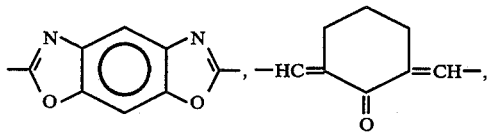

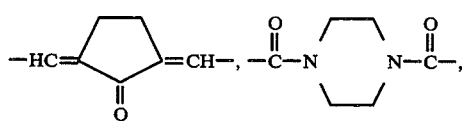

-continued

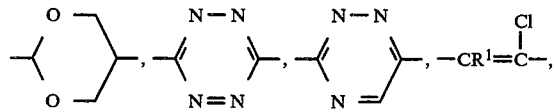

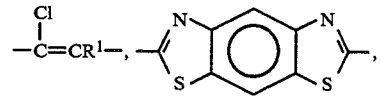

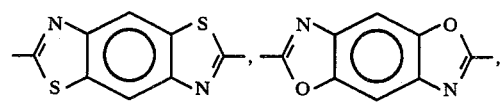

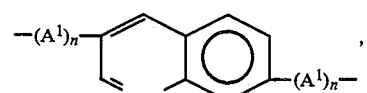

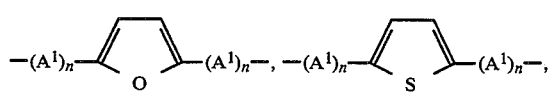

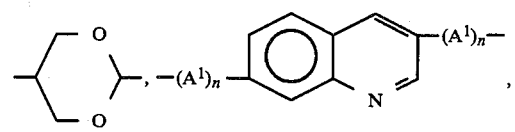

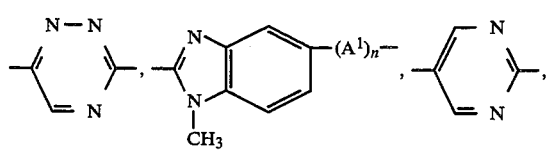

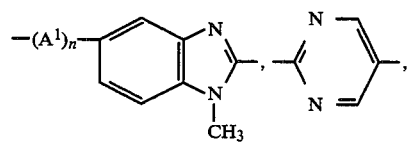

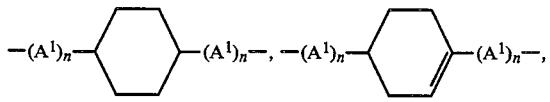

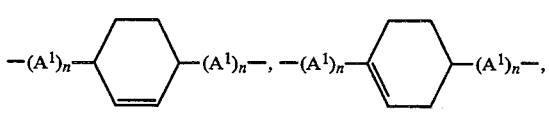

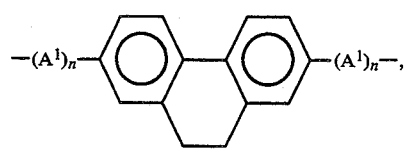

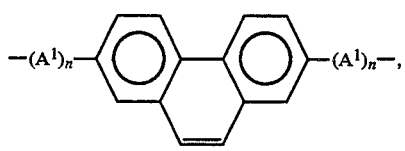

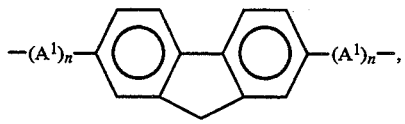

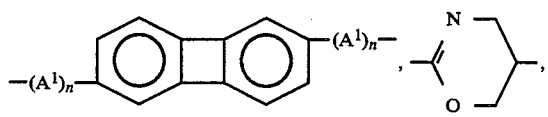

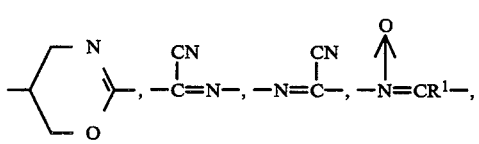

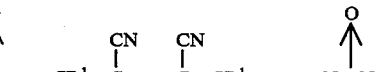

group and n, $A^1$ and $R^1$ are as hereinbefore described.
To optimize the aspect ratio of said mesogenic or rod-like functionalities, it is preferred that the aromatic ring substituents (R in Formulas If, V, VI and IX) are hydrogen or methyl groups.

Representative polyepoxide compounds containing a mesogenic or rodlike moiety include, for example, the diglycidyl ethers of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'bis((4-hydroxy)-phenoxy)diphenyl, 4,4'-dihydroxy-alphamethylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydrbxy-3,3',5,5'-tetrabromoalpha-methylstilbene, N,N'-bis(4-hydroxyphenyl)terephthalamide, the diglycidyl ethers of the dihydric phenols represented by the following formulas:

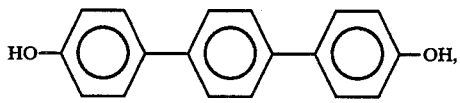

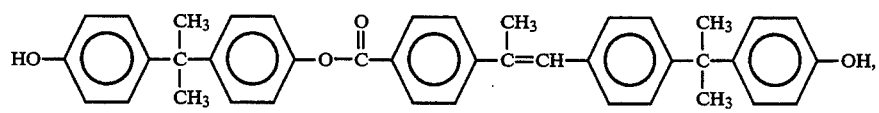

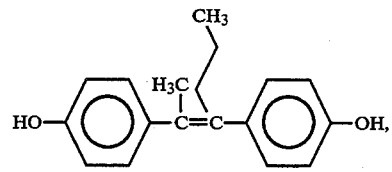

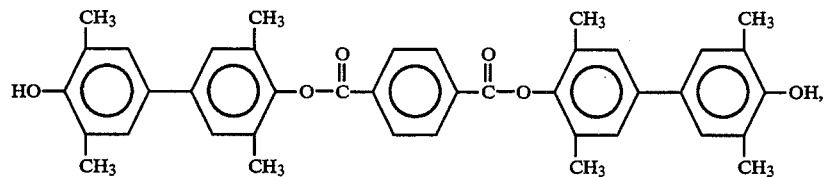

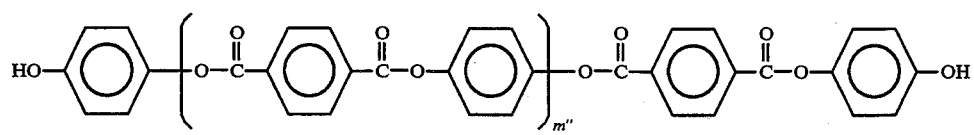

where m" has a value from 1 to about 10,

-continued
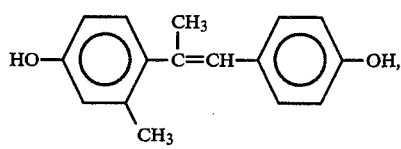 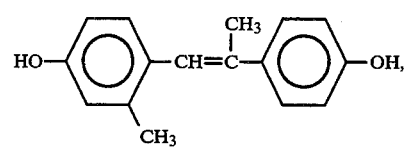
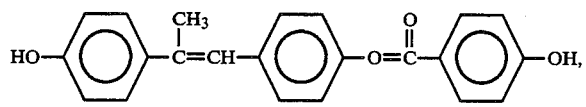
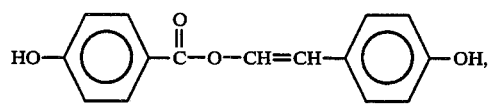 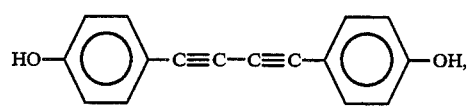
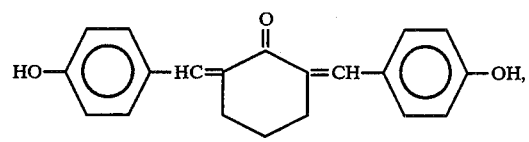
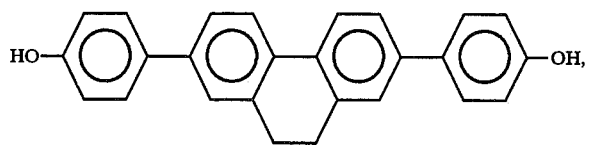
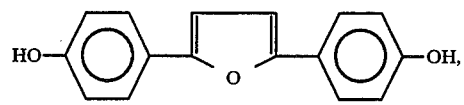 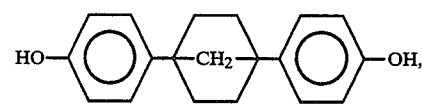
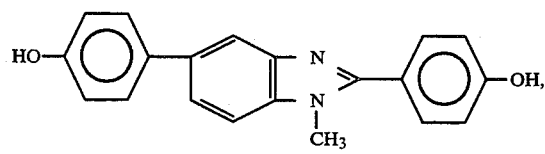 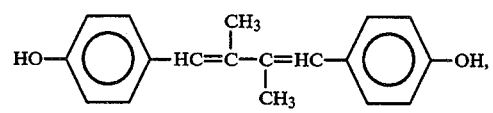
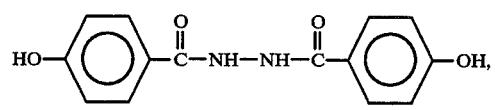 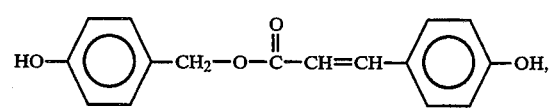
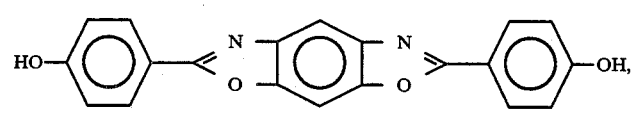
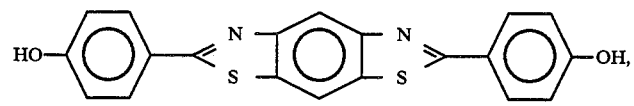
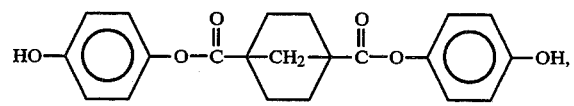 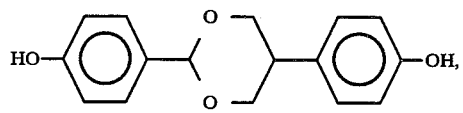
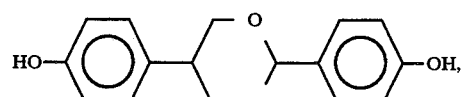 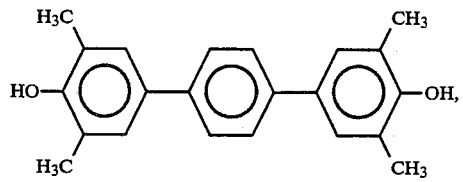

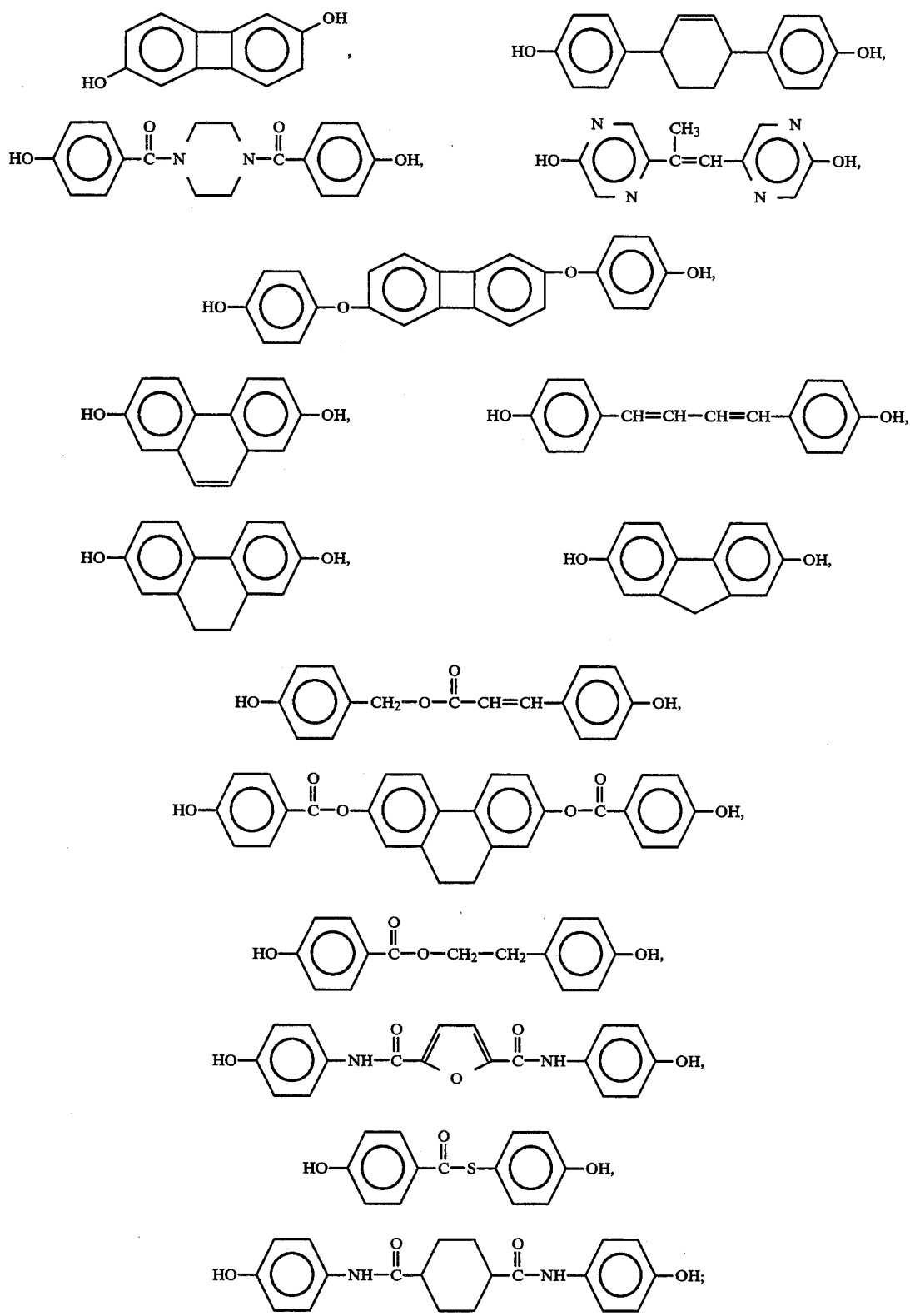

the tetraglycidyl amines of 4,4′-diamino-alphamethylstilbene, 4,4′-diaminostilbene, 4,4′-diaminobenzanilide, 4,4′-diaminoazobenzene, 4,4′-diamino-alpha-cyanostilbene. Also suitable are the products resulting from advancing the aforementioned diglycidyl ethers with aromatic dihydroxyl or dicarboxylic acid containing compounds including, for example, all of the previously listed diphenol precursors to the diglycidyl ethers containing a mesogenic or rodlike moiety; mixtures thereof and the like.

The epoxy resins which can be employed herein can be prepared by reacting the corresponding di- or polyhydroxyl containing compound (or amine containing compound) with an epihalohydrin by any suitable means known to those skilled in the art. Suitable such methods are disclosed by Lee and Neville in *Handbook of Epoxy Resins*, McGraw-Hills (1967); Japan Kokai Tokkyo Koho JP 62 86,484 (87 96, 484); EP 88-008358/92 and Journal of Applied Polymer Science, Vol. 23, 1355–1372 (1972) all of which are incorporated herein by reference.

Generally, the di- or polyhydroxyl containing compound is reacted with an epihalohydrin in the presence of a suitable catalyst and in the presence or absence of a suitable solvent at a temperature suitably from about 0° C. to about 100° C., more suitably from about 20° C. to about 80° C., most suitably from about 20° C. to about 65° C.; at pressures suitably from about 30 mm Hg vacuum to about 100 psia (7.03 kg/cm$^2$), more suitably from about 30 mm Hg vacuum to about 50 psia (3.52 kg/cm$^2$), most suitably from about atmospheric pressure to about 20 psia (1.41 kg/cm$^2$); for a time sufficient to complete the reaction, usually from about 1 to about 12, more usually from about 1 to about 5, most usually from about 1 to about 3 hours; and using from about 1.5:1 to about 100:1, preferably from about 2:1 to about 50:1, more preferably from about 3:1 to about 20:1 moles of epihalohyrin per hydroxyl group. This initial reaction unless the catalyst is an alkali metal or alkaline earth metal hydroxide employed in stoichiometric quantities produces a halohydrin intermediate which is then reacted with a basic acting compound to convert the vicinal chlorohydrin groups to epoxide groups. The resultant product is a glycidyl ether compound.

Suitable epihalohydrins which can be employed to prepare the epoxy resins useful in the present invention include, for example, those represented by the following formula

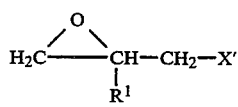

Formula X wherein R$^1$ is as previously defined; and X′ is a halogen. Particularly suitable such epihalohydrins include, for example, epichlorohydrin, epibromohydrin, epiiodohydrin, methylepichlorohydrin, methylepibromohydrin, methylepiiodohydrin, combinations thereof and the like.

Suitable di- or polyhydroxyl containing compounds (or amine containing compounds) which can be employed to prepare the epoxy resins useful in the present invention include, for example, those represented by the formulas

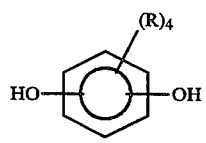

Formula XI.

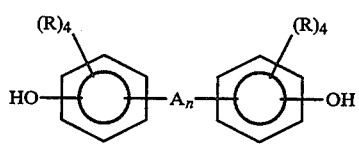

Formula XII.

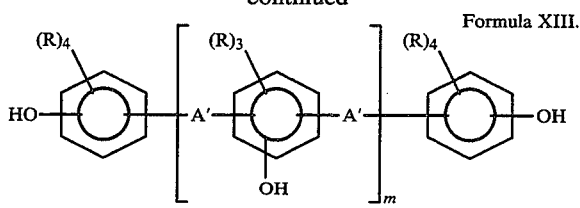

Formula XIII.

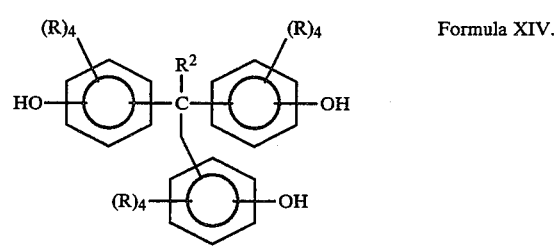

Formula XIV.

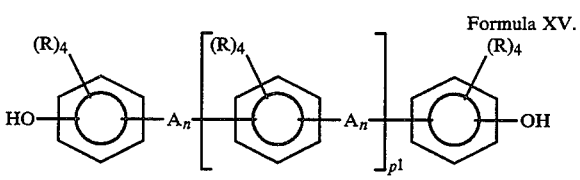

Formula XV.

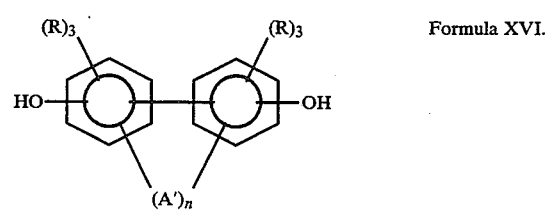

Formula XVI.

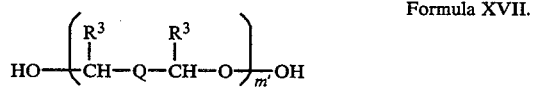

Formula XVII.

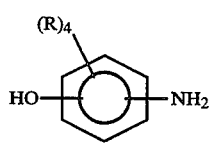

Formula XVIII.

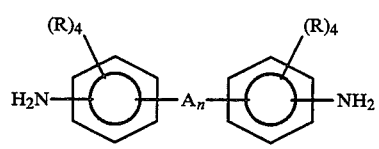

Formula XIX.

wherein R, R$^2$, R$^3$, Q, A, A′, p$^1$, m and m′ are as hereinbefore defined.

Suitable catalysts which can be employed to prepare the epoxy resins which can be employed herein include, for exampier ammonium halides such as, for example, benzyltrimethylammonium chloride, benzyltrimethylammonium bromide, tetrabutylammonium chloride, tetrabutylammonium bromide, tetraoctylammonium chloride, tetraoctylammonium bromide, tetramethylammonium chloride, tetramethylammonium bromide, combinations thereof and the like.

Suitable basic acting compounds which can be employed to prepare the epoxy resins useful herein include, for example, alkali metal or alkaline earth metal hydroxides, carbonates, bicarbonates and the like. Particularly suitable such compounds include, for example, sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, lithium bicarbonate, calcium bicarbonate, barium bicarbonate, magnesium bicarbonate, manganese bicarbonate, mixtures, thereof and the like. Most preferred is sodium hydroxide or potassium hydroxide.

Suitable solvents which can be employed herein include, for example, alcohols, aliphatic hydrocarbons, aromatic hydrocarbons, glycol ethers, amides, sulfoxides, sulfonesr combinations thereof and the like. Particularly suitable solvents include, for example, methanol, ethanol, isopropanol, hexane, heptane, octane, nonane, decane, toluene, xylene, ethylene glycol methyl ether, ethylene glycol ethyl ether, ethylene glycol nbutyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrrolidinone, N,N-dimethylacetamide, dimethylsulfoxide, sulfolane, combinations thereof and the like.

The solvent is usually employed in amounts suitably from about 5 to about 95, more suitably from about 20 to about 60, most suitably from about 30 to about 40, percent by weight based upon the combined weight of solvent and epihalohydrin.

For the production of epoxy resins from di- and polyhydroxyl containing compounds (or amine containing compounds) possessing functional groups or linkages that are sensitive to hydrolysis under the reaction conditions employed in certain of the epoxidation chemistries, alternate techniques of preparation may be employed. As a typical example, U.S. Pat. No. 4,762,901 teaches preparation of the diglycidyl ether of the biphenol represented by the following formula

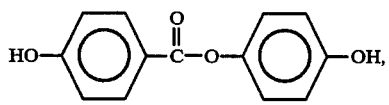

which is a compound containing an ester linkage known to be sensitive to hydrolysis, using an anhydrous epoxidation technique. This technique employs azeotropic removal of water epichlorohydrin concurrent with the controlled addition of aqueous sodium hydroxide to a reaction mixture consisting of epichlorohydrin, a diphenol, a phase transfer catalyst such as, for example, benzyltrimethylammonium chloride, and optionally solvent(s). It is advantageous to conduct such anhydrous epoxidation reactions under a vacuum to facilitate the azeotropic removal of water. It is also operable and advantageous to utilize sodium hydroxide free of water as the alkali metal hydroxide reactant. In order to control reaction exotherm, the solid sodium hydroxide is typically added in aliquots as a powder to the epoxidation reaction mixture. A typical anhydrous epoxidation technique is described in U.S. Pat. No. 4,499,255 which is incorporated herein by reference in its entirety.

Another specific anhydrous epoxidation technique involves catalytic coupling of the di- or polyhydroxyl containing compound with an epihalohydrin, typically using as a catalyst one or more of the aforementioned ammonium halides. The resultant solution of halohydrin in excess epihalohydrin is then treated with finely pulverized potassium carbonate to effect dehydrohalogenation to the epoxy resin.

Advancement reaction of di- and polyglycidyl ethers can be performed by the known methods described in the aforementioned *Handbook of Epoxy Resins*. This usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl ethers with the application of heat and mixing to effect the advancement reaction. A catalyst is frequently added to facilitate the advancement reaction.

The advancement of the epoxy resins containing one or more mesogenic or rodlike moieties with compounds having an average of more than one active hydrogen per molecule is employed to linearly chain extend the resin so as to produce an advanced epoxy resin. This linear chain extension is required for some mesogenic containing resin compositions in order to obtain liquid crystal character. The advancement of the mesogenic or rodlike epoxy resins can also be used to increase the temperature range in which a particular resin is liquid crystalline and to control the degree of crosslinking during the final curing stage.

The epoxy resin containing one or more mesogenic or rodlike mpieties and the compound having an average of more than one active hydrogen atom per molecule are reacted in amounts which provide suitably from about 0.01:1 to about 0.99:1, more suitably from about 0.05:1 to about 0.9:1, most suitably from about 0.10:1 to about 0.50:1 active hydrogen atoms per epoxy group.

Particularly suitable compounds having an average of more than one active hydrogen atom per molecule which can be employed herein in the preparation of the advanced epoxy resins include hydroxyl-containing compounds, carboxylic acid-containing compounds and primary amine-containing compounds.

Particularly suitable hydroxyl-containing compounds include, for example, hydroquinone, bisphenol A, 4,4'-dihydroxydiphenylmethane, 4,4'-thiodiphenol, 4,4'-sulfonyldiphenol, 4,4'-dihydroxydiphenyl oxide, 4,4'-dihydroxybenzophenone, 1,1-bis(4-hydroxyphenyl)-1-phenylethane, 3,3',5,5'-tetrachlorobisphenol A, 3,3'-dimethoxybisphenol A, 4,4'-dihydroxybiphenyl, 4,4'-dihydroxy-α,α'-diethylstilbene, 4,4'-dihydroxy-α-methylstilbene, 4,4'-dihydroxybenzanilide, 4,4'-dihydroxy-2,2'-dimethylazoxybenzene, 4,4'-dihydroxy-α-cyanostilbene, bis(4-hydroxyphenyl)terephthalate, bis(N,N'-4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine, 4,4''-dihydroxybiphenylbenzoate, 1,4-bis(4'-hydroxyphenyl-1'-carboxamide) benzene, 1,4-bis(4'-hydroxyphenyl-1'-carboxy)benzene, 4,4'-bis(4''-hydroxyphenyl-1''-carboxy)biphenyl, mixtures thereof and the like.

Particularly suitable carboxylic acid-containing compounds include, for example, terephthalic acid, 4,4'-benzanilide dicarboxylic acid, 4,4'-phenylbenzoate dicarboxylic acid, 4,4'-stilbenedicarboxylic acid and mixtures thereof and the like.

Particularly suitable primary amine-containing compounds include, for example, aniline, 4'-sulfon-amido- N-phenyl benzamide, 4'-sulfonamido-N'-phenyl-4-chlorobenzamide, 4-amino-1-phenylbenzoate, 4-amino-N-phenylbenzamide, N-phenyl-4-aminophenyl-1-carboxamide, phenyl-4-aminobenzoate, biphenyl-4-aminobenzoate, 1-phenyl-4'-aminophenylterephthalate, mixtures thereof and the like.

The advancement reaction can be conducted in the presence of a suitable advancement catalyst such as, for example, phosphines, quaternary ammonium compounds, phosphonium compounds, tertiary amines and the like. Particularly suitable catalysts include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate-acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate-acetic acid complex), butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216; and 4,366,295, all of which are incorporated herein by reference.

The amount of advancement catalyst depends, of course, upon the particular reactants and catalyst employed; however, it is usually employed in quantities of from about 0.03 to about 3, preferably from about 0.03 to about 1.5, most preferably from about 0.05 to about 1.5 percent by weight based upon the weight of the epoxy containing compound.

The advancement reaction can be conducted at atmospheric, superatmospheric or subatmospheric pressures at temperatures of from about 20° C. to about 260° C., preferably from about 80° C. to about 240° C., more preferably from about 100° C. to about 200° C. The time required to complete the advancement reaction depends upon the temperature employed. Higher temperatures require shorter periods of time whereas lower temperatures require longer periods of time. Generally, however, times of from about 5 minutes to about 24 hours, preferably from about 30 minutes to about 8 hours, more preferably from about 30 minutes to about 3 hours are suitable.

If desired, the advancement reaction can be conducted in the presence of one or more solvents. For the production of advanced epoxy resins using a reactant which is of low solubility in the di- or polyglycidyl ether reactant, it is frequently of advantage to add one or more solvents to the reaction mixture. Suitable such solvents include, for example, glycol ethers, aliphatic and aromatic hydrocarbons, aliphatic ethers, cyclic ethers, ketones, esters, amides, combinations thereof and the like. Particularly suitable solvents include, for example, toluene, benzene, xylene, methyl ethyl ketone, methyl isobutyl ketone, diethylene glycol methyl ether, dipropylene glycol methyl ether, dimethylformamide, dimethylsulfoxide, N-methypyrrolidinone, tetrahydrofuran, propylene glycol methyl ether, combinations thereof and the like. The solvents can be employed in amounts of from about zero to about 80%, preferably from about 20% to about 60%, more preferably from about 30% to about 50% by weight based upon the weight of the reaction mixture. Care should be taken to utilize only those solvents which are inert to reaction with any of the reactants employed in the advancement reaction or the product formed therefrom.

ACTIVE HYDROGEN CONTAINING COMPONENT

Materials containing two or more active hydrogens which are reactive with an epoxide group useful in the preparation of the adducts containing one or more mesogenic or rodlike moieties of the present invention include the di- and polyphenols, such as, for exampier those represented by formulas XI, XII, XIII, XIV, XV and XVI; the di- and polycarboxylic acids, such as, for example, those represented by formulas XX, XXI, XXIII, XXIV, XXV and XXVI where each Y is a —COOH group; the di- and polymercaptans, such as, for example, those represented by formulas XX, XXI, XXIII, XXIV, XXV and XXVI where each Y is a —SH group; the di- and polyamines, such as, for example, those represented by formulas XX, XXI, XXII, XXIII, XXIV, XXV and XXVI where each Y is a 13 NHR$^1$ group, as well as formula XXVI where one Y is a —NHR$^1$ group and the other Y is a

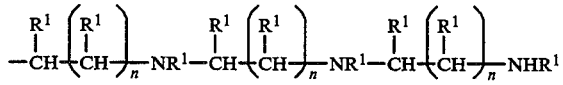

group; the primary monoamines, such as, for example, those represented by formulas XX, XXI, XXIV, XXV and XXVI where one Y is a —NH$_2$ group and the other Y is a hydrogen, as well as formula XXIII where one Y is a —NH$_2$ group and the remaining other Y's are hydrogen; the sulfonamides, such as, for example, those represented by formulas XX, XXI, XXIV, XXV and XXVI where one Y is a —SO$_2$—NH$_2$ group and the other Y is a hydrogen, as well as formula XXIII where one Y is a —SO$_2$—NH$_2$ group and the remaining other Y's are hydrogen; the aminophenols, such as, for example, those represented by formulas XX, XXI, XXIV and XXV where One Y is a —NHR$^1$ group and the other Y is a —OH group, as well as formula XXIII where one or two Y's are —NHR$^1$ groups and the remaining one or two Y's are —OH groups, the amino carboxylic acids, such as, for example, those represented by formulas XX, XXI, XXIV, XXV and XXVI where one Y is a —NHR$^1$ group and the other Y is a —COOH group, as well as formula XXIII where one or two Y's are —NHR$^1$ groups and the remaining one or two Y's are —COOH groups; the phenolic hydroxyl containing carboxylic acids, such as, for example, those represented by formulas XX, XXI, XXIV and XXV where one Y is a —OH group and the other Y is a —COOH group, as well as formula XXIII where one or two Y's are —OH groups and the remaining one or two Y's are —COOH groups; the sulfanilamides, such as, for example, those represented by formulas XX, XXI, XXIV and XXV where one Y is a —NHR$^1$ group and the other Y is a —SO$_2$—NH$_2$ group, as well as formula XXIII where one or two Y's are —NHR$^1$ groups and the remaining one or two Y's are —SO$_2$—NH$_2$ groups; wherein R, R$^1$, R$^2$, A, A', n, p$^1$ and m are as hereinbefore defined and X$^2$ is a divalent hydrocarbyl group having from one to about 60 carbon atoms and may be linear or branched aliphatic, cycloaliphatic or polycycloaliphatic and may contain one or more linkages selected from ether (—O—), thioether (—S—),

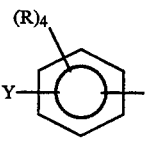

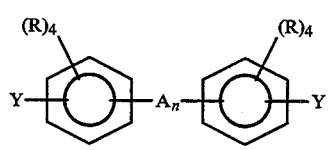

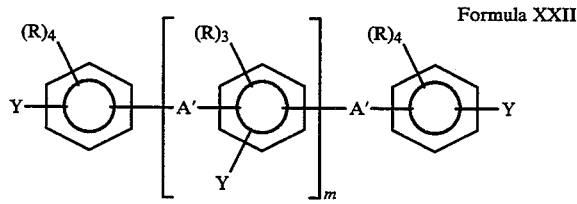

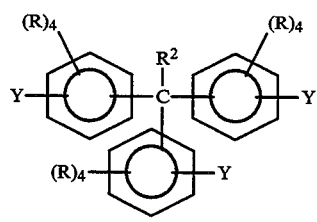  Formula XX.

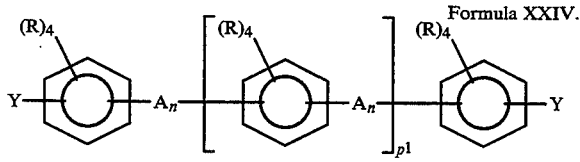  Formula XXI.

Formula XXII.

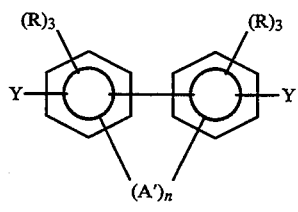

Formula XXIII.

Formula XXIV.

Formula XXV.

Y—X²—Y    Formula XXVI.

Representative of the di- and polyphenol compounds which are free of mesogenic or rodlike moieties include, for example, resorcinol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydi phenyl oxide, 4,4'-bis(4-(4-hydroxyphenoxy) phenylsulfone)diphenyl ether, 1,1-bis(4-hydroxyphenyl)cyclohexane, tris(hydroxyphenyl)methane, phenol or substituted phenol-aldehyde condensation products (novolacs), dicyclopentadiene or an oligomer thereof and phenol or substituted phenol condensation products, mixtures thereof and the like.

Representative of the di- and polyphenol compounds containing one or more mesogenic or rodlike moieties include, for example, 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alpha-methylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydroxy-3,3',5,5'-tetrabromo-alpha-methylstilbene, 4,4'-bis(4-(4-hydroxyphenoxy)phenylsulfone)stilbene, 1,4-bis(4-hydroxyphenyl)-trans-cyclohexane, N,N'-bis(4-hydroxyphenyl)terephthalamide, mixtures thereof and the like.

Representative of the di- and polycarboxylic acid compounds which are free of mesogenic or rodlike moieties include, for example, 4,4'-dicarboxydiphenylmethane, 4,4'-isopropylidenedicarboxylic acid, 3,3',5,5'-tetrabromo-4,4'-isopropylidenedicarboxylic acid, terephthalic acid, isophthalic acid, 1,4-cyclohexanedicarboxylic acid, 1,6-hexanedicarboxylic acid, dicyclopentadienedicarboxylic acid, tris(carboxyphenyl)-methane, 4,4'-bis(4-(4-carboxyphenoxy)phenylsulfone)-diphenyl ether, 1,1-bis(4-carboxyphenyl)cyclohexane, mixtures thereof and the like.

Representative of the di- and polycarboxylic acid compounds containing one or more mesogenic or rodlike moieties include, for example, 4,4'-dicarboxydiphenyl, 4,4'-dicarboxystilbene, 4,4'-dicarboxydiphenyl acetylene, 4,4'-dicarboxyazobenzene, 4,4'-bis(4-carboxyphenoxy)diphenyl, 4,4'-dicarboxy-alpha-methylstilbene 3,3',5,5'-tetramethyl-4,4'-dicarboxydiphenyl, 3,3',5,5'-tetrachloro-4,4'-dicarboxydiphenyl, 2,2',6,6'-tetramethyl-4,4'-dicarboxydiphenyl, 4,4'-dicarboxybenzanide, 4,4'-dicarboxy-alpha-cyanostilbene, 4,4'-dicarboxy-3,3',5,5'-tetrabromo-alpha-methylstilbene, N,N'-bis(4-carboxyphenyl)terephthalamide, 4,4'-bis(4-(4-carboxyphenoxy)phenylsulfone)stilbene, 1,4-bis(4-carboxyphenyl)-trans-cyclohexane, mixtures thereof and the like.

Representative of the di- and polymercaptan compounds which are free of mesogenic or rodlike moieties include, for example, 1,4-benzenedithiol, 1,3-benzenedithiol, 4,4'-isopropylidenedithiol, 1,4-cyclohexanedithiol, 1,6-hexanedithiol, 2,2'-dimercaptodiethylether, 1,2-dimercaptopropane, 1,3-dimercaptopropanol-2, bis(2-mercaptoethylsulfide), tris(mercaptophenyl)methane, 4,4'-bis(4-(4-mercaptophenoxy)phenylsulfone)-diphenyl ether, 1,1-bis(4-mercaptophenyl)cyclohexane, mixtures thereof and the like.

Representative of the di- and polymercaptan compounds containing one or more mesogenic or rodlike moieties include, for example, 4,4'-dimercaptodiphenyl, 4,4'-dimercaptostilbene, 4,4'-dimercaptodiphenylacetylene, 4,4'-dimercaptodiphenylazomethine, 4,4'-dimercaptoazobenzene, 4,4'-bis(4-mercaptophenoxy)diphenyl, 4,4'-dimercapto-alpha-methylstilbene, 3,3',5,5'-tetramethyl-4,4'-dimercaptodiphenyl, 3,3',5,5'-tetrachloro-4,4'-dimercaptodiphenyl, 2,2',6,6'-tetramethyl-4,4'-dimercaptodiphenyl, 4,4'-dimercaptobenzanilide, 4,4'-dimercaptochal cone, 4,4'-dimercaptoalpha-cyanostilbene, 4,4'-mercaptophenyl-4-mercaptobenzoate, 4,4'-dimercapto-3,3',5,5'-tetrabromo-alphamethylstilbene, N,N'-bis(4-mercaptophenyl)terephthalamide, 1,4-bis(4-mercaptophenyl)-transcyclohexane, 4,4'-bis(4-(4-mercaptophenoxy)phenylsulfone)stilbene, mixtures thereof and the like.

Representative of the di- and polyamine compounds which are free of mesogenic or rodlike moieties include, for example, 1,2-diaminobenzene, 1,3-diaminobenzene, 1,4-diaminobenzene, 4,4'-diaminodiphenylmethane, 3,3',5,5'-tetrabromo-4,4'-isopropylidenediamine, 4,4'-diaminodiphenyl oxide, 4,4'-diaminodiphenyl sulfone, 4,4'-diaminodiphenyl sulfide, aniline-aldehyde condensation products, tris(aminophenyl)methane, 1,4-cyclohexanediamine, 1,6-hexanediamine, piperazine, ethylenediamine, diethylenetriamine, triethylenetetraamine, aminoethylpiperazine, bis(aminopropyl)ether, bis(aminopropylsulfide), bis(aminomethyl)norbornane, 2,2'-bis(4-aminocyclohexyl)propane, 1,1-bis(4-aminophenyl)cyclohexane, 4,4'-bis(4(4-(4-aminophenoxy)phenylsulfone)diphenyl ether, aminoethylpiperazine mixtures thereof and the like.

Representative of the di- and potyamine compounds containing one or more mesogenic or rodlike moieties include, for example, 3,3'-dimethyl-4,4'-diaminobiphenyl, 4,4'-diaminostilbene, 4,4'-diaminodiphenylacetylene, 4,4'-diaminodiphenylazomethine, 4,4'-diaminoazobenzene, 4,4'-diaminoazoxybenzene, 4,4'-bis(4-aminophenoxy)diphenyl, 4,4'-diaminoalphamethylstilbene, 3,3',5,5'-tetramethyl-4,4'diaminodiphenyl, 3,3',5,5'-tetrachloro-4,4'diaminodiphenyl, 2,2',6,6'-tetramethyl-4,4'diaminodiphenyl , 4,4'-diaminobenzanilide, 4,4'diaminochalcone, 4,4'-diamino-alpha-cyanostilbene, 4-aminophenyl-4-aminobenzoate, 4,4'-diamino-3,3',5,5'-tetrabromo-alpha-methylstilbene, N,N'-bis(4-aminophenyl)terephthalamide, 1,4-bis(4-aminophenyl)-transcyclohexane, 4,4'-bis(4-(4-aminophenoxy)phenylsulfone)-stilbene, mixtures thereof and the like.

Representative of the primary monoamine compounds which are free of mesogenic or rodlike moieties include, for example, aniline, 4-methoxyaniline, 4-chloroaniline, 4-methylaniline, 4-cyanoaniline, 2,6-dimethylaniline, 4-aminodiphenyl oxide, 4-aminodiphenylmethane, 4-aminodiphenylsulfone, 4-aminodiphenylsulfide, methylamine, 4-aminobenzophenone, n-hexylamine, cyclohexylamine, aminonorbornane, mixtures thereof and the like. Ammonia represents a special case of the primary monoamines useful herein and may be conveniently used as the aqueous ammonium hydroxide solution.

Representative of the primary monoamine compounds containing one or more mesogenic or rodlike moieties include, for example, 4-aminodiphenyl, 4-aminostilbene, 4-amino-4'-methoxystilbene, 4-amino-4'-methylsti 4-amino-4'-chlorostilbene, 4-amino-4'-nitrostilbene, 4-amino-4'-cyanostilbene, 4-aminodiphenylacetylene, 4-aminodiphenylazomethine, 4-aminoazobenzene, 4-aminoazoxybenzene, 4-amino-alpha-methylstilbene, 4-aminobenzanilide, 4-aminochalcone, 4-amino-alpha-cyanostilbene, 4-aminophenyl-4methoxybenzoate, 4-amino-2,2',6,6'-tetramethyl-alpha-methylstilbene, 4-amino-2,6-dimethyl-alphamethylstilbene, mixtures thereof and the like.

Representative of the sulfonamide compounds which are free of mesogenic or rodlike moieties include, for examp le, phenylsulfonamide, 4-methoxyphenylsulfonamide, 4-chlorophenylsulfonamide, 4-methylphenylsulfonamide, 4-cyanophenylsulfonamide, 2,6-dimethylphenylsulfonamide, 4-sulfonamidodiphenyl oxide, 4-sulfonamidodiphenylmethane, 4-sulfonamidodiphenylsulfone, 4-sulfonamidobenzophenone, mixtures thereof and the like.

Representative of the sulfonamide compounds containing one or more mesogenic or rodlike moieties include, for example, 4-sulfonamidodiphenyl, 4-sulfonamidostilbene, 4-sulfonamido-4'-methoxystilbene, 4-sulfonamido-4'-methylstilbene, 4-sulfonamido-4'-chlorostilbene, 4-sulfonamido-4'-nitrostilbene, 4-sulfonamido-4'-cyanostilbene, 4-sulfonamidodiphenylacetylene, 4-sulfonamidodiphenylazomethine, 4-sulfonamidoazobenzene, 4-sulfonamidoazoxybenzene, 4-sulfonamido-alphamethylstilbene, 4-sulfonamidobenzanilide, 4sulfonamidochalcone, 4-sulfonamido-alpha-cyanostilbene, 4-sulfonamidophenyl-4-methoxybenzoate, 4-sulfonamido-2,2',6,6'-tetramethyl-alpha-methylstilbene, 4-sulfonamido-2,6-dimethyl-alpha-methylstilbene, mixtures thereof and the like.

Representative of the aminophenol compounds which are free of mesogenic or rodlike moieties include, for example, o-aminophenol, m-aminophenol, p-aminophenol, 2-methoxy-4-hydroxy-1-aminobenzene,3,5-dimethyl-4-hydroxy-1-aminobenzene, 3-cyclohexyl-4-hydroxy-1-aminobenzene, 2,6-dibromo-4-hydroxy-1-aminobenzene, 5-butyl -5-hydroxyaminobenzene, 3-phenyl-4-hydroxy-1-aminobenzene, 4-(1-(3-aminophenyl)-1-methylethyl)phenol, 4-(1-(4-aminophenyl)ethyl) phenol, 4-(4-aminophenoxy)phenol, 4-((4-aminophenyl)thio)phenol, (4-aminophenyl)(4-hydroxyphenyl)methanone, 4-((4aminophenyl)sulfonyl)phenol, 4-(1-(4-amino-3,5-dibromophenyl)-1-methylethyl)-2,6-dibromophenol, N-methyl-p-aminophenol, mixtures thereof and the like.

Representative of the aminophenol compounds containing one or more mesogenic or rodlike moieties include, for example,

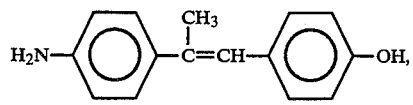

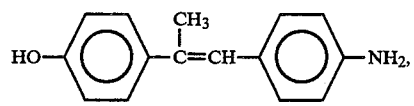

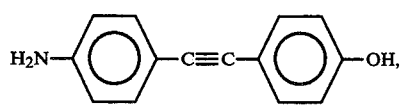

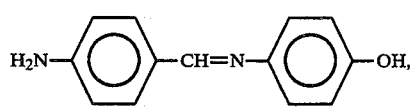

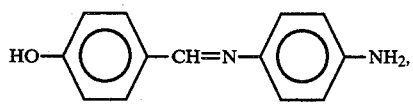

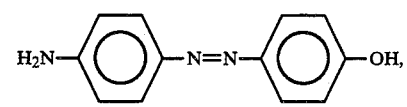

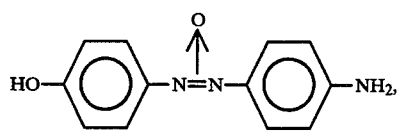 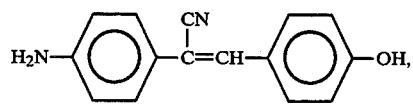
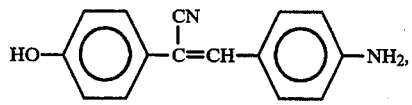 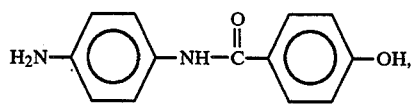
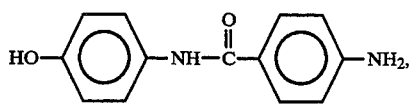 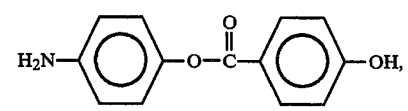
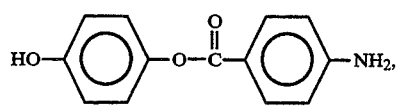 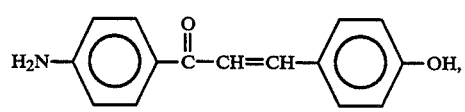
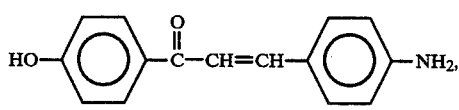
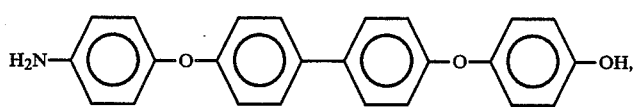
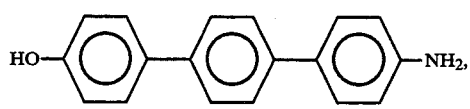 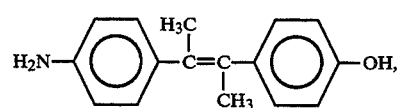
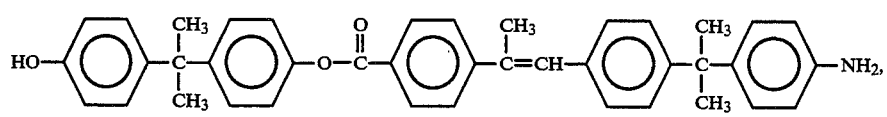
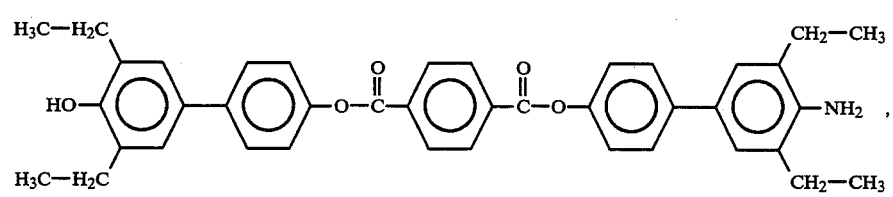
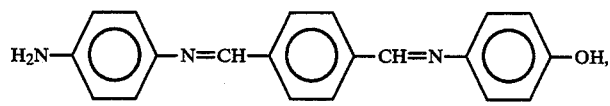
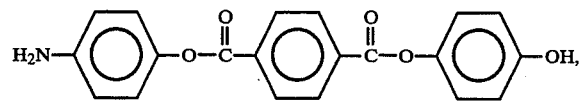
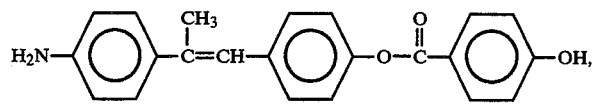
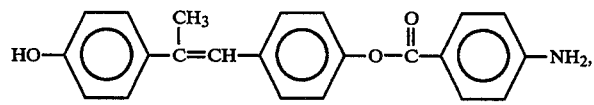

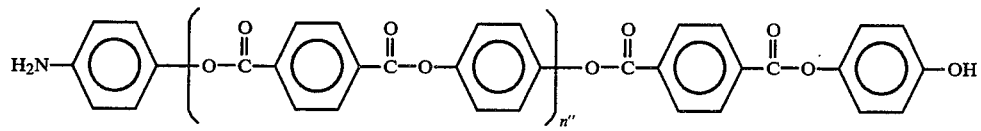
wherein n" has an average value from about 1 to about 10,
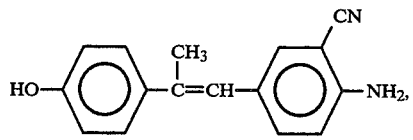 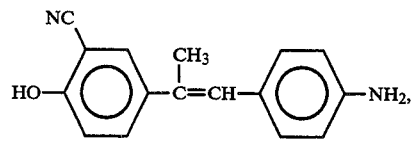
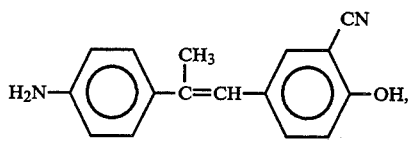 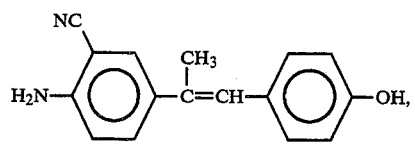
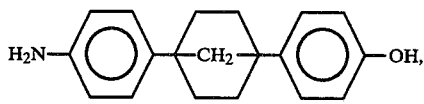 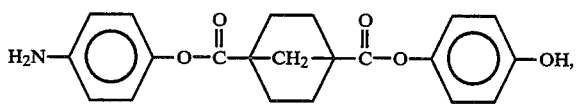
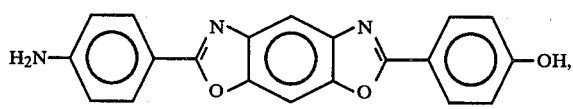 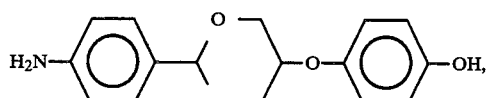
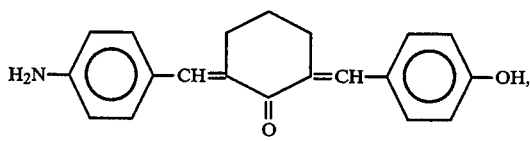 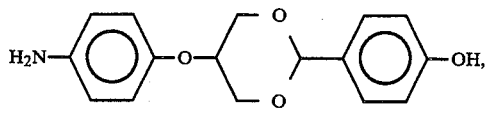
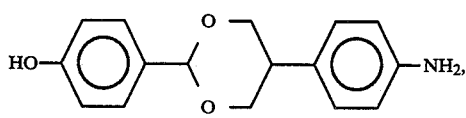 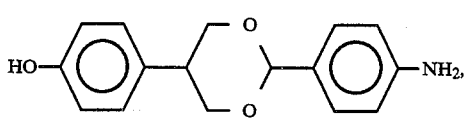
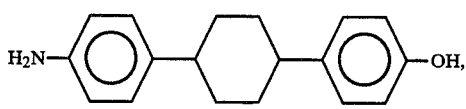 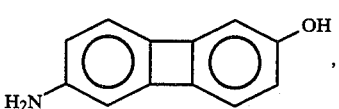
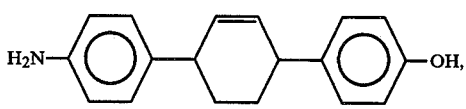 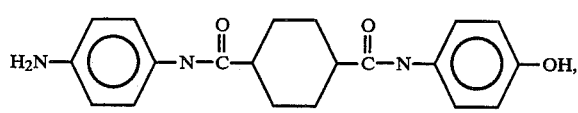
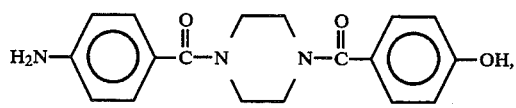 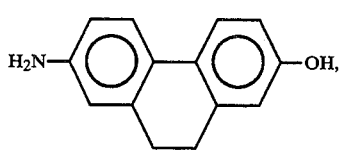
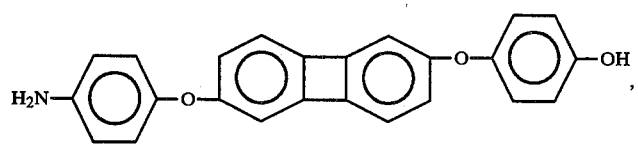

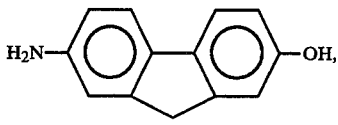
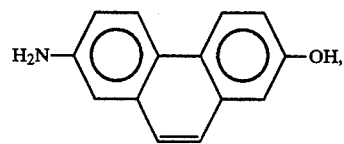
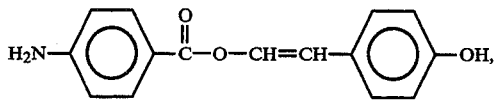
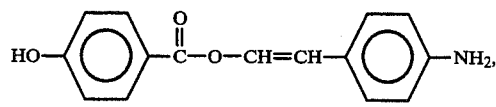
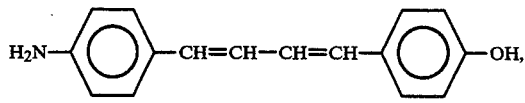
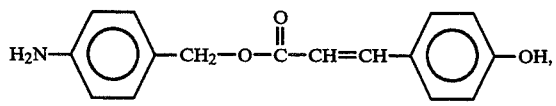
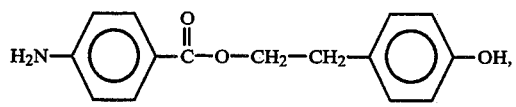
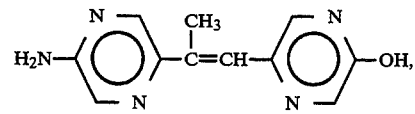
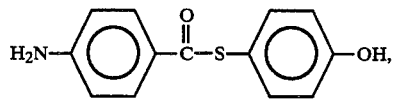
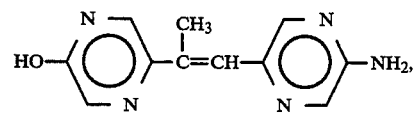
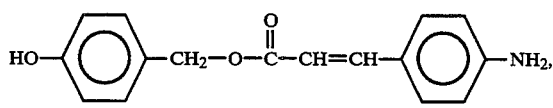
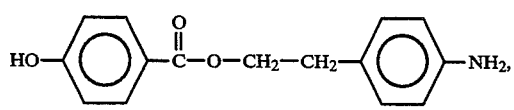
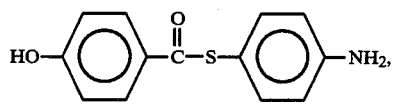

mixtures thereof and the like.

Representative of the aminocarboxylic acid compounds which are free of mesogenic or rodlike moieties include, for example, 2-aminobenzoic acid, 3-aminobenzoic acid, 4-aminobenzoic acid, 2-methoxy-4-aminobenzoic acid, 3,5-dimethyl-4-aminobenzoic acid, 3-cyclohexyl-4-aminobenzoic acid, 2,6-dibromo-4-aminobenzoic acid, 5-butyl-4-aminobenzoic acid, 3-phenyl-4-aminobenzoic acid, 4-(1-(3-aminophenyl)-1-methylethyl)-benzoic acid, 4-(1-(4-aminophenyl)ethyl)-benzoic acid, 4-(4-aminophenoxy) benzoic acid, 4-((4-aminophenyl)thio)-benzoic acid, (4-aminophenyl)(4-carboxyphenyl)methanone, 4-((4-aminopheny1)sulfonyl)benzoic acid, 4-(1-(4-amino-3,5-dibromophenyl)-1-methylethyl)-2,6-dibromobenzoic acid, glycine, N-methylglycine, 4-aminocyclohexane-carboxylic acid, 4-aminohexanoic acid, 4-piperidinecarboxylic acid, mixtures thereof and the like.

Representative of the aminocarboxylic acid compounds containing one or more mesogenic or rodlike moieties include, for example,

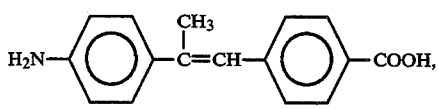
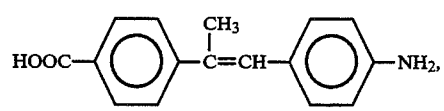
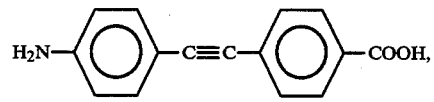
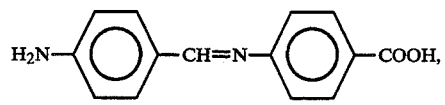
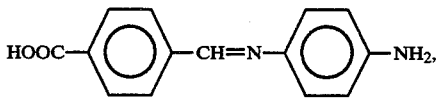
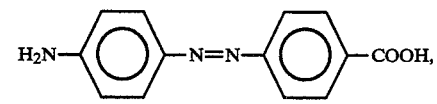

-continued
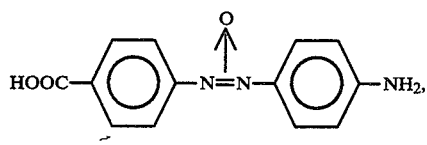
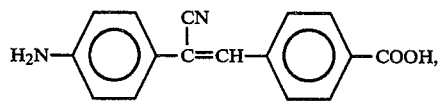
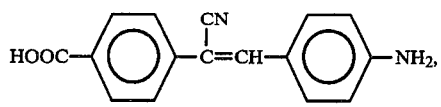
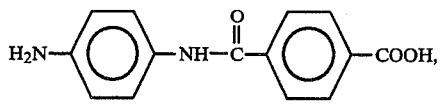
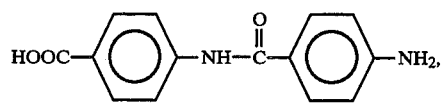
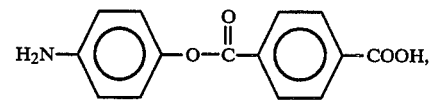
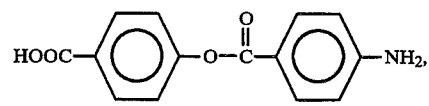
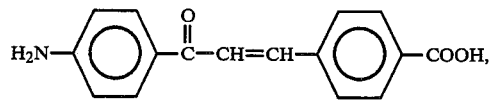
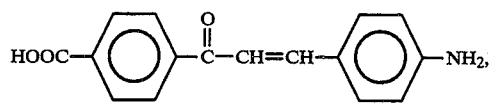
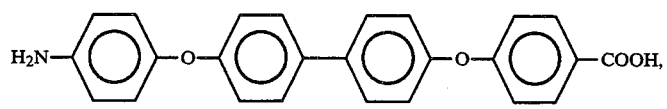
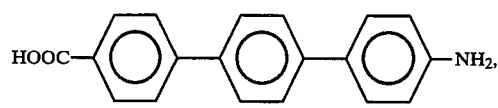
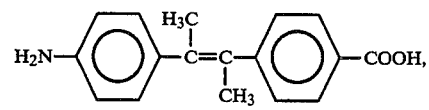
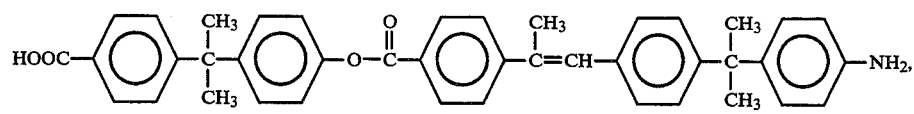
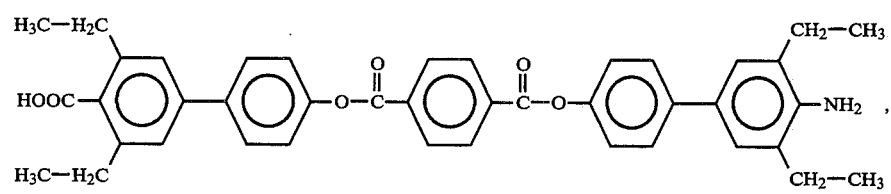
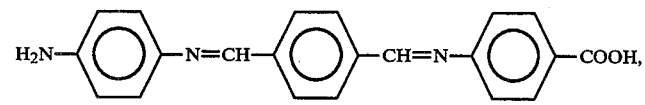
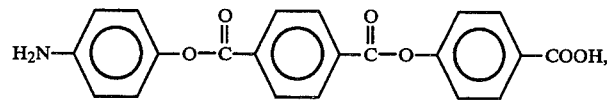
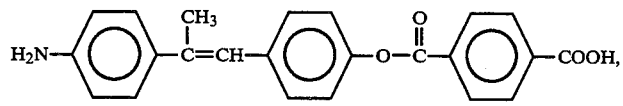
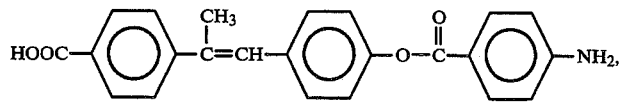

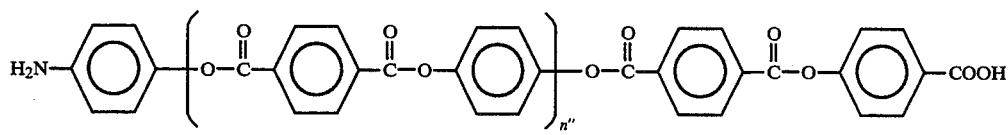
wherein n" has a value from 1 to about 10,
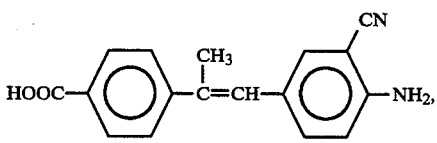
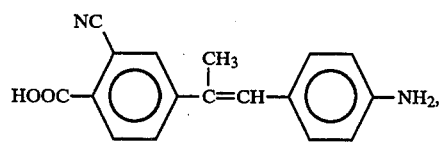
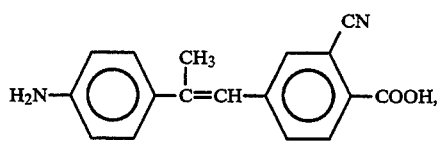
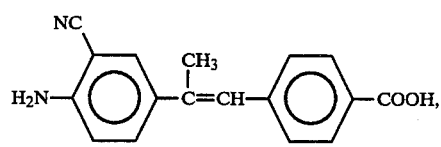
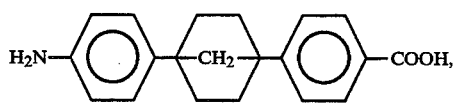
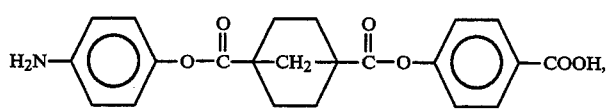
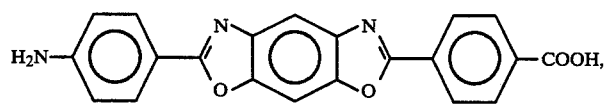
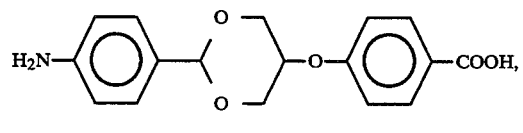
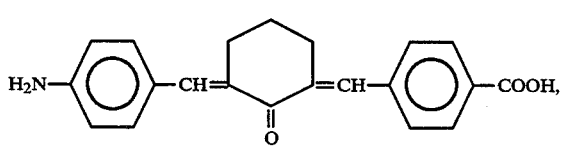
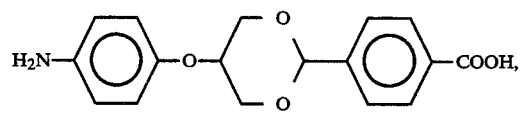
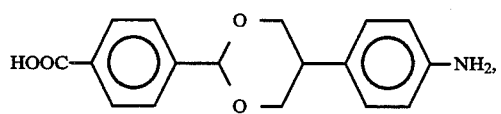
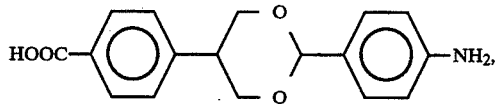
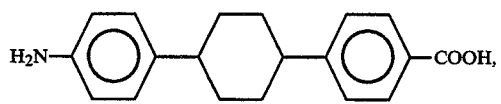
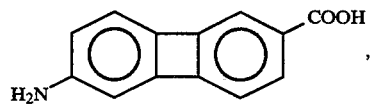,
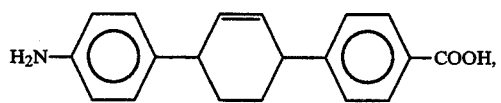
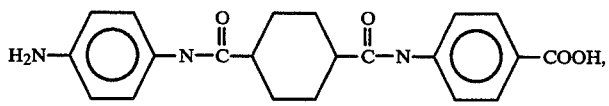
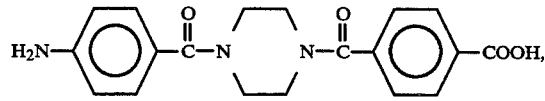
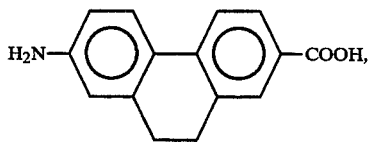

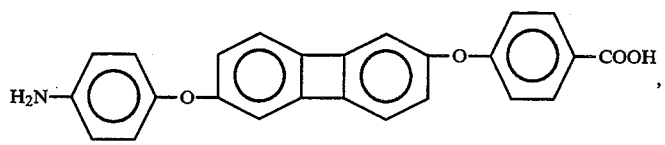

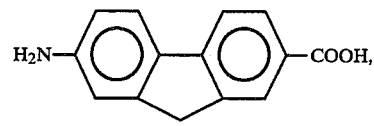
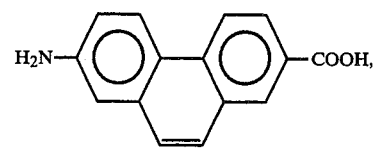

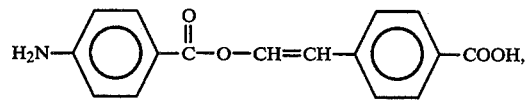
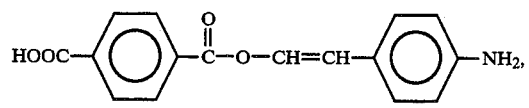

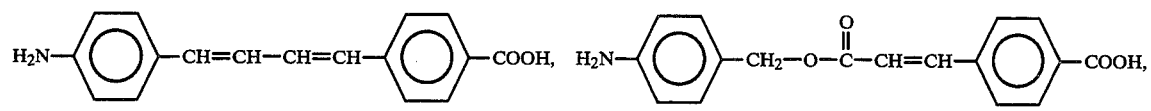
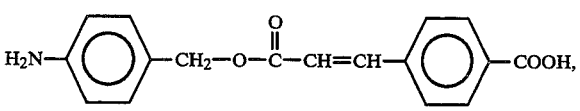

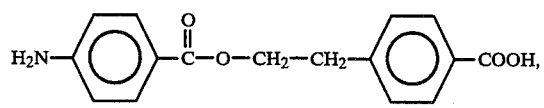
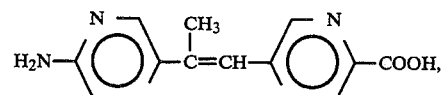

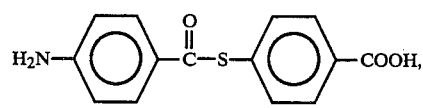
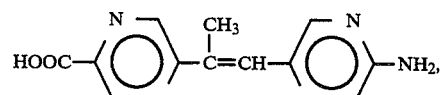

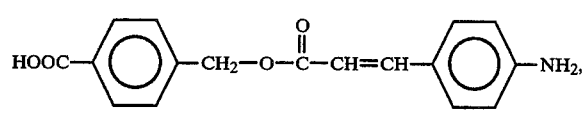
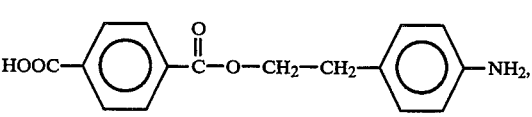

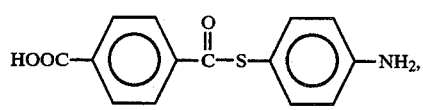

mixtures thereof and the like.

Representative of the phenolic hydroxyl containing carboxylic acid compounds which are free of mesogenic or rodlike moieties include, for example, 2-hydroxybenzoic acid, 3-hydroxybenzoic acid, 4-hydroxybenzoic acid, 2-methoxy-4-hydroxybenzoic acid, 3,5-dimethyl-4-hydroxybenzoic acid, 3-cyclohexyl-4-hydroxybenzoic acid, 2,6-dibromo-4-hydroxybenzoic acid, 5-butyl-4-hydroxybenzoic acid, 3-phenyl-4-hydroxybenzoic acid, 4-(1-(3-hydroxyphenyl)-1-methylethyl)benzoic acid, 4-(1-(4-hydroxyphenyl)ethyl)benzoic acid, 4-(4-hydroxyphenoxy)benzoic acid, 4-((4-hydroxyphenyl)thio)benzoic acid, (4-hydroxyphenyl)(4-carboxyphenyl)methanone, 4-((4-hydroxyphenyl) sulfonyl)benzoic acid, 4-(1-(4-hydroxy-3,5-dibromophenyl)-1-methylethyl)-2,6-dibromobenzoic acid, 4-hydroxyphenylacetic acid, 3-hydroxyphenylacetic acid, 2-hydroxyphenylacetic acid, 4-hydroxyphenyl-2-cyclohexanecarboxylic acid, 4-hydroxyphenoxy-2-propanoic acid mixtures thereof and the like.

Representative of the phenolic hydroxyl containing carboxylic acid compounds containing one or more mesogenic or rodlike moieties include, for example,

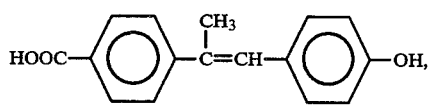
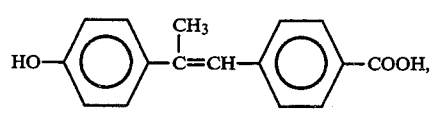

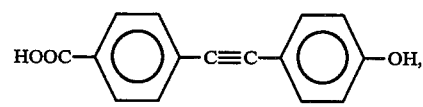
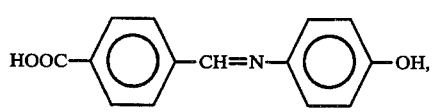

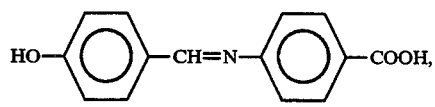
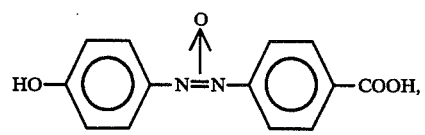
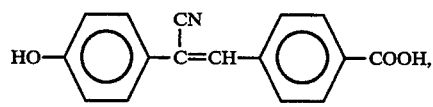
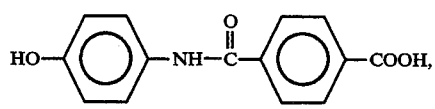
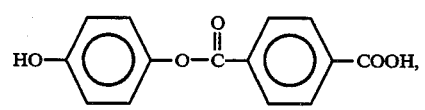
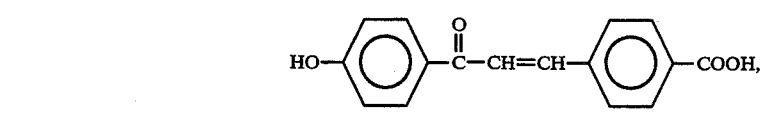
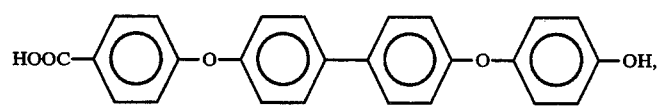
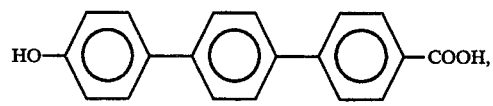
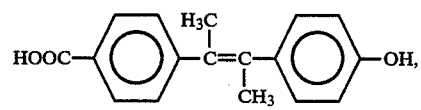
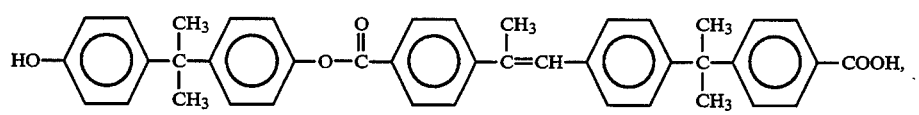
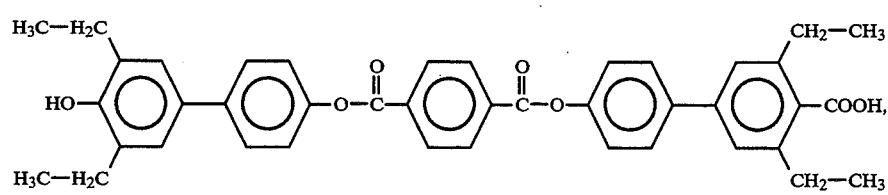
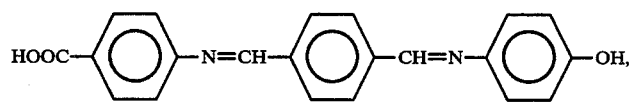
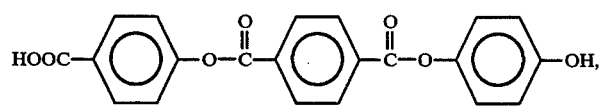
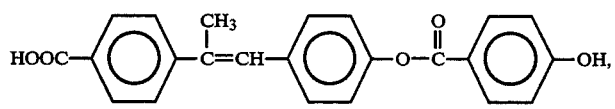

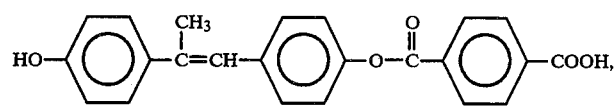
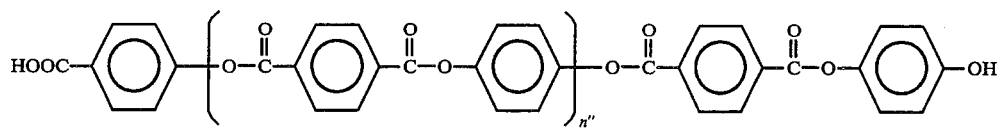
wherein n″ has a value from 1 to about 10,
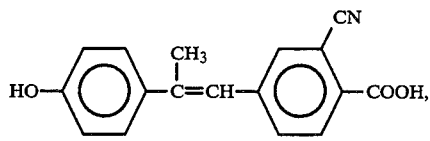
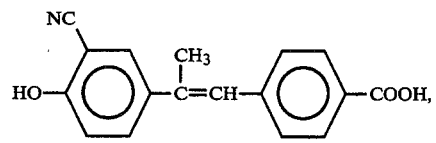
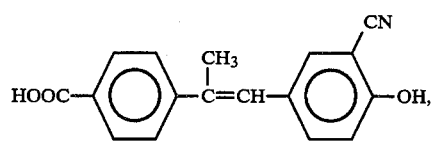
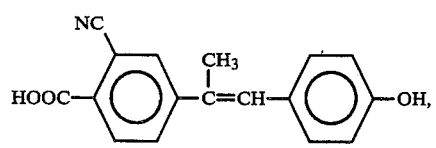
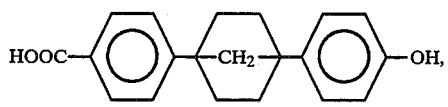
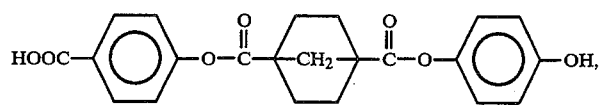
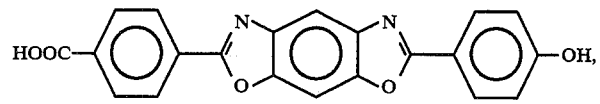
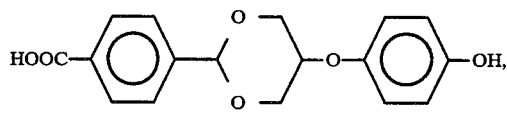
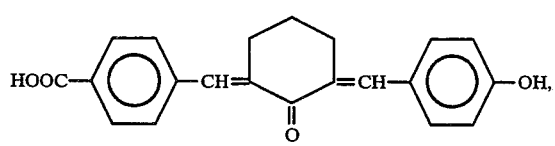
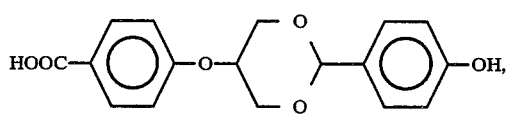
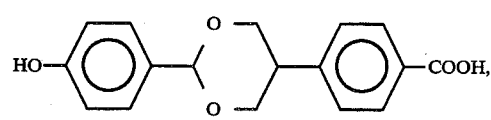
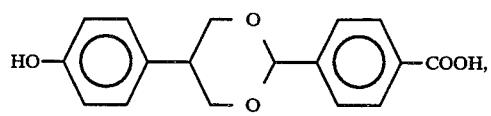
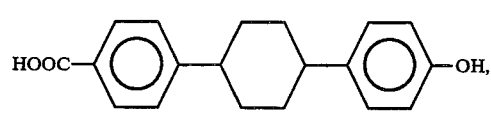
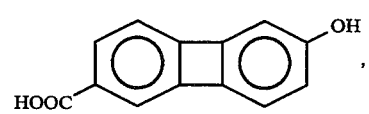
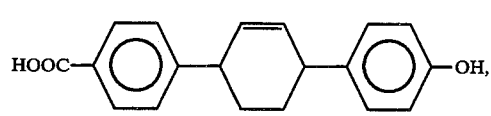
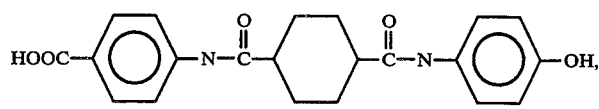

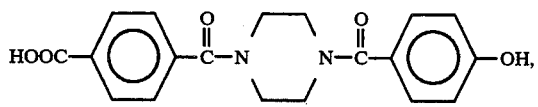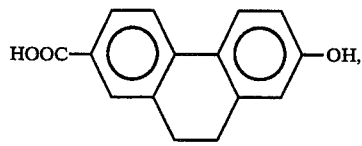

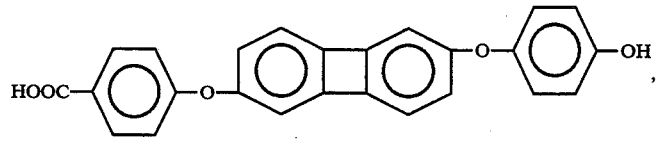

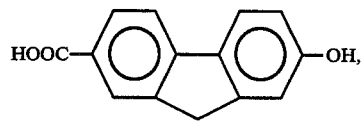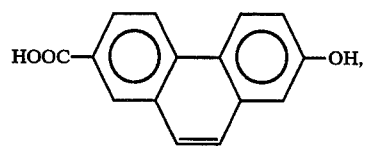

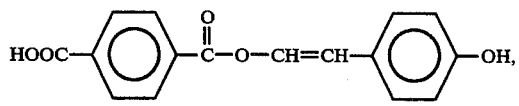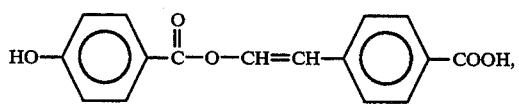

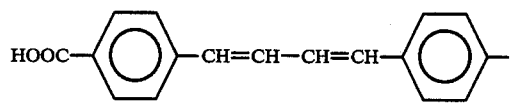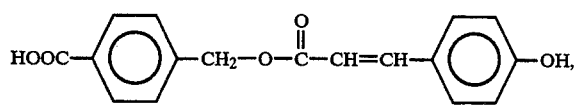

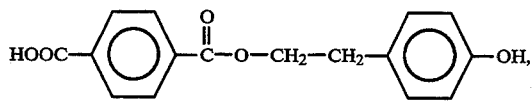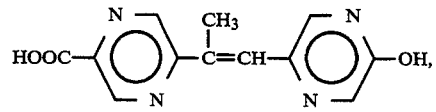

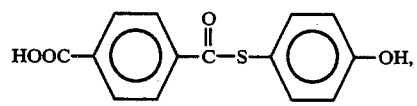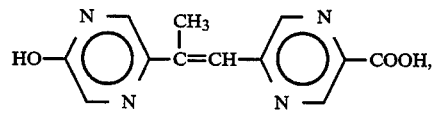

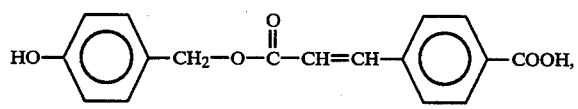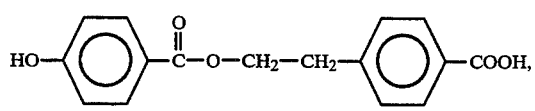

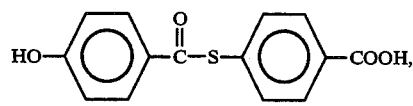

mixtures thereof and the like.

Representative of the sulfanilamide compounds which are free of mesogenic or rodlike moieties include, for example, o-sulfanilamide, m-sulfanilamide, p-sulfanilamide, 2,6-dimethyl-4-sulfonamide-1-aminobenzene, 2-methyl-4-sulfonamido-1-aminobenzene, 3,5-dimethyl-4-sulfonamido-1-aminobenzene, 3-methyl-4-sulfonamido-1-aminobenzene, 5-methyl-3-sulfonamido-1-aminobenzene, 3-phenyl-4-sulfonamido-1-aminobenzene, 4-(1-(3-sulfonamidophenyl)-1-methylethyl)aniline, 4-(1-(4-sulfonamidophenoxy)aniline, 4-((4-sulfonamidophenoxyl)ethyl)aniline, 4-((4sulfonamidophenyl)thio)aniline, (4-sulfonamidophenyl)(4-aminophenyl)methanone, 4-((4-sulfonamidophenyl)sulfonyl)aniline, 4-(1-(4-sulfonamido-3,5-dibromophenyl)-1-methylethyl)-2,6-dibromoaniline, 4-sulfonamido-1-N-methylaminobenzene, mixtures therof and the like.

Representative of the sulfanilamide compounds containing one or more mesogenic or rodlike moieties include, for example,

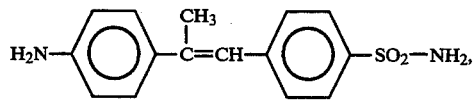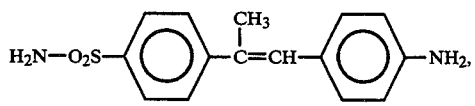

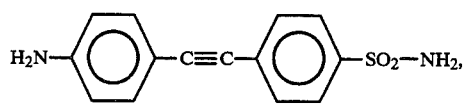
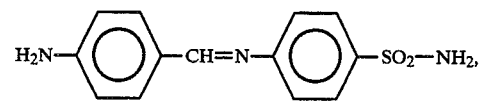
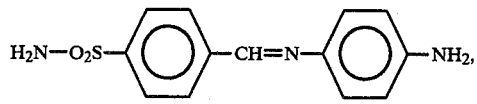
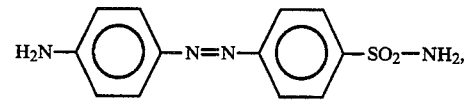
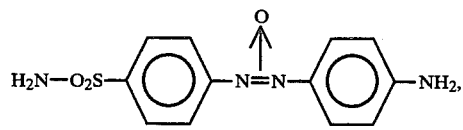
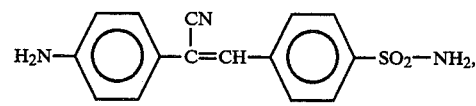
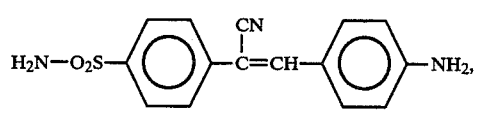
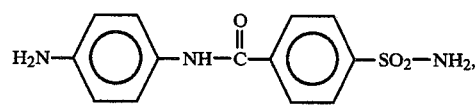
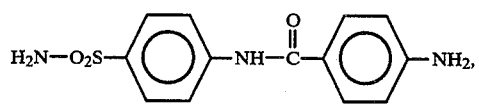
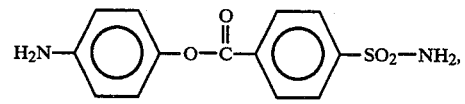
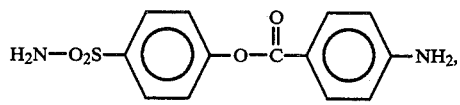
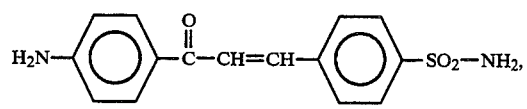
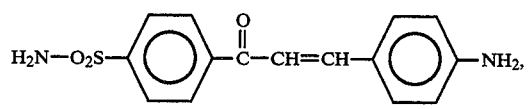
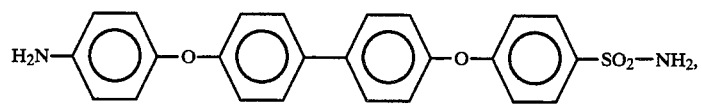
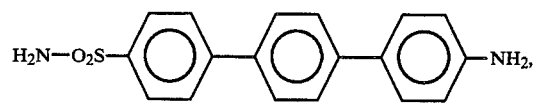
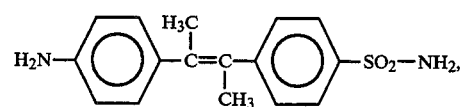
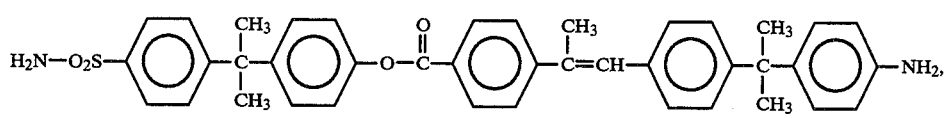
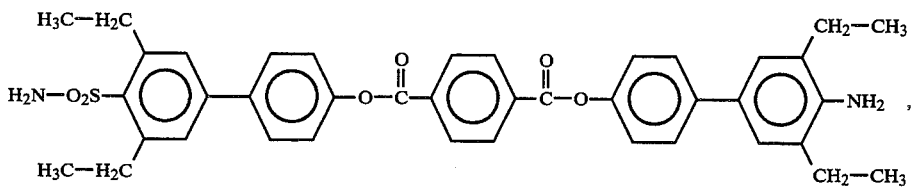
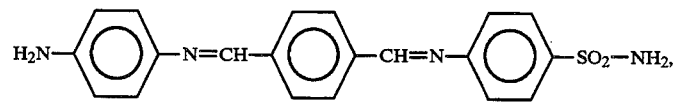
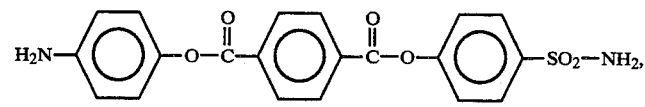

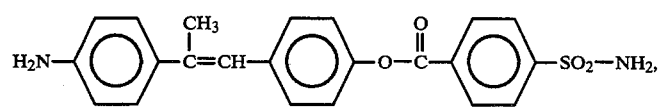
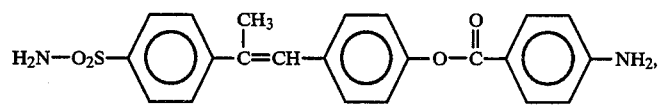
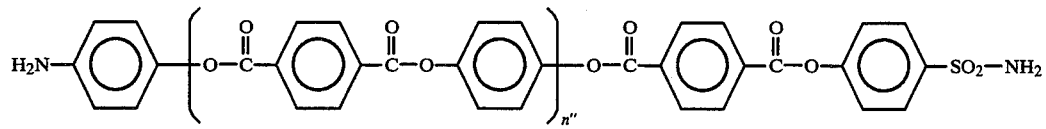
wherein n″ has an average value from about 1 to about 10,
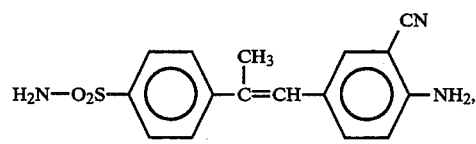
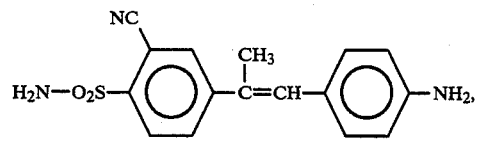
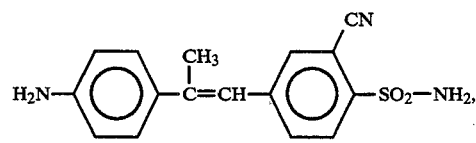
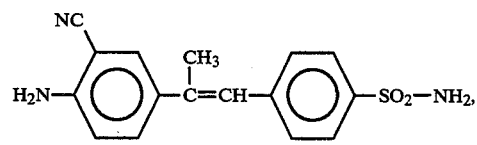
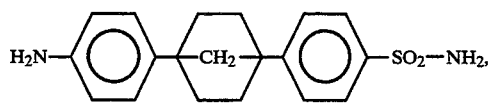
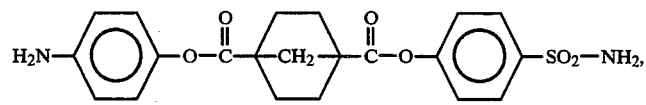
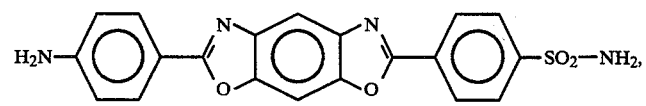
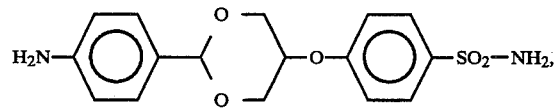
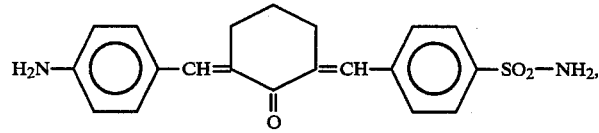
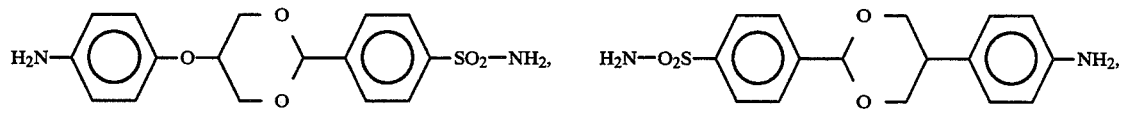
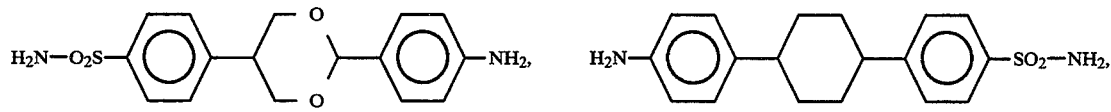

-continued
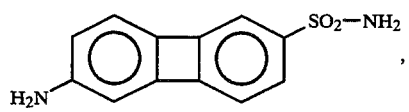
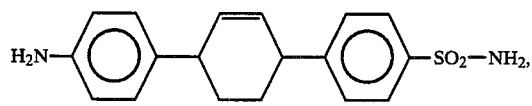
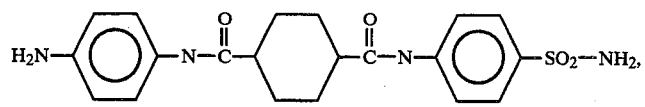
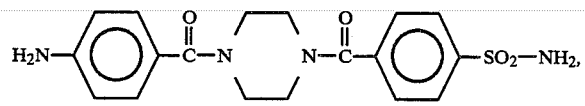
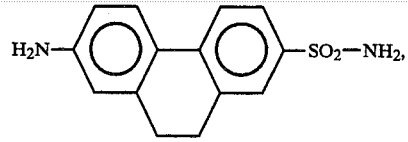
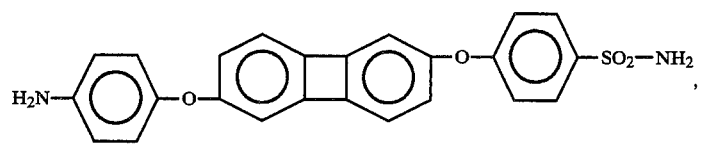
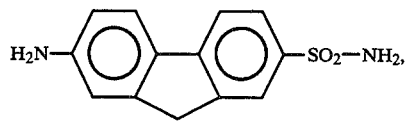
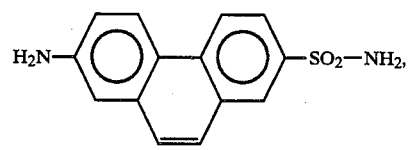
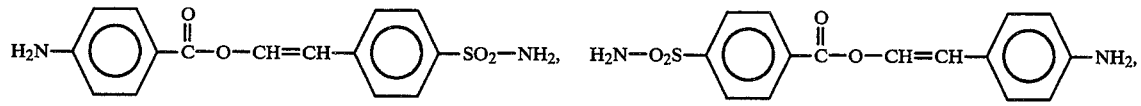
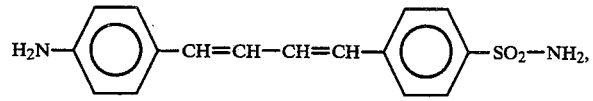
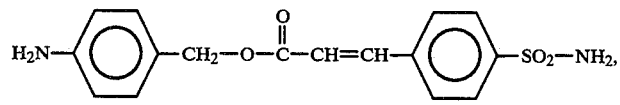
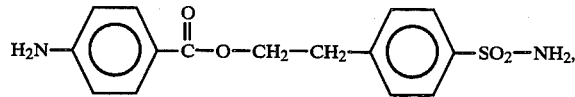
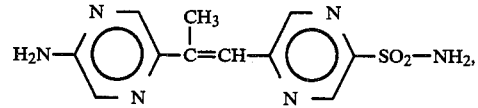
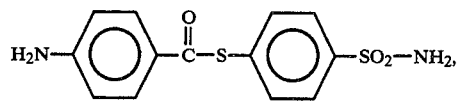
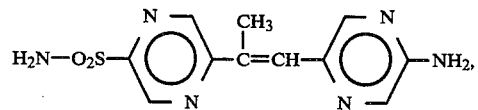
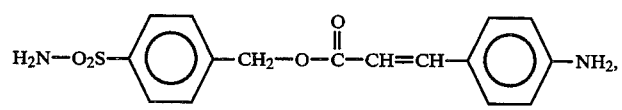
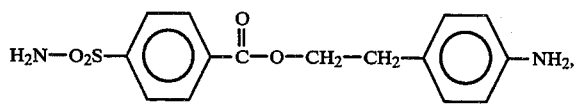
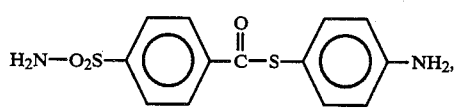
mixtures thereof and the like.

The adducts useful in the present invention are prepared by reacting (1) one or more epoxy resins with (2) one or more compounds containing two or more hydrogen atoms which are reactive with an epoxide group selected from the group consisting of (a) di- and polyphenols, (b) di- and polycarboxylic acids, (c) di- and polymercaptans, (d) di- and polyamines, (e) primary monoamines, (f) sulfonamides, (g) aminophenols, (h) aminocarboxylic acids, (i) phenolic hydroxyl containing carboxylic acids, (j) sulfanilamides, (k) mixtures thereof. The epoxy resin and the compound containing hydrogen atoms reactive with an epoxide group are employed in an amount sufficient to provide from about 2:1 to about 100:1, preferably from about 3:1 to about 20:1, most preferably from about 5:1 to about 10:1 equivalents of hydrogen reactive with an epoxide group (excluding secondary hydroxyl groups formed by epoxide ring opening reaction to form the adduct) per equivalent of epoxide group.

The term "reactive with an epoxide group", as employed in the preparation of the adduct means reactive at the conditions employed to prepare the adduct. There may be present hydrogen atoms which are nonreactive with the epoxide group at the conditions employed to prepare the adduct, but which are reactive at conditions at which an epoxy resin is cured with the resultant adduct. In which case, the hydrogen atoms which are not reactive with the epoxy resin at the conditions at which the adduct is prepared are not considered in the aforementioned reactive hydrogen to epoxide ratios.

The term "epoxy resin adduct" as used herein includes the epoxy resin wherein the terminal epoxide groups have been reacted in a ring opening reaction with the compound containing two or more hydrogen atoms which are reactive with an epoxide group to give the characteristic 2-hydroxypropyl functionality as a linkage between the residual epoxy resin structure and the residual structure from the compound containing two or more hydrogen atoms which are reactive with an epoxide group. A typical example is the reaction product of aniline and the glycidyl ether of 4,4'-dihydroxy-alpha-methylstilbene:

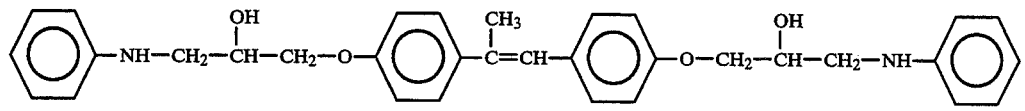

The adduct may also contain oligomeric components derived from reaction of epoxide groups from two separate epoxy resin molecules with two hydrogens in a molecule of the material containing two or more hydrogens which are reactive with an epoxide group. A typical example is shown for the reaction of aniline and the glycidyl ether of 4,4'-dihydroxy-alphamethylstilbene:

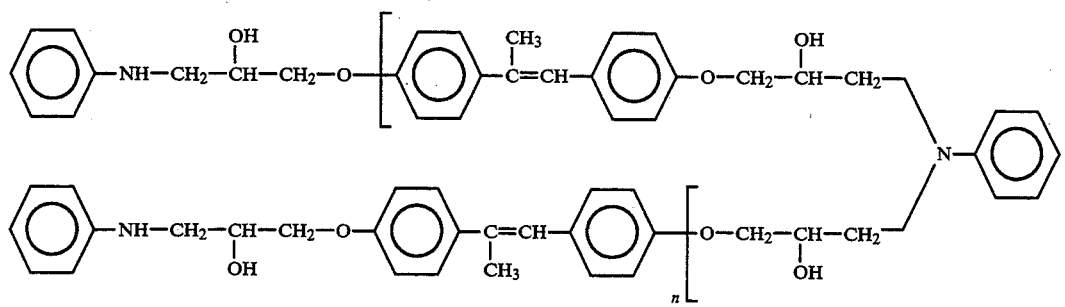

where n has a value of one or more.

The adduct may also contain unreacted material containing two or more hydrogens which are reactive with an epoxide group. Thus in the case of the reaction between aniline and the glycidyl ether of 4,4'-dihydroxy-alpha-methylstilbene, if stoichiometric excess of aniline is employed and not removed, it thus becomes a part of the adduct. The adduct may also contain branched or crosslinked structure derived from (A) reaction between an epoxide group and the hydroxyl group of a 2-hydroxypropyl linkage contained in said adduct, or (B) reaction between three separate epoxy resin molecules with three hydrogens in a molecule of the material containing two or more, in this case, more, hydrogens which are reactive with an epoxide group. A typical example of the former case, (A), is the reaction of a backbone hydroxyl group of the adduct of aniline and the diglycidyl ether of 4,4'-dihydroxy-alpha-methylstilbene with an epoxide group from a second molecule of the diglycidyl ether of 4,4'-dihydroxy-alpha-methylstilbene which has already been adducted with aniline at one epoxide group of the molecule:

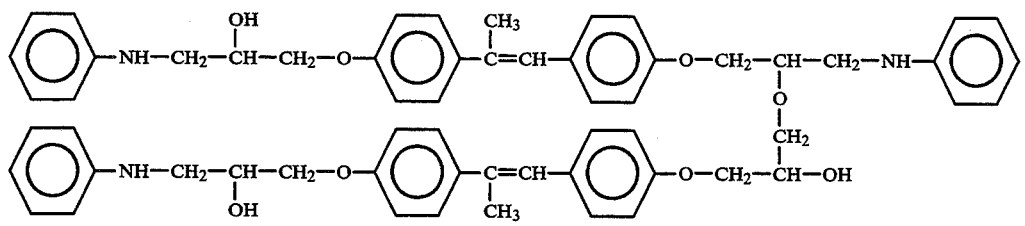

A typical example of the latter case, (B), is the reaction of an amino hydrogen of the adduct of diethylenetriamine and the diglycidyl ether of 4,4'-dihydroxy-alpha-methylstilbene wherein an epoxide group from a second molecule of the diglycidyl ether of 4,4'-dihydroxy-alpha-methylstilbene has already reacted with another amino hydrogen in the diethylenetriamine moiety (only one end of each of the epoxide molecules shown):

ture when a material containing more than two hydrogens reactive with an epoxide group is used.

The reaction to form the adducts may be conducted in the presence of one or more solvents. Solvents may be beneficially employed, for example, to improve the solubility of one or more reactants in the reactant mixture, to dissolve a solid reactant thus rendering it easier to meter into the reaction, or to dilute the concentration of reacting species as a means to moderate the adduct

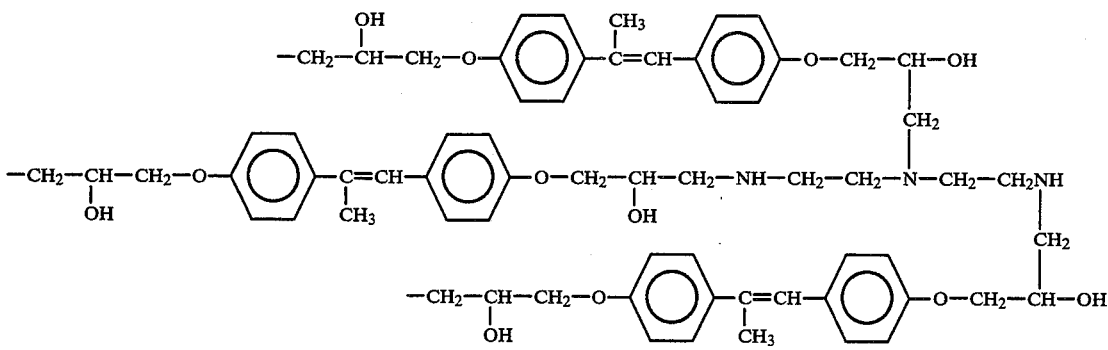

Minor amounts of other structures may be present in the adducts, for example, those which may be present in the epoxy resin reactant, such as, the 1,2-glycol group derived from hydrolysis of the epoxide group, or halomethyl groups caused by addition of epihalohydrin to the hydroxyl group of an intermediate halohydrin molecule.

A catalyst is optionally employed to prepare the adducts useful in the present invention. Suitable catalysts include the aforementioned phosphines, quaternary ammonium compounds, phosphonium compounds, tertiary amines, mixtures thereof and the like. The amount of catalyst used, if any, depends upon the particular reactants and catalyst employed; however, it is usually employed in quantities from about 0.01 to about 3, preferably from about 0.01 to about 1.5, most preferably from about 0.03 to about 0.75 percent by weight based upon the weight of the epoxy containing compound.

Reaction conditions for forming the adducts vary widely depending upon the type and amount of reactants employed, the type and amount of catalyst used, if any, the use of solvent(s), the mode of addition of the reactants employed, and other known variables. Thus, the reaction may be conducted at atmospheric, superatmospheric or subatmospheric pressures at temperatures of from about 0° C. to about 260° C., preferably from about 20° C. to about 200° C., most preferably from about 35° C. to about 160° C. The time required to complete the reaction depends not only upon the aforementioned variables, but also upon the temperature employed. Higher temperatures require shorter periods of time whereas lower temperatures require longer periods of time. Generally, however, times of from about 5 minutes to about one week, more preferably from about 30 minutes to about 72 hours, most preferably from about 60 minutes to about 48 hours are suitable. The reaction time and temperature profile employed can greatly influence the distribution of components comprising the adducts of the present invention, thus, higher reaction temperatures with their inherently shorter reaction times, generally induce the formation of more oligomeric component when a material containing two hydrogens reactive with an epoxide group is used, or, additionally, branched or crosslinked strucforming reaction and thus vary the distribution of components comprising the adduct. Suitable solvents include those which are substantially inert to reaction with any of the reactants employed or the adduct product formed therefrom. Thus the solvents and amounts of said solvents previously described for the advancement reaction are generally suitable for use in the adduct forming reaction.

The contacting together of (1) one or more epoxy resins and (2) one or more materials containing two or more hydrogens which are reactive with an epoxide group selected from the group consisting of (a) di- and polyphenols, (b) di- and polycarboxylic acids, (c) di- and polymercaptans, (d) di- and polyamines, (e) primary monoamines, (f) sulfonamides (g) aminophenols, (h) aminocarboxylic acids, (i) phenolic hydroxyl containing carboxylic acids, (j) sulfanilamides, (k) mixtures thereof may be done in any configuration which provides an adduct that is essentially free of epoxide groups. Thus, the epoxy resin component and the material containing two or more hydrogens which are reactive with an epoxide group may be directly mixed together and subjected to the aforesaid conditions conducive to reaction, or one component may be added to the other component in increments including up to continuous addition. If increments are added, all or a part of an added increment may be allowed to react prior to addition of the next increment. Generally, the incremental addition of the epoxy resin reactant to the bulk of the material containing two or more hydrogens which are reactive with an epoxide group favors an adduct composed of material wherein the terminal epoxide groups have been reacted in a ring opening reaction with said material containing two or more hydrogens which are reactive with an epoxide group to give the characteristic 2-hydroxypropyl functionality as a linkage between the residual epoxy resin structure and the residual structure from the material containing two or more hydrogens which are reactive with an epoxide group, and lesser amounts, if any, oligomeric component.

Various post treatments may be applied to the adducts as a means to vary the distribution of components comprising the adduct, to modify the reactivity of the adduct with an epoxy resin, to modify the physical state of the adduct, or for other known reasons. As a specific example, in the preparation of the adduct of aniline and the diglycidyl ether of 4,4'- dihydroxy-alpha-methylstilbene, a large stoichiometric excess of primary amine groups derived from the aniline, with respect to epoxide groups derived from the diglycidyl ether of 4,4'-dihydroxy-alpha-methylstilbene may be used to favor an adduct with a low content of oligomeric component, type of functional group with the epoxide group while leaving substantially unreacted the second type of functional group. As a typical example, p-N-methylaminomethylphenol reacted under mild conditions (low temperature and long reaction time using incremental or slow continuous addition of the epoxy resin in a solvent to the aminophenol in a solvent) with the diglycidyl ether of 4,4'-dihydroxy-alphamethylstilbene favors the phenolic terminated adduct:

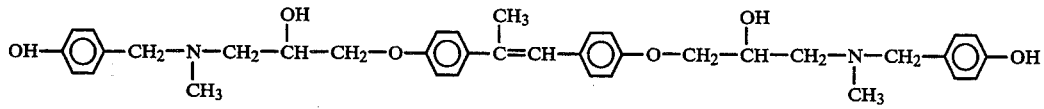

however, the finished reaction product now contains, as a part of the adduct composition, a high concentration of aniline as the unreacted material containing two or more hydrogens which are reactive with an epoxide group. In the method of the present invention, post treatment of the adduct via vacuum distillation to strip out the unreacted aniline may be employed. Many other alternate methods of post treatment to vary the distribution of the components comprising the adducts of the present invention may be employed, shch as, for example, recrystallization, chromatographic separation, zone refining, crystal refining, wiped film distillation, extraction, preferential chemical derivatization of one or more components of said adduct followed by its removal, combinations thereof and the like. Another class of post treatments of the adducts of the present invention involves the addition of one or more components to the epoxy resin to modify one or more properties of said adduct. For example, one or more accelerators or retarding agents may be blended with the finished adduct to modify its subsequent reactivity in curing of an epoxy resin. As a second example, one or more epoxy resin curing agentst such as, for example, those delineated herein may be added to the finished adduct.

The many factors delineated above which can be manipulated to influence the composition of the adducts are beneficially used in conjunction with each other rather than separately. Thus, incremental or slow continuous addition of the epoxide reactant to a large stoichiometric excess of the material containing two or more hydrogens which are reactive with an epoxide group maintained at a relatively low reaction temperature, followed by removal of the excess unreacted material containing two or more hydrogens which are reactive with an epoxide group, favors an adduct composed of material wherein the terminal epoxide groups have been reacted in a ring opening reaction with said material containing two or more hydrogens which are reactive with an epoxide group to give the characteristic 2-hydroxypropyl functionality as a linkage between the residual epoxy resin structure and the residual structure from the material containing two or more hydrogens which are reactive with an epoxide group, and lesser amounts, if any oligomeric component.

Certain of the compounds containing two or more hydrogens which are reactive with an epoxide group which possess dual functional groups, that is, (2-g) aminophenols, (2-h) aminocarboxylic acids and (2-i) phenolic hydroxyl containing carboxylic acids and (2-j) sulfanilamides represent compounds which may be utilized under conditions to provide differential reactivity of said functional groups with the epoxide group. Thus, the adduct can be formed by preferential reaction of one Catalysis favoring reaction of one functional group over another with the epoxide group may also beneficially be employed.

Certain of the adducts useful in the present invention may also be prepared via reaction of one or more monoepoxide compounds with one or more compounds containing four or more hydrogen atoms which are reactive with an epoxide group. A typical example is the adduct prepared by reaction of an aromatic primary diamine such as, 4,4'-diaminodiphenyl methane or 4,4'-diaminostilbene with a monoepoxide such as, phenylglycidyl ether, in a 2:1 amine hydrogen to epoxide equivalent ratio.

VINYLIZATION

The partially vinylized adduct is most preferably prepared by in situ reaction of a compound possessing a group reactive with a reactive hydrogen atom in said adduct and a polymerizable ethylenically unsaturated group. The resulting product is an adduct wherein a portion of the reactive hydrogen atoms therein have been converted to groups containing polymerizable ethylenic unsaturation. Alternately, the adduct wherein a portion of the reactive hydrogen atoms therein have been converted to groups containing polymerizable ethylenic unsaturation can be prepared separately and added to the adduct before or during addition and copolymerization with one or more polymerizable ethylenically unsaturated monomers.

Suitable compounds which are reacted with one or more of the adducts to provide a portion of the adduct with a polymerizable ethylenically unsaturated group include most any compound possessing a group reactive with a reactive hydrogen atom in said adduct and a polymerizable ethylenically unsaturated group. Representative of said compounds are the ethylenically unsaturated carboxylic acid halides such as, for example, acryloyl chloride, methacryloyl chloride; the ethylenically unsaturated monoepoxides such as, for example, glycidyl acrylate, glycidyl methacrylate, p-isopropenylphenylglycidyl ether; the ethylenically unsaturated carboxylic acid anhydrides such as, for example, maleic anhydrider itaconic anhydride, citraconic anhydride; the ethylenically unsaturated monoisocyanates such as, for example, p-isopropenyl phenylisocyanate, isocyanatoethylmethacrylate; and monoesterified α,β-unsaturated dicarboxylic acid halides such as, for example, fumaric acid chloride methyl monoester, itaconic acid chloride ethyl monoester, and the like. Most preferred as the compound for partial vinylization of the adduct is acryloyl or methacryloyl chloride.

These compounds containing a group reactive with a reactive hydrogen atom in an adduct and a polymerizable ethylenically unsaturated group are employed in amounts which result in from about 0.005 to about 10, preferably from about 0.05 to about 5, most preferably from about 0.1 to about 3 mole percent of the reactive hydrogen atoms in the adduct having been reacted with such compound(s).

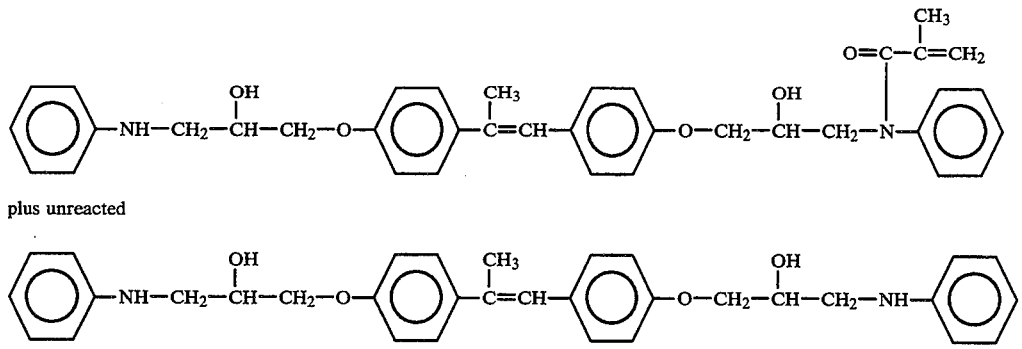

plus unreacted

The vinylization reaction is usually conducted at temperatures of from about −10° C. to about 125° C., preferably from about 0° C. to about 100° C., more preferably from about 20° C. to about 80° C.

A suitable basic acting compound, such as those previously delineated herein, is optionatly, although preferably, employed to facilitate reaction of an ethylenically unsaturated carboxylic acid halide or monoesterified α, β-unsaturated dicarboxylic acid halide with the adduct. A suitable catalyst is optionally, although preferably, employed to facilitate reaction of an ethylenically unsaturated monoepoxide, an ethyienically unsaturated carboxylic acid anhydride or an ethylenically unsaturated monoisocyanate with the adduct. Said catalysts are well known and include, for example, the previously mentioned phosphines, quaternary ammonium compounds, phosphonium compounds, and tertiary amines for catalysis of the reaction of the epoxide group; tertiary amines or pyridines for catalysis of the reaction of the carboxylic acid anhydride group; and tertiary amines or tin salts for catalysis of the reaction of the isocyanate group. Said catalysts are typically used in amounts from about 0.01 to about 2.0 percent by weight of the compound possessing a group reactive with a reactive hydrogen atom in an adduct and a polymerizable ethylenically unsaturated group used. If desired, it is possible to incorporated a polymerization inhibitor into the reaction mixture in order to reduce the possibility of premature free radical initiated polymerization of the ethylenically unsaturated groups. Examples of such inhibitors include hydroquinone, 2,6-di-tertiary-butyl-4-methylphenol, and phenothiazine.

In a typical example, the previously described adduct of aniline and the glycidyl ether of 4,4'-dihydroxy-alpha-methylstilbene is reacted in the presence of an inert solvent and basic acting compound with methacryloyl chloride in an amount sufficient to vinylize 2 mole percent of the reactive hydrogen atoms in said adduct. The partially vinylized adduct is recovered wherein a portion of the >N—H groups have been converted to groups containing polymerizable ethylenic unsaturation of the following structure:

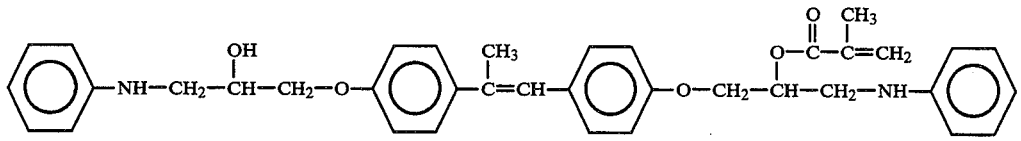

Additionally, it is possible that a portion of the —OH groups have been converted to groups containing polymerizable ethylenic unsaturation as per the following structure:

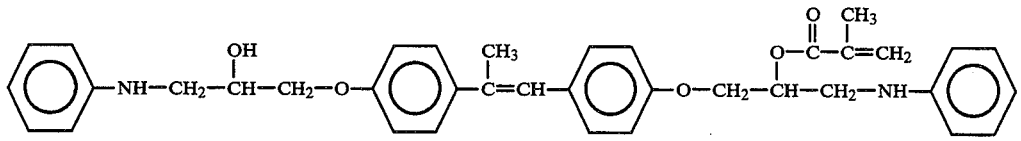

Additional possible structures include those wherein more than one >N—H and/or —OH group per molecule have been converted to groups containing polymerizable ethylenic unsaturation.

POLYMERIZABLE MONOMERS

Suitable polymerizable ethylenically unsaturated monomers containing one or more mesogenic or rigid rodlike moleties are cataloged by Alexandre Blumstein in *Liquid Crystalline Order in Polymers* published by Academic Press, New York (1978), Alexandre Blumstein in *Mesomorphic Order in Polymers and Polymerization in Liquid Crystalline Media* published by American Chemical Society (ACS Symposium Series 74), Washington, D.C. (1978), and N. A. Plate and V. P. Shibaev in *Comb-Shaped Polymers and Liquid Crystals* published by Plenum Press, New York (1987), as well as V. Percec, et. al., *Polymer Bulletin*, 17, pages 347–352 (1987); R. Duran and P. Gramain, *Makromol. Chem.*, 188, pages 2001–2009 (1987); A. M. Mousa, et. al., *Polymer Bulletin*, 6, pages 485–492 (1982); H. Finkelmann, et. al., *Makromol. Chem.*, 179, pages 829–832 (1978); M. Portugall, et. al., *Makromol. Chem.*, 183, pages 2311–2321 (1982) and U.S. Pat. Nos. 4,637,896 and 4,614,619, all of which are incorporated herein by reference. Suitable polymerizable ethylenically unsaturated monomers containing one or more mesogenic or rigid rodlike moleties per molecule are represented by the Formulas XXVII or XXVIII:

$$M-Q^1 \qquad (XXVII)$$

$$M-(Q^2)_n-R'-Q^1 \qquad (XXVIII)$$

wherein n and $R^1$ are as hereinbefore defined, M is a group containing two or more aromatic rings bridged by a rigid central linkage, R' is a divalent hydrocarbon group having from one to about 12 carbon atoms and may be linear, branched, cyclic, aromatic or a combination thereof and may be substituted with one or more inert groups, such as, for example, a methoxy group, or may contain one or more-inert heteroatom containing linkages, such as, for example, an ether linkage; $Q^2$ is —O—, —NR$^1$—, —S—, —O—CO—, —CO—O—, —NR$^1$—CO—, —CO—NR$^1$—, —CO—, —O—CO—O—, —S—CO—, —CO—S—, —NR$^1$—CO—O—, —O—CO—NR$^1$—, —NR$^1$—CO—NR$^1$—; adn $Q^1$ is a polymerizable ethylenically unsaturated group. As a class, these monomers generally contain a —CH=CH$_2$, allyl, methallyl, propenyl, isopropenyl, acrylate or methacrylate group as the polymerizable ethylenically unsaturated group and a linear divalent aliphatic, aliphatic ether, aliphatic polyether, aliphatic thioether or cycloaliphatic flexible spacer connecting the polymerizable ethylenically unsaturated group and the mesogenic or rigid rodlike group(s) through a heteroatom linkage. Typical mesogenic or rigid rodlike groups include those wherein two or more aromatic rings are bridged by a rigid central linkage wherein said rigid central linkage is required to bridge the aromatic rings to provide at least about 80 percent para substitution. The aromatic rings can be inertly substituted, however, unsubstituted aromatic rings which maximize the molecular aspect ratio are preferred. Also preferred is a single inert substituent in the para position on the ring not connected to the polymerizable ethylenically unsaturated group (either directly or via a flexible spacer). This type of substituent can be used to enhance the molecular aspect ratio. Typical of these inert substituents are CH$_3$O—, Cl—, NO$_2$—, —C≡N and the like. The aromatic rings can also contain one or more heteroatoms selected from N, O, S and the like. Typical rigid central linkage groups for bridging the aromatic rings include, for example, a direct bond, —CR$^1$=CR$^1$—, —C≡C—, —N=N—, —CR$^1$=N—, —CR$^1$=N—N=CR$^1$—, —CR$^1$=CR$^1$—CO—, —O—CO—, —NR$^1$—CO—, —CO—O—, —CO—NR$^1$—, —CO—CR$^1$=CR$^1$—, —CR$^1$=CR$^1$—O—CO—(CHR$^1$)n'—, —N=CR$^1$—, —(CHR$^1$)n'—CO—O—CR$^1$=CR$^1$—, —CR$^1$=CR$^1$—O—CO—, —CO—O—CR$^1$=CR$^1$—, —CO—O—N=CR$^1$—, —CR$^1$=N—O—CO—, —CR$^1$=CR$^1$—CO—O—, —CO—S—, —O—CO—CR$^1$=CR$^1$—, —CR$^1$=CR$^1$—CO—O—(CHR$^1$)n'—, —S—CO—, —(CHR$^1$)n'—O—CO—CR$^1$=CR$^1$—, —CHR$^1$—CHR$^1$—CO—O—, —O—CO—CHR$^1$—CHR$^1$—, —C≡C—C≡C—, —CR$^1$=CR$^1$—CR$^1$=CR$^1$—, —CO—NR$^1$—NR$^1$—CO—,

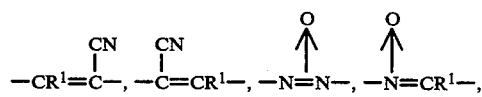
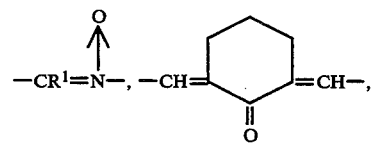

-continued

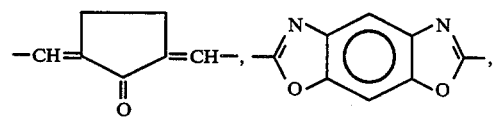
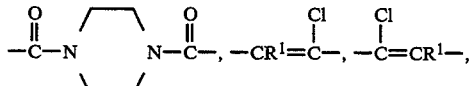
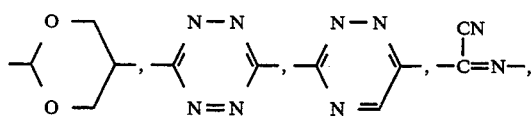
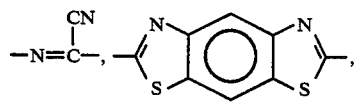
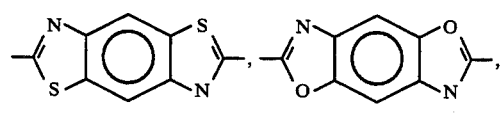
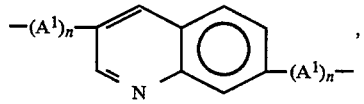
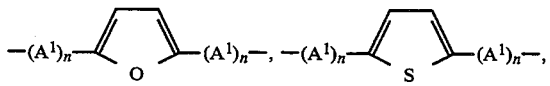
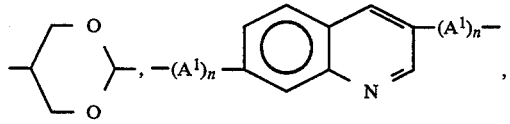
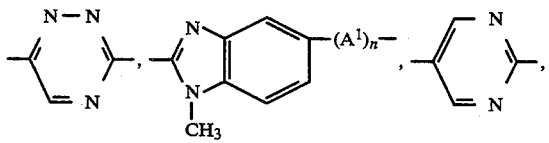
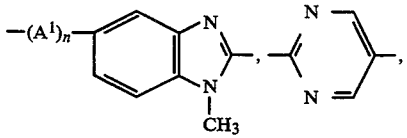
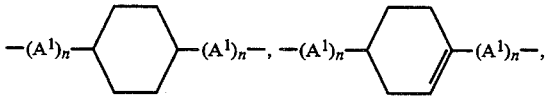
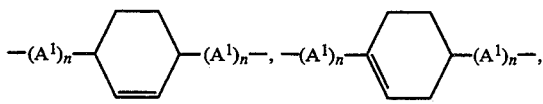
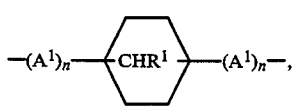

-continued

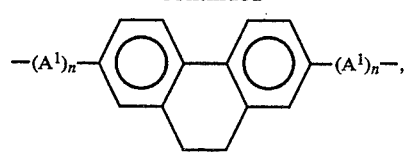

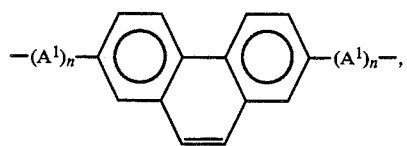

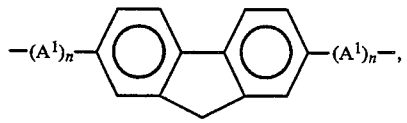

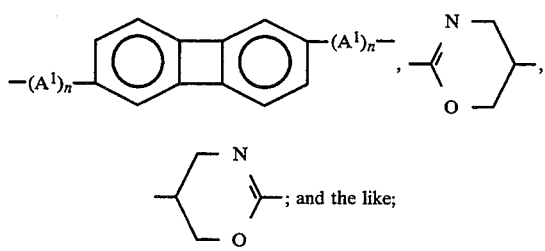

wherein $R^1$, $A^1$, n and n' are as hereinbefore defined. As is well known in the prior art, all or a part of the aromatic rings can be replaced with other promesogenic structures, such as, for example, the trans-cyclohexane ring or a cholesterol group. Additionally, it is has been demonstrated in the prior art that efficacious mesogenic or rigid rodlike containing polymerizable ethylenically unsaturated monomers can be prepared with omission of the flexible spacer between the polymerizable ethylenically unsaturated group and the mesogenic or rigid rodlike group(s).

Generally, the ethylenically unsaturated monomers containing $-CH=CH_2$, acryiate, allyl, methallyl, propenyl, isopropenyl or methacrylate as the polymerizable vinyl group and a linear divalent hydrocarbon group connecting the vinyl group and the mesogenic or rigid rodlike group through heteroatom containing functional groups between the hydrocarbon spacer and the mesogenic group are most preferred. Thus, a mesogenic group ether linked to a $-CH_2-CH_2-$ which is in turn linked to provide a methacrylate ester, that is,

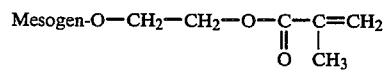

or a mesogenic group linked to a vinyl group, that is,

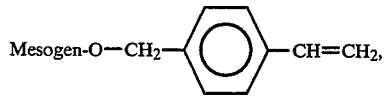

are examples of those species most preferred as the ethylenically unsaturated monomer containing one or more mesogenic or rigid rodlike moieties.

Particularly suitable ethylenically unsaturated monomers containing a mesogenic or rigid rodlike moiety include, for example,

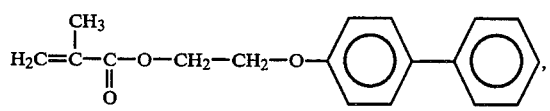

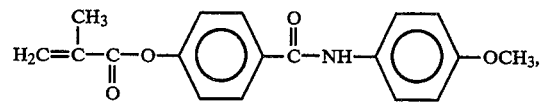

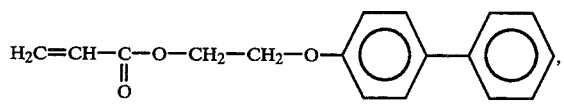

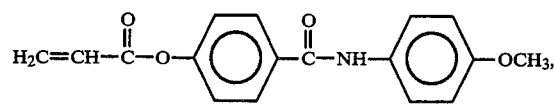

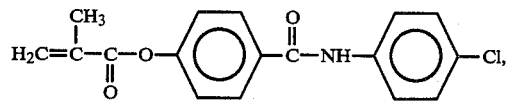

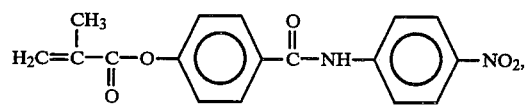

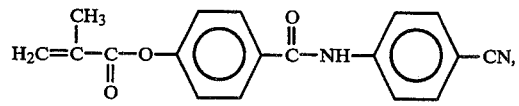

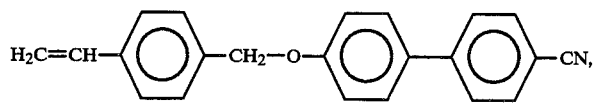

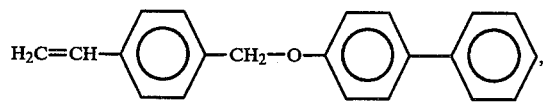

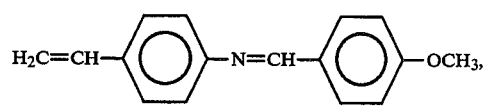

-continued
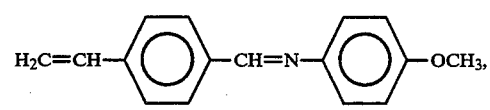 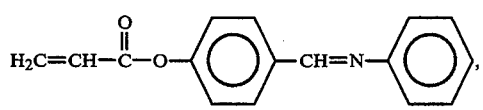
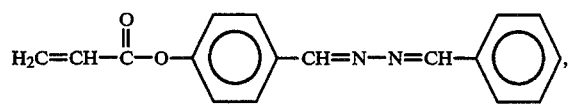 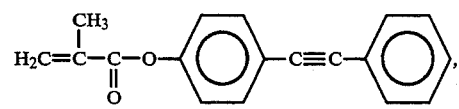
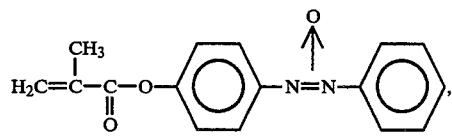
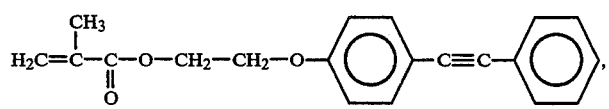
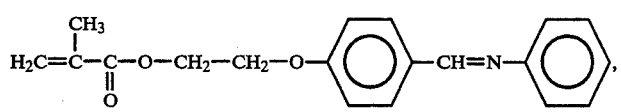
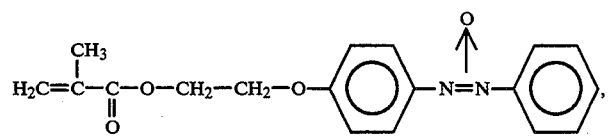
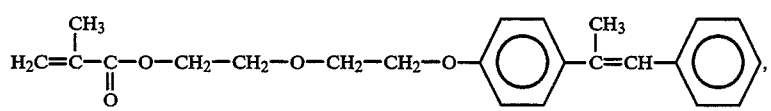
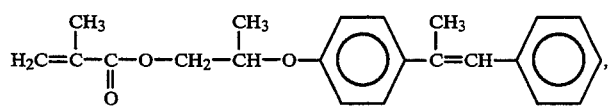
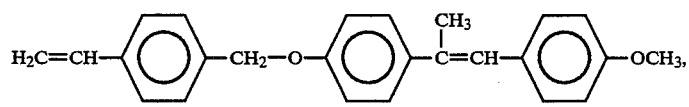
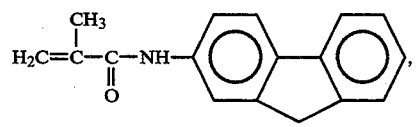
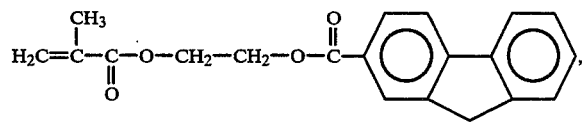
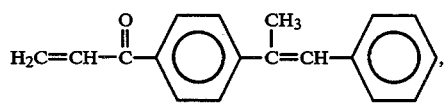 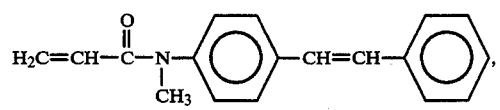
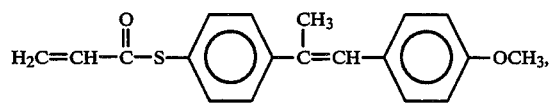

-continued
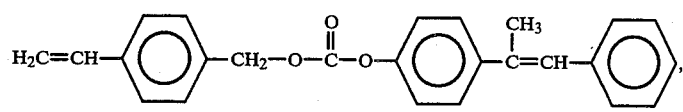
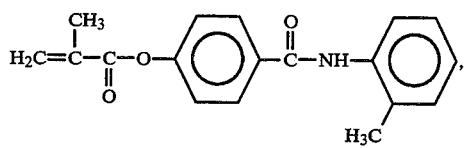
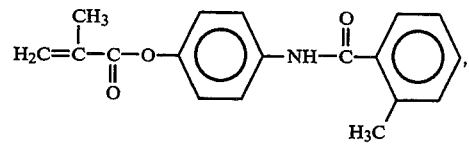
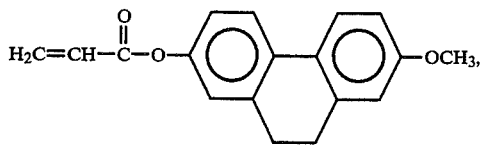
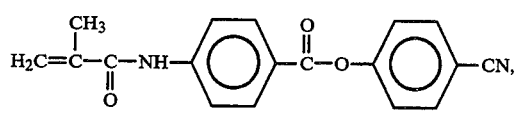
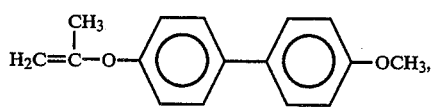
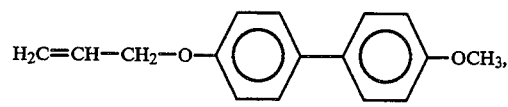
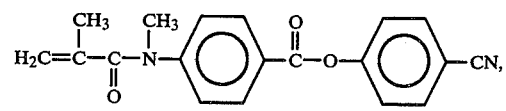
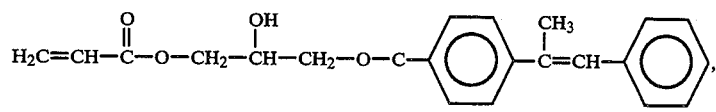
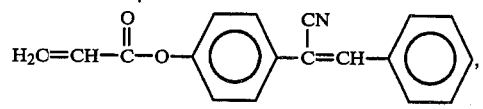
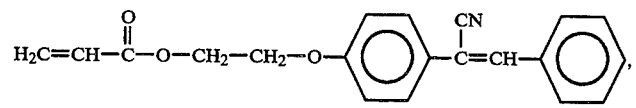
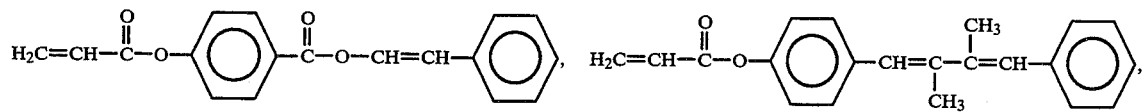
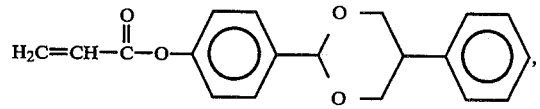
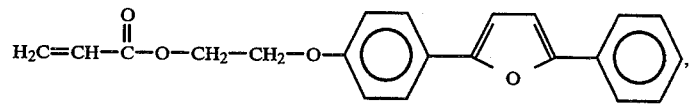
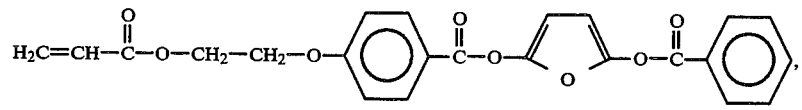
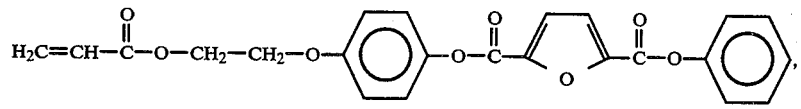

-continued

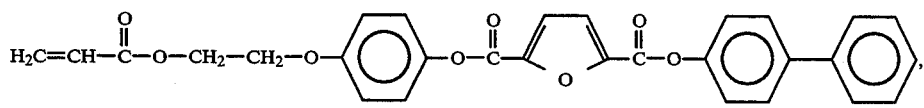

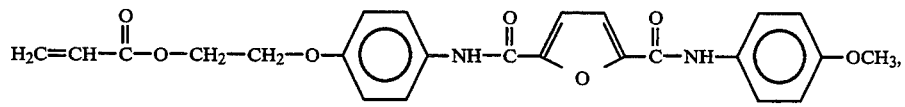

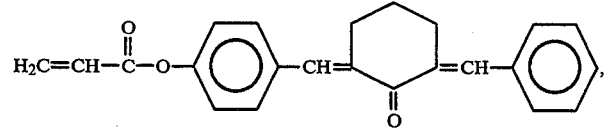

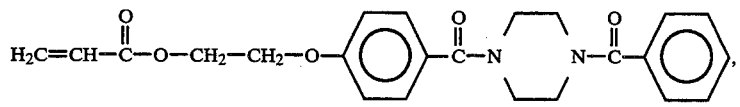

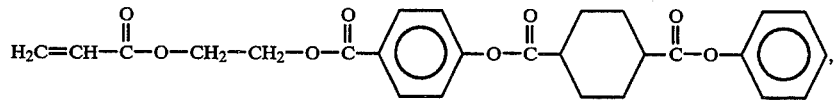

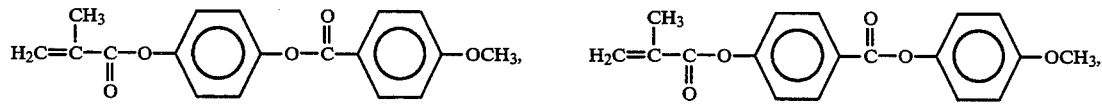

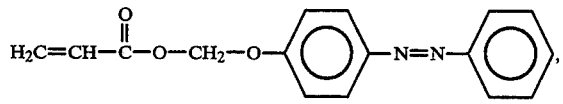

any combination thereof and the like.

Representative of the polymerizable ethylenically unsaturated monomers which are free of mesogenic or rodlike moieties include, for example, the vinyl aromatic compounds such as styrene, alphamethylstyrene, vinyl toluenes, halogenated styrenes, t-butylstyrenes, divinylbenzenes; the alkyl, such as methyl, ethyl, n-butyl, isopropyl, actyl, stearyl esters of acrylic or methacrylic acid; acidic monomers such as acrylic acid, methacrylic acid or crotonic acid; amide monomers such as acrylamide and N-alkylacrylamides; allyl monomers such as diallylphthalate, triallylisocyanurate, diallylmaleate and dimethallylfumarate; mixtures thereof and the like.

COPOLYMERIZATION

The copolymerization of the partially vinylized adduct and one or more polymerizable ethylenically unsaturated monomers is effected in the usual fashion, that is by application of heat and/or pressure, typically in the presence of one or more free radical forming catalysts. One or more inert solvents can also be used in the polymerization reaction. The term inert means that little, if any, reaction between the solvent. and the reactants or polymer product occurs. Methodology for radical and ionic chain polymerizations are delineated by G. G. Odian in *Principles of Polymerization* published by John Wiley and Sons, New York (1981) on pages 179–507 which pages are incorporated herein by reference.

A suitable catalyst is optionally, although preferably, employed to facilitate copolymerization of (B) one or more partially vinylized adducts with (3) one or more polymerizable ethylenically unsaturated monomers, wherein at least one of (B) or (3) contains one or more mesogenic or rodlike moieties. Said catalysts are the well known free radical-forming catalysts and include, for example, the organic peroxides and hydroperoxides such as benzoyl peroxide, di-tertiary-butyl peroxide, tertiary-butyl peroxybenzoate, tertiary-butyl hydroperoxide, and the azo and diazo compounds such as, for example, azobis(isobutyronitrile). It is also operable to use mixtures of said free radical-forming catalysts. Said catalysts are typically used in amounts of from about 0.01 to about 5 percent by weight of the total reactants used.

Reaction temperatures of from about 40° C. to about 200° C. are used for the copolymerization with temperatures of from about 60° C. to about 120° C. being preferred. Reaction times of from about 15 minutes to about 8 hours are used for the copolymerization with times of from about 30 minutes to about 4 hours being preferred.

The copolymerization can optionally, although preferably, be carried out in the presence of one or more solvents. Almost any solvent can be used, provided that it does not interfere with the copolymerization. Representative solvents include aromatic hydrocarbons, cyclic ethers, halogenated hydrocarbons such as, for example, xylene, toluene, dioxane, methyl chloroform and the like. Any solvent, if used, may be removed before further use of the copolymerization product. If the copolymerization product is to be used directly to cure one or more epoxy resins, it may be efficacious to leave the solvent(s) present for certain end uses, e.g., solvent borne thin film coatings.

The copolymerization can also be carried out in the presence of from about 0.01 to about 2, percent by weight of a chain transfer agent although this is not generally preferred. Representative chain transfer agents include the alkyl mercaptans such as butyl mercaptan, stearyl mercaptan; the disulfides and halogenated compounds, especially those containing bromine.

When polymerizable ethylenically unsaturated monomer mixtures are used in copolymerization with the partially vinylized adduct, they can be preblended then copolymerized with the partially vinylized adduct. Alternately, two or more polymerizable ethylenically unsaturated monomers are added in separate additions such that blocks from each respective monomer are predominately produced. The additions are made in aliquots or continuously.

These monomers or monomer mixtures are employed in an amount which provides from about 0.1 to about 60, preferably from about 1 to about 30, more preferably from about 2 to about 20 percent by weight based upon the combined weight of such monomers and the adduct which has had a portion of its reactive hydrogen atoms reacted with a compound containing a group reactive with a hydrogen atom in the adduct and a polymerizable ethylenically unsaturated group.

The product resulting from the copolymerization is an adduct, a portion of which contains a chemically bonded (grafted) polymeric domain derived from the polymerization of one or more polymerizable ethylenically unsaturated monomer(s) and which contains one or more mesogenic or rigid rodlike moieties. Said product can therefore also contain homopolymer (copolymers) of the ethylenically unsaturated monomer(s).

THERMOSETTABLE (CURABLE) MIXTURES

The thermosettable mixtures of the present invention are prepared by mixing together one or more of the polymer modified adducts containing one or more mesogenic or rodlike moieties with one or more epoxy resins, all, none, or a part of which may contain one or more mesogenic or rodlike moieties. The polymer modified adducts are employed in amounts which will effectively cure the mixture, with the understanding that these amounts will depend upon the particular polymer modified adduct and epoxy resin employed. Generally, suitable amounts of the polymer modified adduct include amounts which will provide from about 0.80:1 to about 1.50:1 equivalents of hydrogen which is reactive with an epoxide group per equivalent of epoxide group in the epoxy resin at the conditions employed for curing.

The application of heat or a combination of heat and pressure may be employed in the curing of the thermosettable mixtures of the present invention. Temperatures employed can vary over a considerable range but are usually in the range of 20° C. to 250° C. Depending upon the relative solubility and phase transition temperature(s) associated with the mesogenic or rodlike moieties present in the thermosettable compositions, curing at an elevated temperature can be especially desirable to enhance the molecular anisotropy of the cured product.

Polymerizable mixtures of the polymer modified adduct compositions containing mesogenic or rodlike moieties with one or more epoxy resins, can be modified with regard to their miscibility in accordance with the rule of Demus and Sackman (*Mol. Cryst. Liq. Cryst.*, 21, 239 (1973)). This rule states that, "All liquid crystalline modifications which exhibit an uninterrupted series in a binary system can be marked with the same symbol." In other words, the rule states that two liquid crystals of the same type are miscible. Thus the addition of a polymeric liquid crystal possessing the same type of molecular organization (smectic, nematic, etc.) as the liquid crystalline polymeric domains present in the adduct is expected to exhibit a maximum miscibility and vice versa.

The thermosettable mixtures of the present invention may also contain one or more of the known curing agents for epoxy resins such as, for example, primary and secondary polyamines, carboxylic acids and anhydrides thereof, aromatic hydroxyl containing compounds, imidazoles, guanidines, urea-aldehyde resins, alkoxylated urea-aldehyde resins, melamine-aldehyde resins, alkoxylated melamine-aldehyde resins, aliphatic amines, cycloaliphatic amines, aromatic amines, adducts free of mesogenic or rodlike moieties, combinations thereof and the like. Particularly suitable curing agents include, for example, methylenedianiline, 4,4'-diaminostilbene, 4,4'-diaminobenzanilide, 4,4'-diamino-alpha-methylstilbene, dicyandiamide, ethylenediamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, sulfanilamide, diaminodiphenylsulfone, diethyltoluenediamine, t-butyltoluenediamine, bis-4-aminocyclohexylmethane, isophoronediamine, diaminocyclohexane, hexamethylenediamine, piperazine, aminoethylpiperazine, 2,5-dimethyl-2,5-hexanediamine, 1,12-dodecanediamine, tris-3-aminopropylamine, combinations thereof and the like. If used as a component of the thermosettable mixtures of the present invention, from about 1 to about 99, preferably from about 1 to about 40, most preferably from about 1 to about 20 percent of the equivalents of hydrogen which are reactive with an epoxide group provided by the polymer modified adduct containing one or more mesogenic or rodlike moieties are substituted out by using one or more of the aforesaid curing agents.

ORIENTATION

During processing prior to curing and/or during cure of the curable epoxy resin compositions into a part, product or article, electric or magnetic fields or shear stresses can be applied for the purpose of orienting the mesogenic or rodlike moieties contained or developed therein which in effect improves the mechanical properties. As specific examples of these methods, Finkelmann, et al, *Macromol. Chem.*, 180, 803–806 (March 1979) induced orientation in thermotropic methacrylate copolymers containing mesogenic side chain groups decoupled from the main chain via flexible spacers in an electric field. Orientation of mesogenic side chain groups decoupled from the polymer main chain via flexible spacers in a magnetic field has been demonstrated by Roth and Kruecke, *Macromol. Chem.*, 187, 2655–2662 (November 1986). Magnetic field induced orientation of mesogenic main chain containing polymers has been demonstrated by Moore, et al, *ACS Polymeric Material Sciences and Engineering*, 52, 84–86

(April-May 1985). Magnetic and electric field orientation of low molecular weight mesogenic compounds is discussed by W. R. Krigbaum in *Polymer Liquid Crystals*, pages 275-309 (1982) published by Academic Press, Inc. All of the above are incorporated herein by reference in their entirety.

In addition to orientation by electric or magnetic fields, polymeric mesophases can be oriented by drawing and/or shear forces which are induced by flow through dies, orifices, and mold gates. A general discussion for orientation of thermotropic liquid crystal polymers by this method is given by S. K. Garg and S. Kenig in *High Modulus Polymers*, pages 71-103 (1988) published by Marcel Dekker, Inc. which is incorporated herein by reference. For the mesomorphic systems based on the epoxy resin compositions, this shear orientation can be produced by processing methods such as injection molding, extrusion, pultrusion, filament winding, filming and prepreging.

The thermosettable mixtures of the present invention can be blended with other compounds such as solvents or diluents, fillers, pigments, dyes, flow modifiers, thickeners, reinforcing agents, mold release agents, wetting agents, stabilizers, fire retardant agents, surfactants, combinations thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended composition.

Solvents or diluents which can be employed herein include, for example, hydrocarbons, ketones, glycol ethers, aliphatic ethers, cyclic ethers, esters, amides, monoepoxides, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, dimethylformamide, N-methylpyrrolidinone, tetrahydrofuran, propylene glycol methyl ether, 4-tertiary-butylphenyl glycidyl ether, cresyl glycidyl ether, epoxidized soybean oil, combinations thereof and the like.

The modifiers such as thickeners, flow modifiers and the like can be suitably employed in amounts of from zero to about 10, more suitably from about 0.5 to about 6, most suitably from about 0.5 to about 4 percent by weight based upon the weight of the total composition.

Reinforcing compounds which can be employed herein include natural and synthetic fibers in the form of woven fabric, mats, monofilament, multifilament, unidirectional fibers, rovings, random fibers or filaments, inorganic fillers of whiskers, hollow spheres, and the like. Suitable reinforcing compounds include, glass, ceramics, nylon, rayon, cotton, aramid, graphite, polyalkylene terephthalates, polyethylene, polypropylene, polyesters, combinations thereof and the like.

Suitable fillers which can be employed herein include, for example, inorganic oxides, ceramic microspheres, plastic microspheres, glass microspheres, inorganic whiskers, $CaCO_3$, combinations thereof and the like.

The fillers can be employed in amounts suitable from about zero to about 95, more suitably from about 10 to about 80, most suitably from about 40 to about 60 percent by weight based upon the weight of the total composition.

The compositions of the present invention are useful in, but not limited to, applications such as coatings, castings, encapsulations, extrusions, moldings, pultrusions, electrical and structural laminates or composites, and the like. In some instances, they can be formed into monofilament and multifilament fibers.

The following examples are illustrative of the present invention, but are not to be construed as to limiting its scope in any manner.

EXAMPLE 1

A. Synthesis of 4,4'-Dihydroxy-alpha-methylstilbene

Phenol (376.44 grams, 4.0 moles), chloroacetone (192.77 grams, 2.0 moles as chloroacetone) and methylene chloride (300 grams) are added to a reactor and cooled to −10° C. with stirring. The chloroacetone used is a commercial grade containing 96% chloroacetone. Concentrated sulfuric acid (196.16 grams, 2.0 mole) is added dropwise to the stirred solution over a thirty seven minute period so as to maintain the reaction temperature between −10 and −11° C. After 143 minutes of post reaction between a −10 to −11° C. temperature range, the viscous, orange colored oil product is mixed with iced deionized water (500 milliliters). The oil product is separated then washed with a second portion (500 milliliters) of deionized water. After separation, the recovered oil product is added to a 2 liter beaker along with ethanol (250 milliliters) and stirred to provide a solution. Deionized water (250 milliliters) is added to the stirred solution and heating commenced. As the temperature of the mixture increased, the stirred mixture began to clear. Each time clearing is observed, sufficient deionized water is added to induce cloudiness, followed by continuation of the mixing and heating. Once the temperature reaches 70° C., a massive precipitation of white crystalline plates ocurred and is followed by immediate coalesence of the precipitated product to an oil. The oil layer is recovered by decantation of the water layer and ethanol (250 milliliters) is added. Deionized water is again added to the stirred solution as heating commenced, in an amount sufficient to induce cloudiness each time clearing is observed. Once the temperature reaches 90° C., a massive precipitation of white crystalline plates again ocurred. At this time, stirring is stopped and the crystalline slurry is chilled to 4° C. and held therein for 12 hours. The crystalline product is recovered by filtration of the chilled crystalline slurry and combined with deionized water (800 milliliters), then stirred with heating to 90° C. After maintaining the stirred slurry at 90° C. for five minutes, the crystalline product is recovered by filtration. The crystalline product is again combined with deionized water (800 milliliters), then stirred with heating to 90° C. After maintaining the stirred slurry at 90° C. for five minutes, the crystalline product is recovered by filtration and then dried in a vacuum oven at 100° C. and 5 mm Hg to a constant weight of 190.0 grams of light tan colored crystalline solid. Proton magnetic resonance spectroscopy and infrared spectrophotometric analysis confirmed the product structure.

B. Epoxidation of 4,4'-Dihydroxy-alpha-methylstilbene 4,4'-Dihydroxy-alpha-methylstilbene (152.73 grams, 1.35 hydroxyl equivalents) from A above, epichlorohydrin (624.58 grams, 6.75 moles), deionized water (54.31 grams, 8.0 percent by weight of the epichlorohydrin used) and isopropanol (336.31 grams, 35 percent by weight of the epichlorohydrin used) are added to a reactor and heated to 55° C. with stirring under a nitrogen atmosphere. Once the 55° C. reaction temperature is achieved, sodium hydroxide (48.6 grams, 1.22 moles) dissolved in deionized water (194.4 grams) is added dropwise to the reactor over a 45 minute period and so as to maintain reaction temperature between 55° and 59° C. Ten minutes after completion of the aqueous sodium hydroxide addition, the stirring is stopped and the aqueous layer which separates from the reaction mixture is pipetted off and discarded. Stirring is resumed and after a total of twenty minutes following completion of the initial aqueous sodium hydroxide addition, a second solution of sodium hydroxide (21.6 grams, 0.54 mole) dissolved in deionized water (86.4 grams) is added to the reactor over a twenty minute period and so as to maintain the 55° C. reaction temperature. Fifteen minutes after completion of the aqueous sodium hydroxide addition, the recovered reaction mixture is added to a separatory funnel and washed with deionized water (750 milliliters). The separated organic layer is washed a second time (750 milliliters deionized water), recovered and then rotary evaporated under vacuum for 45 minutes at 110° C. then 30 minutes at 130° C. The product is recovered (218.6 grams) as a crystalline solid with an epoxide equivalent weight of 183.33.

C. Characterization of Liquid Crystallinity in the Diglycidyl Ether of 4,4′-Dihydroxy-alpha-methylstilbene A portion (13.12 milligrams) of the diglycidyl ether of 4,4′-dihydroxy-alpha-methylstilbene from B above is analyzed by differential scanning calorimetry using a heating rate of 10° C. per minute and a temperature range of 30° to 150° C. The results are provided in Table I.

TABLE I

| Cycle Designation | Observed Transition Temperatures (°C.) midpoint/range | Enthalpy (J/g) | Comments |
| --- | --- | --- | --- |
| First heating (30 to 150° C.) | 127/101–138 | 72.7 | single endotherm |
| First cooling (150 to 30° C.) | 89/92–78 | 1.8 | single exotherm |
| | 44/54–36 | 21.2 | single exotherm |
| Second heating (30 to 150° C.) | 82/72–96 | 26.0 | single exotherm |
| | 126/96–138 | 61.9 | single endotherm |
| Second cooling (150 to 30° C.) | 89/92–73 | 3.0 | single exotherm |
| | 44/54–36 | 21.8 | single exotherm |

Analysis of the diglycidyl ether via crosspolarized light microscopy is completed using a microscope equipped with a programmable hot stage using a heating rate of 10° C. per minute. The results are provided in the following Table II.

TABLE II

| Cycle Designation | Observed Transition Temperatures (°C.) | Comments |
| --- | --- | --- |
| First heating | 30 | Birefringent |

TABLE II-continued

| Cycle Designation | Observed Transition Temperatures (°C.) | Comments |
| --- | --- | --- |
| (25 to 136° C.) | | crystalline solid. |
| | 107 | First fluidity noted, birefringent crystals moving in an isotropic fluid. |
| | 135 | Isotropization completed. |
| First cooling (136 to 30° C.) | 94 | First mobile nematic droplets observed. |
| | 56.5 | Crystallizes. |
| Second heating (30 to 136° C.) | 77 | First fluidity noted. |
| | 106 | Birefringent crystals moving in an isotropic fluid. |
| | 132 | Isotropization completed. |
| Second cooling (129 to 30° C.) | 92 | First mobile nematic droplets observed. |
| | 57 | Crystallizes. |

The diglycidyl ether is a monotropic liquid crystal with a nematic texture. The nematic fluid gave opalescence when stirred between the 94° C. and 56.5° C. temperatures of the first cooling cycle.

D. Preparation of Adduct from Aniline and Diglycidyl Ether of 4,4′-Dihydroxy-alpha-methylstilbene Aniline (465.58 grams, 5.0 moles) is added to a 2 liter reactor equipped with a cooled condenser (5° C.) and stirred under a nitrogen atmosphere with heating to 90° C. A solution of the diglycidyl ether of 4,4′-dihydroxy-alpha-methylstilbene from B above (91.67 grams, 0.50 epoxide equivalent) dissolved in 1,4-dioxane (354.5 grams) is metered into the reactor at a rate of 0.9915 grams per minute while maintaining the 90° C. reaction temperature. After completion of addition of the diglycidyl ether solution in 1,4-dioxane, the reactor is held at 90° C. for an additional 48 hours. At the end of the 990 minutes of post reaction, the solution is recovered and rotary evaporated under vacuum for one hour at 90° C. then four hours at 150° C. and 2 mm Hg. The product is recovered (134.9 grams) as a light amber colored transparent solid at 25° C. Infrared spectrophotometric analysis of a film sample of the product on a sodium chloride plate demonstrated that complete conversion of epoxide groups had occurred. Titration of a portion of the product for total nitrogen content demonstrated the presence of 3.6062 milliequivalents N per gram of product. Titration of a portion of the product which had been acetylated with acetic anhydride for tertiary nitrogen content demonstrated the presence of 0.0606 milliequivalents tertiary N per gram of product. By difference, the total secondary amine content is calculated to be 3.5456 milliequivalents >N—H per gram of product.

E. Partial Methacrylation of Adduct from Aniline and Diglycidyl Ether of 4,4′-Dihydroxy-alpha-methylstilbene A portion (56.407 grams, 0.20 >N—H equivalents) of the adduct of aniline and diglycidyl ether of 4,4′-dihydroxy-alpha-methylstilbene from D above, anhydrous potassium carbonate (0.6081, 0.0044 mole) and chloroform (250 grams) are added to a one liter glass resin kettle reactor, maintained at 25° C. and stirred under a nitrogen atmosphere until a solution formed containing suspended potassium carbonate. Methacryloyl chloride (0.4182 gram, 0,004 mole) is added to the reactor and induced a maximum exotherm of 27° C. one minute after addition. The reactor is maintained at 25° C. for 18 hours, followed by filtration of the reactor contents to remove suspended inorganic salts. The resultant filtrate is washed with potassium hydroxide (0.2244 grams, 0,004 mole) dissolved in cold deionized water (100 milliliters) followed by washing of the separated organic layer with deionized water (100 milliliters). The recovered organic layer is dried over anhydrous sodium sulfate, filtered and rotary evaporated under vacuum using final conditions of 85° C. and 2 mm Hg for 60 minutes. The product is recovered (55.1 grams) as a liquid at 85° C. which became a light amber colored transparent solid at 25° C.

F. β-Hydroxyethylation of 4-Hydroxystilbene

4-Hydroxystilbene (36.80 grams, 0.1875 hydroxyl equivalent), ethylene carbonate (18.17 grams, 0.2063 mole), 4-(N,N-dimethylamino)pyridine (0,055 gram, 0.01 percent by weight of the 4-hydroxystilbene and ethylene carbonate used) are added to a reactor and heated to 80° C. with stirring under a nitrogen atmosphere. Once the 80° C. temperature is achieved, triethylamine (0.55 grams, 1.0 percent by weight of the 4-hydroxystilbene and ethylene carbonate used) is added to the reactor followed by continuation of the heating to 135° C. Once the 135° C. reaction temperature is achieved, exothermic heating of the solution continued to a maximum of 145° C. Seven minutes after reaching this maximum exotherm temperature, the reactor cooled to 135° C. and is maintained therein for the next 86 minutes followed by removal of a sample for thin layer chromatographic analysis. Thin layer chromatography is completed on a silica gel plate using a 3/2/2/2 volume mixture of hexane/ethyl acetate/chloroform/methanol as the eluent at 25° C. followed by visualization via treatment of the plate with 5% phosphomolybdic acid in ethanol then heat. The analysis demonstrated that complete conversion of the 4-hydroxystilbene reactant ($R_f=0,947$) to a single product ($R_f=0.844$) had occurred. After completion of the thin layer chromatography, (required 25 minutes), toluene (325 milliliters) is added to the reactor causing cooling with massive precipitation of crystalline product. Heating to reflux provided a toluene solution which is allowed to cool to room temperature (25° C.) and is maintained therein for the next 6 hours. The resultant crystalline slurry is filtered and the crystalline product thus recovered and slurried with fresh toluene (35 milliliters). After filtration of the crystalline slurry in toluene, the recovered product is dried in a vacuum oven at 80° C. and 5 mm Hg to a constant weight of 37.1 grams of shimmering, white crystalline plates. Proton magnetic resonance spectroscopy confirmed the product structure as the β-hydroxyethylether of 4-hydroxystilbene.

G. Methacrylation of the β-Hydroxyethylether of 4-Hydroxystilbene

A portion (26.43 grams, 0.11 hydroxyl equivalent) of the β-hydroxyethylether of 4-hydroxystilbene from F above, 1,4-dioxane (79.29 grams), and cold (4° C.) 20 % wt. potassium hydroxide solution (216.03 grams) are added to a Waring blender and vigrously mixed for two minutes. Immediately thereafter, methacryloyl chloride (28.75 grams, 0,275 mole) is added to the slurry and mixing continued. Ten minutes later, a second portion of methacryloyl chloride (28.75 grams, 0,275 mole) is added to the reactor and the mixing continued. After three minutes, mixing is stopped and the contents of the blender is poured into iced deionized water (1 liter). The white precipitated product is recovered from the aqueous slurry via filtration, then washed with deionized water (100 milliliters) while in the filter. The product is removed from the filter then added to ethanol (500 milliliters) and heated to boiling to provide a solution. The ethanol solution is cooled to room temperature (25° C.) then sufficient deionized water mixed therein to induce initial formation of crystalline precipitate. After holding the slurry overnight at 4° C., the precipitate is removed by filtration. The filtrate is allowed to warm to room temperature, then sufficient deionized water is again added so as to induce the initial formation of crystalline precipitate. A second crop of precipitated product is recovered via filtration after holding the slurry overnight at 4° C. The product thus recovered is combined, washed with deionized water (100 milliliters), recovered by filtration, then dried in a vacuum oven at 70° C. and 2 mm Hg to a constant weight of 30.8 grams of white powder. Infrared spectrophotometric analysis of a potassium chloride pellet of the product demonstarted that full conversion of the hydroxy group to the ester group occurred. Proton magnetic resonance spectroscopy further confirmed the product structure as the methacrylate of the β-hydroxyethylether of 4-hydroxystilbene.

H. Homopolymerization of the Methacrylate of the β-Hydroxyethylether of 4-Hydroxystilbene A portion (0.50 gram) of the methacrylate of the β-hydroxyethylether of 4-hydroxystilbene from G above, 1,4-dioxane (40.0 grams) and azobis(isobutyronitrile) (0.005 gram) are added to a three necked 100 milliliter glass reactor equipped with a chilled water condenser, nitrogen inlet, magnetic stirring, a thermometer and a thermostatically controlled heating mantle. Heating with stirring commenced once a nitrogen atmosphere is established until a temperature of 90° C. is achieved. After four hours at 90° C. the product solution is recovered and added to stirred methanol (500 milliliters). The resultant white precipitate is recovered by filtration, washed in the filter with methanol (50 milliliters), then dried in a vacuum oven at 80° C. and 5 mm Hg to a constant weight of 0.41 grams. Gel permeation chromatographic analysis of a dimethylformamide solution of a portion of the homopolymer using polystyrene calibration standards revealed a weight average molecular weight of 12,615 accompanied by a polydispersity ratio of 8.04. A portion (6.88 milligrams) of the homopolymer is analyzed by differential scanning calorimetry using a heating rate of 10° C. per minute and a temperature range of 30° to 200° C. under a nitrogen atmosphere flowing at 35 cubic centimeters per minute followed by cooling at a rate of 10° C. per minute from 200° to 30° C. A endotherm beginning at 104° C. with a midpoint at 123° C. and ending at 135° C. is observed for the heating cycle and a single exotherm beginning at 115° C. with a midpoint at 109° C. and ending at 89° C. is observed for the cooling cycle. These results are reproduced by second heating and second cooling cycle. Analysis of a portion of the homopolymer via crosspolarized light microscopy is completed using a microscope equipped with a programmable hot stage using a heating rate of 10° C. per minute. At 30° C., the homopolymer appeared as a amorphous solid. At 112° C., the homopolymer became birefringent when sheared between the coverslip and the glass slide. At 121.7, the homopolymer is a birefringent fluid which undergoes isotropization at 126.7° C.

I. Copolymerization of the Partial Methacrylate of Adduct from Aniline and Diglycidyl Ether of 4,4'-Dihydroxy-alpha-methylstilbene and Methacrylate of the β-Hydroxyethylether of 4-Hydroxystilbene (10% wt.)

A portion (47.67 grams) of the partial methacrylate of the adduct from aniline and diglycidyl ether of 4,4'-dihydroxy-alpha-methylstilbene from E above, 1,4-dioxane (150.0 grams) and a portion (5.30 grams) of the methacrylate of the β-hydroxyethylether of 4-hydroxystilbene from G above are added to a reactor and heated to 70° C. with stirring under a nitrogen atmosphere. Once the 70° C. temperature is achieved, azobis(isobutyronitrile) (0.0265 gram) is added to the reactor followed by continued heating to 90° C. After 102 minutes at the 90° C. temperature, the solution is recovered and rotary evaporated using final conditions of 120° C. and 5 mm Hg to provide a constant weight of 52.6 grams of light amber colored liquid which cooled to a homogeneous, hazy, light amber colored solid at 25° C.

EXAMPLE 2

A. Preparation of Adduct from Aniline and Diglyciddyl Ether of 4,4'-Isopropylidenediphenol Aniline (931.16 gramst 10.0 moles) is added to a 2 liter reactor equipped with a cooled condenser (5° C.) and stirred under a nitrogen atmosphere with heating to 90° C. A solution of the diglycidyl ether of 4,4-isopropylidenediphenol (bisphenol A) (179.95 grams, 1.0 epoxide equivalent) having an epoxide equivalent weight of 179.95 dissolved in 1,4-dioxane (359.90 grams) is pumped into the reactor at a rate of 1,069 grams per minute while maintaining the 90° C. reaction temperature. After completion of addition of the diglycidyl ether solution in 1,4-dioxane, the reactor is held at 90° C. for an additional 48 hours. At the end of the 48 hours of post reaction, the solution is recovered and rotary evaporated under vacuum for one hour at 90° C. then four hours at 150° C. and 2 mm Hg. The product is recovered (271.50 grams) as a light amber colored transparent solid at 25° C. Infrared spectrophotometric analysis of a film sample of the product on a sodium chloride plate demonstrated that complete conversion of epoxide groups had occurred. Titration of a portion of the product for total nitrogen content demonstrated the presence of 3.5864 milliequivalents N per gram of product. Titration of a portion of the product which had been acetylated with acetic anhydride for tertiary nitrogen content demonstrated the presence of 0.0848 milliequivalents tertiary N per gram of product. By difference, the total secondary amine content is calculated to be 3.5016 milliequivalents >N-H per gram of product.

B. Partial Methacrylation of Adduct from Aniline and Diglycidyl Ether of 4,4'-Isopropylidenediphenol A portion (57.117 grams, 0.20 >N-H equivalents) of the adduct from aniline and diglycidyl ether of 4,4'-isopropylidenediphenol from A above, anhydrous potassium carbonate (0.6081, 0.0044 mole) and chloroform (250 grams) are added to a one liter glass resin kettle reactor, maintained at 25° C. and stirred under a nitrogen atmosphere until a solution formed containing suspended potassium carbonate. Methacryloyl chloride (0.4182 gram, 0.004 mole) is added to the reactor and induced a maximum exotherm of 27° C. one minute after addition. The reactor is maintained at 25° C. for 18 hours, followed by filtration of the reactor contents to remove suspended inorganic salts. The resultant liltrate is washed with potassium hydroxide (0.2244 grams, 0,004 mole) dissolved in cold deionized water (100 milliliters) followed by washing of the separated organic layer with deionized water (100 milliliters). The recovered organic layer is dried over anhydrous sodium sulfate, filtered and rotary evaporated under vacuum using final conditions of 85° C. and 2 mm Hg for 60 minutes. The product is recovered (57.1 grams) as a liquid at 85° C. which became a light amber colored transparent solid at 25° C.

C. Copolymerization of the Partial Methacrylate of Adduct from Aniline and Diglycidyl Ether of 4,4'-Isopropylidenediphenol and Methacrylate of the β-Hydroxyethylether of 4-Hydroxystilbene (10% wt.)

A portion (57.10 grams) of the partial methacrylate of the adduct from aniline and diglycidyl ether of 4,4'-isopropylidenediphenol from B above, 1,4-dioxane (150.0 grams) and a portion (6.34 grams) of the methacrylate of the β-hydroxyethylether of 4hydroxystilbene from Example 1-G are added to a reactor and heated to 70° C. with stirring under a nitrogen atmosphere. Once the 70° C. temperature is achieved, azobis(isobutyronitrile) (0.0317 gram) is added to the reactor followed by.continued heating to 90° C. After 155 minutes at the 90° C. temperature, the solution is recovered and rotary evaporated using final conditions of 120° C. and 5 mm Hg to provide a constant weight of 62.5 grams of light amber colored liquid which cooled to a homogeneous, transparent, light amber colored solid at 25° C.

EXAMPLE 3

Preparation of a Neat Resin Casting of the Diglycidyl Ether of 4,4'-Dihydroxy-alpha-methylstilbene Cured with a Liquid Crystal Polymer Modified Adduct from Aniline and Diglycidyl Ether of 4,4'-Dihydroxy-alpha-methylstilbene A portion (2.75 grams, 0.0150 epoxide equivalents) of the diglycidyl ether of 4,4'-dihydroxy-alpha-methylstilbene from Example 1-B having an epoxide equivalent weight of 183.33 is placed in an oven preheated to 160° C. Fourteen minutes later, after melting had occurred, the oven temperature is reduced to 120° C. Once the 120° C. temperature is achieved, a portion (4.82 grams, 0.0150 >N—H equivalents) of the liquid crystal polymer modified adduct from aniline and diglycidyl ether of 4,4'-dihydroxy-alpha-methylstilbene from Example 1-I above is placed in the 120° C. oven. Nineteen minutes later, the two components are combined and thoroughly mixed. After an additional 9 minutes at 120° C., the resinous mixture is degassed in a vacuum bell jar and then poured into the reservoir of an injection molder preheated to 120° C. After 12 minutes in the reservoir at 120° C., the temperature is allowed to decrease. After four minutes, the temperature had decreased to 103° C., and at this time the resin is injected through a 0.020 by 0.375 (0.5 by 9.5 mm)inch rectangular flow gate into a mold preheated to 80° C. and having the following dimensions: 3.0 by 0.5 by 0.125 inch (76.2 by 12.7 by 3,175 mm). The filled mold is then immediately transferred to an oven preheated to 80° C. After four hours at 80° C. the oven temperature is increased to 90° C. and held therein for one hour, 100° C. and held therein for one hour, then 110° C. where it is maintained for six hours before slowly cooling to room temperature (25° C.). Once at room temperature the casting released from the mold is biphasic with an opaque phase and a translucent phase in approximately equal amounts. Microscopic examination of a sample of the 120° C. resin mixture obtained from the reservoir of the injection molder at the time of injection into the mold is completed at 70× magnification using a crossed polarized light source and a rate of cooling of 10° C. per minute. At 120° C., the resin is an isotropic fluid which became birefringent at 103° C. Once 80° C. is reached, the resin became a highly birefringent solid. After lightly sanding the edges of the casting, it is tested for flexural properties. The flexural strength and modulus thus obtained are 25,720 psi (177.2 MPa) and 937,000 psi (6,456 MPa), respectively. After reaching the maximum flexural stress of 25,720 psi (177.2 MPa), the casting yielded rather than breaking. The glass transition temperature of the casting is measured by differential scanning calorimetry and is found to be 95.2° C. Differential scanning calorimetry also indicated that the casting is fully cured as no exothermic activity is observed up to the 300° C. end of the analysis. The results thus obtained are summarized in Table III.

EXAMPLE 4

Preparation of a Neat Resin Casting of the Diglycidyl Ether of 4,4'-Isopropylidenediphenol Cured with a Liquid Crystal Polymer Modified Adduct from Aniline and Diglycidyl Ether of 4,4'-Dihydroxy-alpha-methylstilbene A portion (2.80 grams, 0.0156 epoxide equivalents) of the diglycidyl ether of 4,4'-isopropylidenediphenol having an epoxide equivalent weight of 179.9 and a portion (5,001 grams, 0.0156 >N—H equivalents) of the liquid crystal polymer modified adduct from aniline and 4,4'-dihydroxy-alphamethylstilbene from Example 1-I are placed in an oven preheated to 120° C. Twenty minutes later, the two components are combined and thoroughly mixed. After an additional 9 minutes at 120° C., the resinous mixture is degassed in a vacuum bell jar and then poured into the reservoir of an injection molder preheated to 120° C. After 12 minutes in the reservoir at 120° C., the temperature is allowed to decrease. After four minutes, the temperature had decreased to 100° C., and at this time the resin is injected through a 0,020 by 0,375 inch (0.5 by 9.5 mm) rectangular flow gate into a mold preheated to 80° C. and having the following dimensions: 3.0 by 0.5 by 0,125 inch (76.2 by 12.7 by 3,175 mm). The filled mold is then immediately transferred to an oven preheated to 80° C. After four hours at 80° C., the oven temperature is increased to 90° C. and held therein for one hour, 100° C. and held therein for one hour, then 110° C. where it is maintained for six hours before slowly cooling to room temperature (25° C.). Once at room temperature the casting released from the mold is transparent. Microscopic examination of a sample of the 120° C. resin mixture obtained from the reservoir of the injection molder at the time of injection into the mold is completed at 70× magnification using a crossed polarized light source and a rate of cooling of 10° C. per minute. At 120° C., the resin is an isotropic fluid which became a non-birefringent solid at 80° C. After lightly sanding the edges of the casting, it is tested for flexural properties. The flexural strength and modulus thus obtained are 20,120 psi (138.6 MPa) and 553,000 psi (3,810.2 MPa), respectively. After reaching the maximum flexural stress of 20,120 psi (138.6 MPa), the casting yielded rather than breaking. The glass transition temperature of the casting is measured by differential scanning calorimetry and is found to be 94.8° C. Differential scanning calorimetry also indicated that the casting is fully cured as no exothermic activity is observed up to the 300° C. end of the analysis. The results thus obtained are summarized in Table III.

EXAMPLE 5

Preparation of a Neat Resin Casting of the Diglycidyl Ether of 4,4'-Dihydroxy-alpha-methylstilbene Cured with a Liquid Crystal Polymer Modified Adduct from Aniline and Diglycidyl Ether of 4,4'-Isopropylidenediphenol A portion (2.80 grams, 0.0153 epoxide equivalents) the diglycidyl ether of 4,4'-dihydroxy-alpha-methylstilbene from Example 1-B above having an epoxide equivalent weight of 183.33 is placed in an oven preheated to 160° C. Eleven minutes later, after melting had occurred, the oven temperature is reduced to 120° C. Once the 120° C. temperature is achieved, a portion (4.9688 grams, 0.0153 >N—H equivalents) of the liquid crystal polymer modified adduct from aniline and diglycidyl ether of 4,4'-isopropylidenediphenol from Example 2-C above is placed in the 120° C. oven. Thirty seven minutes later, the two components are combined and thoroughly mixed. After an additional 9 minutes at 120° C., the resinous mixture is degassed in a vacuum bell jar and then poured into the reservoir of an injection molder preheated to 120° C. After 12 minutes in the reservoir at 120° C., the temperature is allowed to decrease. After four minutes, the temperature had decreased to 100° C., and at this time the resin is injected through a 0.020 by 0.375 inch (0.5 by 9.5 mm) rectangular flow gate into a mold preheated to 80° C. and having the following dimensions: 3.0 by 0.5 by 0.125 inch (76.2 by 12.7 by 3.175 mm). The filled mold is then immediately transferred to an oven preheated to 80° C. After four hours at 80° C., the oven temperature is increased to 90° C. and held therein for one hour, 100° C. and held therein for one hour, then 110° C. where it is maintained for six hours before slowly cooling to room temperature (25° C.). Once at room temperature the casting released from the mold is transparent. Microscopic examination of a sample of the 120° C. resin mixture obtained from the reservoir of the injection molder at the time of injection into the mold is completed at 70× magnification using a crossed polarized light source and a rate of cooling of 10° C. per minute. At 120° C., the resin is an isotropic fluid which became a non-birefringent solid at 70° C. After lightly sanding the edges of the casting, it is tested for flexural properties. The flexural strength and modulus thus obtained are 19,480 psi (134.2 MPa) and 529,000 psi (3,644.9 MPa), respectively. After reaching the maximum flexural stress of 19,480 psi (134.2 MPa), the casting yielded rather than breaking. The glass transition temperature of the casting is measured by differential scanning calorimetry and is found to be 90.2° C. Differential scanning calorimetry also indicated that the casting is fully cured as no exothermic activity is observed up to the 300° C. end of the analysis. The results thus obtained are summarized in Table III.

EXAMPLE 6

A. Partial Methacrylation of Adduct from Aniline and Diglycidyl Ether of 4,4'-Isopropylidenediphenol A portion (28.56 grams, 0.10 >N—H equivalents) of the adduct from aniline and diglycidyl ether of 4,4'-isopropylidenediphenol from Example 2-A, anhydrous potassium carbonate (0.7602, 0.0055 mole) and chloroform (200 grams) are added to a one liter glass resin kettle reactor, maintained at 25° C. and stirred under a nitrogen atmosphere until a solution Tormed containing suspended potassium carbonate. Methacryloyl chloride (0.5227 gram, 0.005 mole) is added to the reactor and induced a maximum exotherm of 27° C. one minute after addition. The reactor is maintained at 25° C. for 4 hours, followed by filtration of the reactor contents to remove suspended inorganic salts. The resultant filtrate is washed with potassium hydroxide (0.281 grams, 0.005 mole) dissolved in cold deionized water (100 milliliters) followed by washing of the separated organic layer with deionized water (100 milliliters). The recovered organic layer is dried over anhydrous sodium sulfate, filtered and rotary evaporated under vacuum using final conditions of 85° C. and 2 mm Hg for 60 minutes. The product is recovered (28.76 grams) as a liquid at 85° C. which became a light amber colored transparent solid at 25° C.

B. Copolymerization of the Partial Methacrylate of Adduct from Aniline and Diglycidyl Ether of 4,4'-Isopropylidenediphenol and Methacrylate of the β-Hydroxyethylether of 4-Hydroxystilbene (25 % wt.)

The partial-methacrylate of the adduct from aniline and diclycidyl ether of 4,4'-isopropylidenediphenol from A above, 1,4-dioxane (150.0 grams) and a portion (9,587 grams) of the methacrylate of the β-hydroxyethylether of 4-hydroxystilbene from Example 1-G are added to a reactor and heated to 70° C. with stirring under a nitrogen atmosphere. Once the 70° C. temperature is achieved, azobis(isobutyronitrile) (0.0479 gram) is added to the reactor. After 253 minutes at 70° C., the temperature is increased to 90° C. After 75 minutes at 90° C., the hazy solution is recovered and rotary evaporated using final conditions of 120° C. and 5 mm Hg to provide a constant weight of 36.93 grams of light amber colored liquid which cooled to a homogeneous, opaque, amber colored solid at 25° C.

C. Gel Permeation Chromatographic Analysis of Liquid Crystal Polymer Modified Adduct from Aniline and Diglycidyl Ether of 4,4'-Isopropylidenediphenol A dimethylformamide solution of a portion of the liquid crystal modified adduct from aniline and diglycidyl ether of 4,4'-isopropylidenediphenol from B above and a dimethylformamide solution of the adduct from aniline and diglycidyl ether of 4,4'-isopropylidenediphenol from Example 2-A are analyzed by gel permeation chromatography versus polystyrene calibration standards. The adduct from aniline and diglycidyl ether of 4,4'-isopropylidenediphenol possesses a molecular weight ceiling of 1464 (0.17 percent of total area). By way of contrast, the liquid crystal polymer modified adduct from aniline and diglycidyl ether of 4,4'-isopropylidenediphenol possesses a new high molecular weight peak with a ceiling of 15,264.

COMPARATIVE EXPERIMENT A

Preparation of a Neat Resin Casting of the Diglycidyl Ether of 4,4'-Isopropylidenediphenol Cured with an Adduct from Aniline and Diglycidyl Ether of 4,4'-Isopropylidenediphenol A portion (2.80 grams, 0.0156 epoxide equivalents) of the diglycidyl ether of 4,4'-isopropylidenediphenol having an epoxide equivalent weight of 179.9 and a portion (4.445 grams, 0.0156 >N—H equivalents) of the adduct from aniline and 4,4'-isopropylidenediphenol from Example 2-A are placed in an oven preheated to 120° C. Thirty minutes later, the two components are combined and thoroughly mixed. After an additional 9 minutes at 120° C., the resinous mixture is degassed in a vacuum bell jar and then poured into the reservoir of an injection molder preheated to 120° C. After 12 minutes in the reservoir at 120° C., the temperature is allowed to decrease. After five minutes, the temperature has decreased to 100° C., and at this time the resin is injected through a 0.020 by 0.375 inch (0.5 by 9.5 mm) rectangular flow gate into a mold preheated to 80° C. and having the following dimensions: 3.0 by 0.5 by 0.125 inch (76.2 by 12.7 by 3.175 mm). The filled mold is then immediately transferred to an oven preheated to 80° C. After four hours at 80° C., the oven temperature is increased to 90° C. and held therein for one hour, 100° C. and held therein for one hour, then 110° C. where it is maintained for six hours before slowly cooling to room temperature (25° C.). Once at room temperature the casting released from the mold is transparent. Microscopic examination of a sample of the 120° C. resin mixture obtained from the reservoir of the injection molder at the time of injection into the mold is completed at 70× magnification using a crossed polarized light source and a rate of cooling of 10° C. per minute. At 120° C., the resin is an isotropic fluid. Upon cooling, the resin remained non-birefringent to room temperature (25° C.). After lightly sanding the edges of the casting, it is tested for flexural properties. The flexural strength and modulus thus obtained are 18,543 psi (127.8 MPa) and 496,000 psi (3,417.4 MPa), respectively. After reaching the maximum flexural stress of 18,543 psi (127.8 MPa), the casting yields rather than breaking. The glass transition temperature of the casting is measured by differential scanning calorimetry and is found to be 103.8° C. Differential scanning calorimetry also indicated that the casting is fully cured as no exothermic activity is observed up to the 300° C. end of the analysis. The results thus obtained are summarized in Table III.

TABLE III

| | Designation of Cured Epoxy Resin | | | |
|---|---|---|---|---|
| Property Evaluated | Example 3 | Example 4 | Example 5 | Comparative Experiment A |
| Glass Transition Temperature (°C.) | 95.2 | 94.8 | 90.2 | 103.8 |
| Flexural Strength | | | | |
| (psi) | 25,720 | 20,120 | 19,480 | 18,543 |
| (MPa) | 177 | 139 | 134 | 128 |
| Flexural Modulus | | | | |
| (psi) | 937,000 | 553,000 | 529,000 | 496,000 |
| (MPa) | 6,456 | 3,810 | 3,645 | 3,417 |

What is claimed is:

1. A polymer modified adduct containing one or more rodlike mesogenic moieties which is prepared by
(A) reacting
   (1) one or more epoxy resins containing an average of more than one vicinal epoxide group per molecule; with
   (2) one or more compounds containing two or more hydrogen atoms which are reactive with an epoxide group selected from the group consisting of
      (a) di- and polyphenols,
      (b) di- and polycarboxylic acids,
      (c) di- and polymercaptans,
      (d) di- and polyamines,
      (e) primary monoamines,
      (f) sulfonamides,
      (g) aminophenols,
      (h) aminocarboxylic acids,
      (i) phenolic hydroxyl containing carboxylic acids,
      (j) sulfanilamides, ad
      (k) any combination of any two or more of the aforementioned compounds (a), (b), (c), (d), (e), (f), (g), (h), (i), or (j);
      thereby formign an adduct essentially free of epoxy groups and containing active hydrogen atoms reactive with an epoxy group;
(B) partially vinylizing the resulting adduct from step (A) by reacting from about 0.005 to about 10 mole percent of the reactive hydrogen atoms contained in said adduct with a compound containing (1) a group reactive with said reactive hydrogen atoms and (2) a polymerizable ethylenic unsatruated group; and
(C) copolymerizig the partially vinylized adduct from step (B) with (3) one or more polymerizable ethylenically unsaturated monomers and wherein one or more components (1), (2), or (3) contain one or more rodlike mesogenic moieties, said monomer being employed in an amount of from about 0.1 to about 60 percent by weight based on the combined weight of said monomers and adduct.

2. A polymer modified adduct of claim 1 containing one or more rodlike mesogenic moieties which is prepared by
(A) reacting
   (1) one or more epoxy resins containing an average of more than one vicinal epoxide group per molecule and containing one or more rodlike mesogenic moieties per molecule, with
   (2) one or more compounds which (a) are free of rodlike mesogenic moieties, and (b) contain two or more hydrogen atoms which are reactive with an epoxide group;
   thereby forming an adduct essentially free of epoxy groups and containing active hydrogen atoms reactive with an epoxy group;
(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsatruated group; and
(C) copolymerizzing the partially vinylized adduct from step (B) with (3) one or more polymerizable ethylenically unsaturated monomers, said monomer being employed in an amount of from about 1 to about 30 percent by weight based on the combined weight of said monomers and adduct.

3. A polymer modified adduct of claim 2 wherein
(a) component (1) is a diglycidyl ether, diglycidyl ester or glycidyl amine or a combination of any two or more of such compounds;
(b) component (2) is a compound containing two amine hydrogen, phenolic hydroxyl or carboxyl groups per molecule or a combination of any two or more of such compounds; and
(c) component (3) is a polymerizable monomer which contains a polymerizable vinyl or allyl group.

4. A polymer modified adduct of claim 2 wherein
(a) component (1) is a diglycidyl ether of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)-phenoxy)diphenyl, 4,4'-dihydroxy-alpha-methylstilbene, 3,3'5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxychalcone, 4,4'-dihydroxy-alpha-cyanostilbene, 4-hydroxyp henyl -4hydroxybenzoate, 4,4'-dihydroxy-3,3',5,5'-tetrabromo-alpha-methylstilbene, N,N'-bis (4-hydroxyphenyl)-terephthalamide; a diglycidyl ether of a dihydric phenol represented by the following formulas:

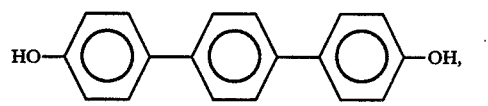

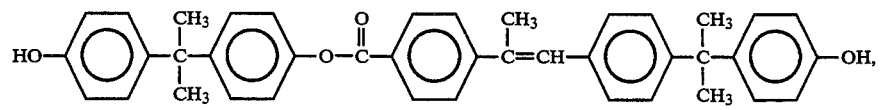

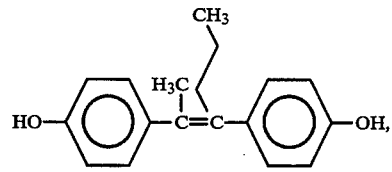

-continued
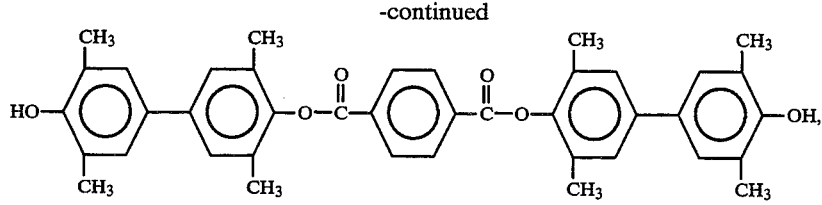
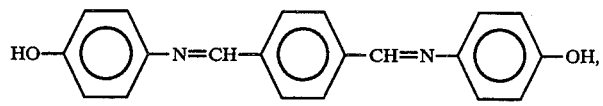
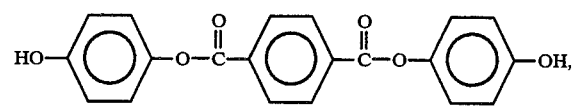
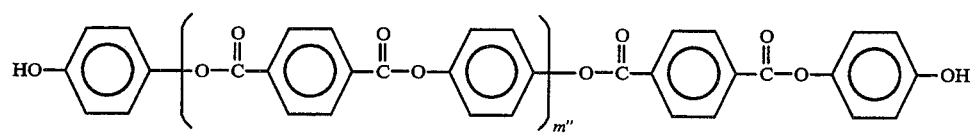
where m" has a value from 1 to about 10,
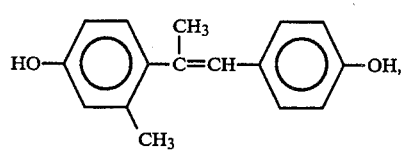
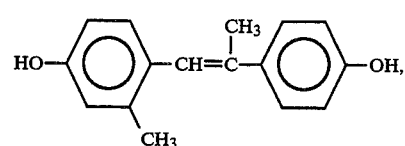
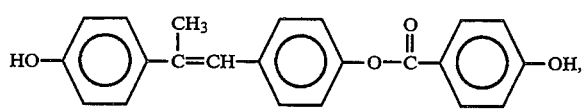
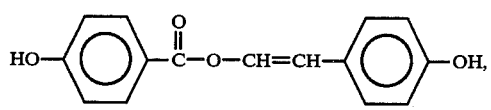
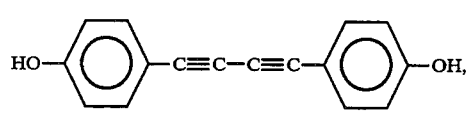
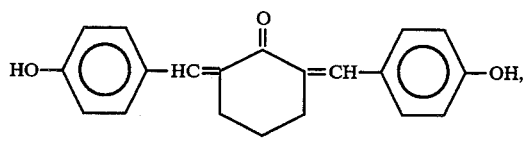
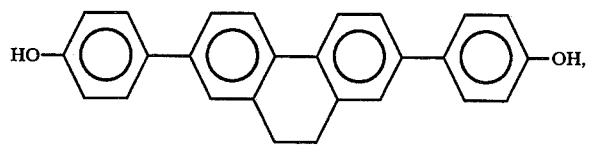
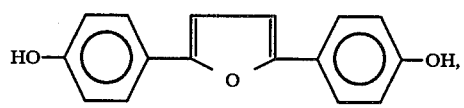
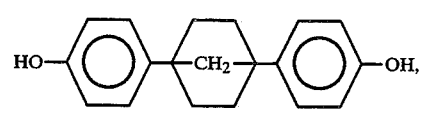
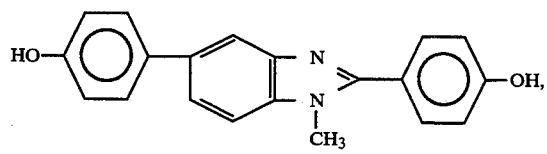
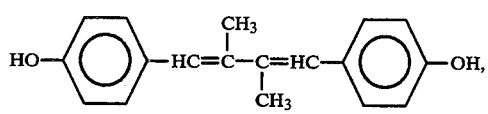

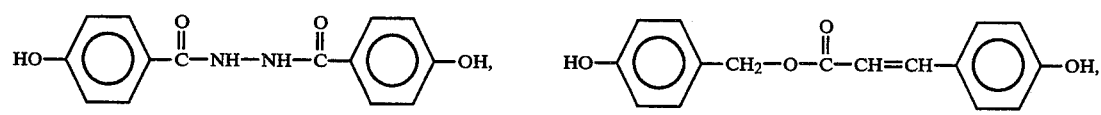
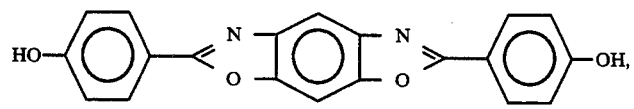
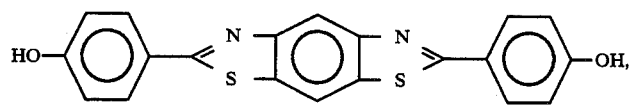
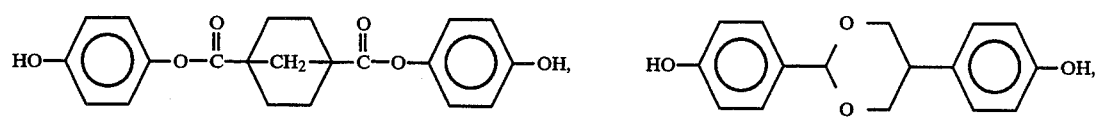
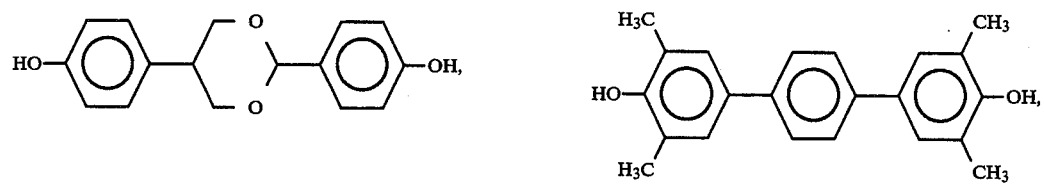
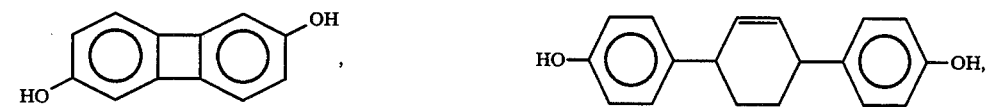
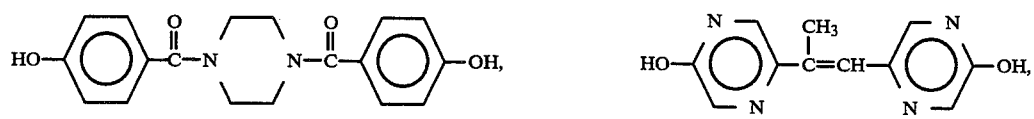
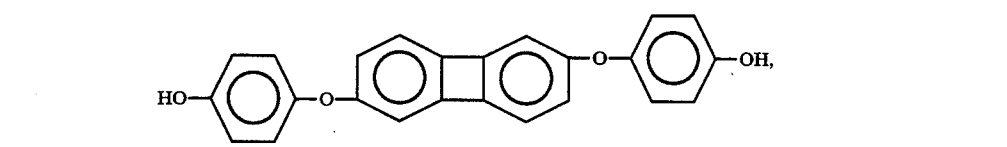
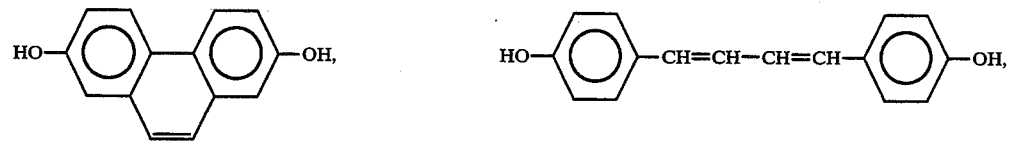
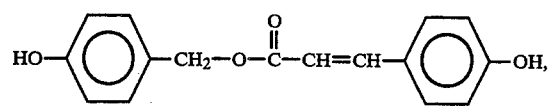
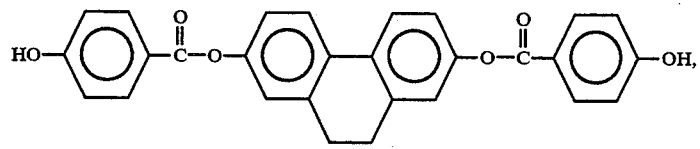

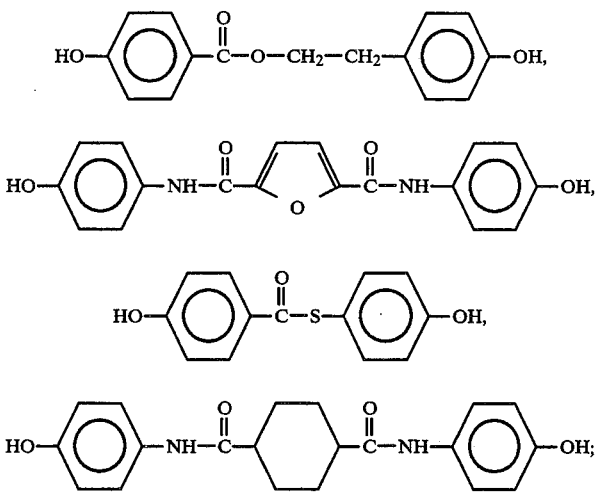

a tetraglycidyl amine of 4,4'-diamino-alpha-methylstilbene, 4,4'-diaminostilbene, 4,4'-diaminobenzanilide, 4,4'-diaminoazobenzene, 4,4'-diamino-alpha-cyanostilbene; an advanced diglycidyl ether resulting from advancing the aforementioned diglycidyl ethers with aromatic dihydroxyl or dicarboxylic acid containing compounds including all of the previously listed diphenol precursors to the diglycidyl ethers; or any combination thereof;

(b) component (2) is aniline, 4-methoxyaniline, 4-chloroaniline, 4-methylaniline, 4-cyanoaniline, 2,6-dimethylaniline, 4-aminodiphenyl oxide, 4-aminodiphenylmethane, 4-aminodiphenylsulfone, 4aminodiphenylsulfide, methylamine, 4-aminobenzophenone, n-hexylamine, cyclohexylamine, aminonorbornane, ammonia, resorcinol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 4,4'-bis(4-(4-hydroxyphenoxy)-phenylsulfone)diphenyl ether, 1,1-bis(4-hydroxyphenyl)cyclohexane, tris(hydroxyphenyl)methane, phenol or substituted phenol-aldehyde condensation products (novolacs), dicyclopentadiene or an oligomer thereof and phenol or substituted phenol condensation products, 4,4'-dicarboxydiphenylmethane, 4,4'-isopropylidenedicarboxylic acid, 3,3',5,5'-tetrabromo-4,4'-isopropylidenedicarboxylic acid, terephthalic acid, isophthalic acid, 1,4-cyclohexanedicarboxylic acid, 1,6-hexanedicarboxylic acid, dicyclopentadienedicarboxylic acid, tris(carboxyphenyl)methane, 4,4'-bis(4-(4carboxyphenoxy)phenylsulfone)diphenyl ether, 1,1-bis(4-carboxyphenyl)cyclohexane; or a combination thereof; and (c) component (3) is styrone, alpha-mothylstyrene, vinyl toluenes, halogenated styrenos, t-butylstyrenes, divinylbenzenos, methyl, ethyl, n-butyl, isopropyl, acetyl, stearyl esters of acrylic or mothacrylic acid, acrylic acid, mothacrylic acid, crotonic acid, acrylamide, N-alkylacrylamides, diallylphthalate, triallylisocyanurate, diallylmaleate, dimethallylfumarate; or any combination thereof.

5. A polymer modified adduct of claim 1 containing one or more rodlike mesogenic moieties which is prepared by (A) reacting
  (1) one or more epoxy resins containing an average of more than one vicinal epoxide group per molecule and containing one or more rodlike mesogenic moieties per molecule, with
  (2) one or more compounds containing (a) one or more rodlike mesogenic moieties and (b) two or more hydrogen atoms which are reactive with an epoxide group;
  thereby forming an adduct essentially free of epoxy groups and containing active hydrogen atoms reactive with an epoxy group;

(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsaturated group; and (C) copolymerizing the partially vinylized adduct from step (B) with (3) one or more polymerizable ethylenically unsaturated monomers, said monomers being employed in an amount of from 1 to about 30 percent by weight based on the combined weight of said monomers and adduct.

6. A polymer modified adduct of claim 5 wherein
(a) component (1) is a diglycidyl ether, diglycidyl ester or glycidyl amine or a combination of any two or more of such compounds;
(b) component (2) is a compound containing two amine hydrogen, phenolic hydroxyl or carboxyl groups per molecule or a combination of any two or more of such compounds; and
(c) component (3) is a polymerizable monomer which contains a polymerizable vinyl or allyl group.

7. A polymer modified adduct of claim 5 wherein
(a) component (1) is a diglycidyl ether of 4,4'-dihydroxybiphenyl, 4,4'-dihydroxystilbene, 4,4'-dihydroxydiphenylacetylene, dihydroxydiphenylazomethine, 4,4'-dihydroxyazobenzene, 4,4'-di hydroxyazoxybenzene, 4,4'-bis((4- hydroxy)phenoxy) diphenyl, 4,4'-dihydroxyalphamethylstilbene, 3,3',5,5'-tetramethyl- 4,4'-dihydroxydiphenyl, 3,3',5,5'-tetrachloro- 4,4'-dihydroxydiphenyl, 2,2',6,6'-tetramethyl- 4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydroxy-3,3',5,5'-tetrabromo-alpha-methylstilbene, N,N'-bis(4hydroxyphenyl)terephthalamide; a diglycidyl ether of a dihydric phenol represente d by the following formulas:
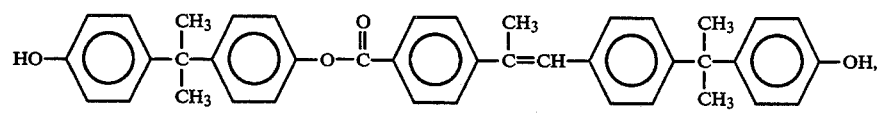
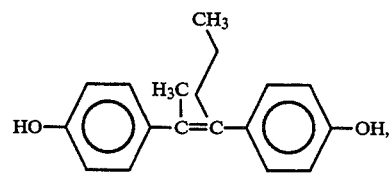
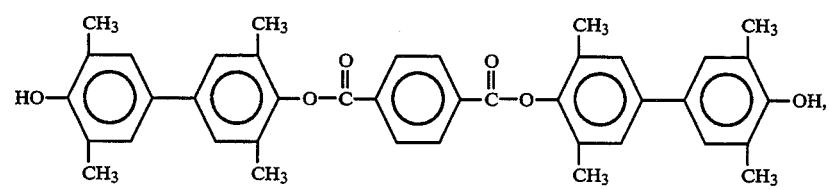
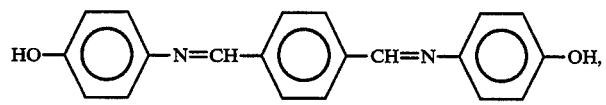
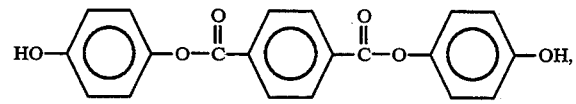
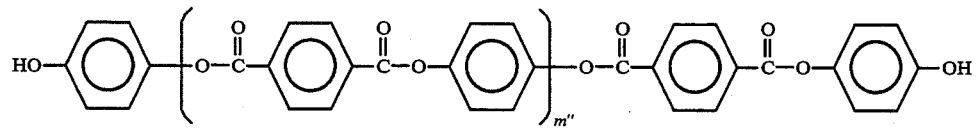
where m" has a value from 1 to about 10,
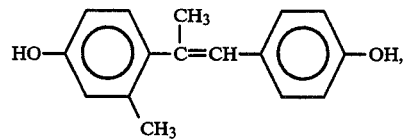
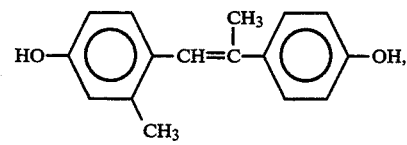
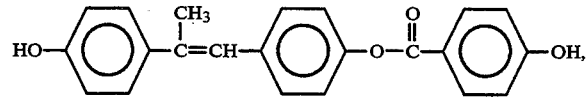
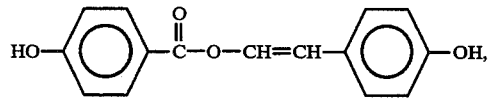
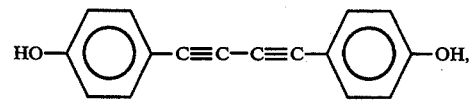
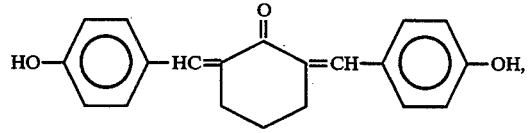

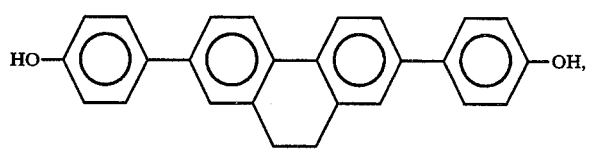
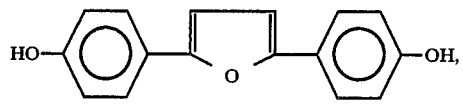
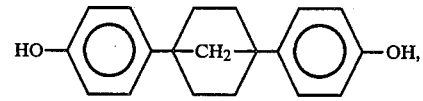
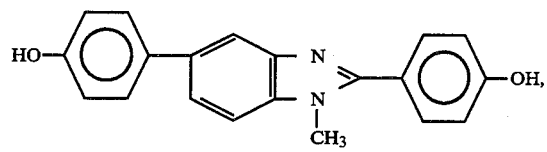
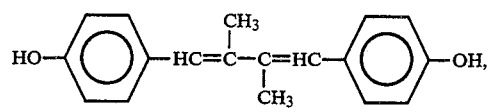
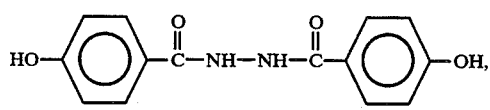
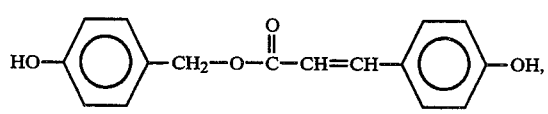
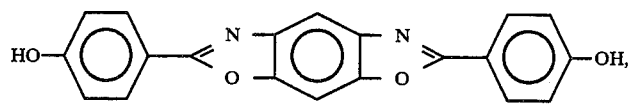
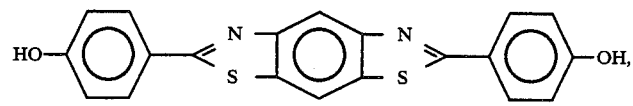
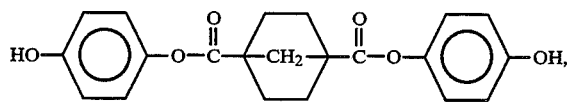
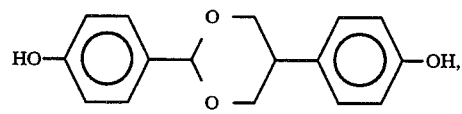
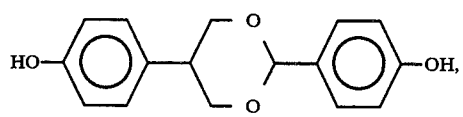
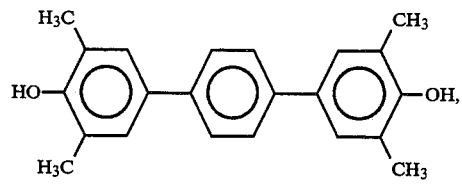
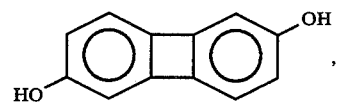
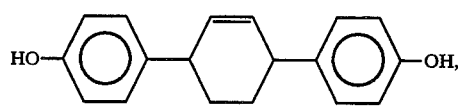
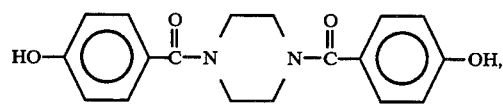
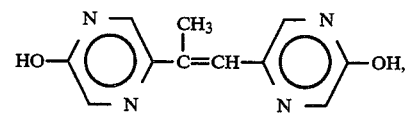
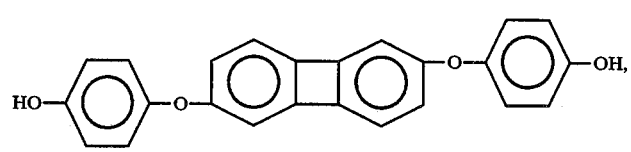
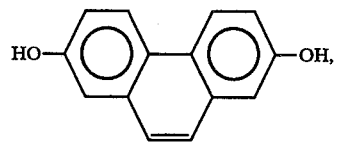
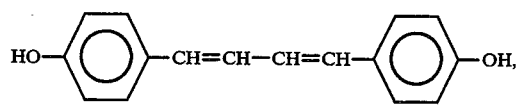

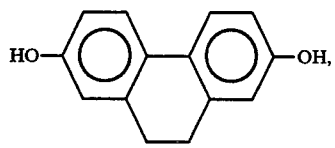
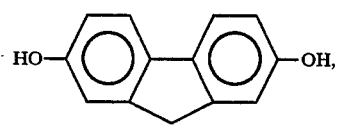
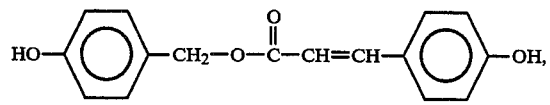
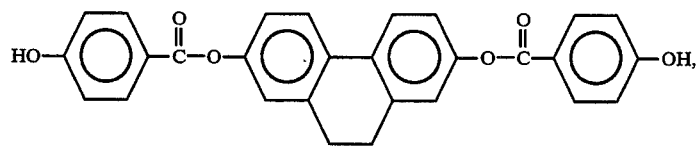
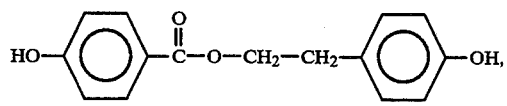
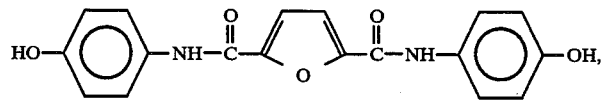
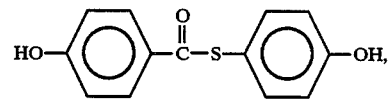
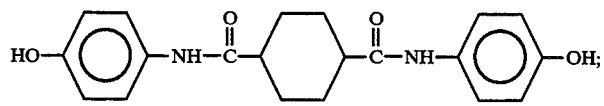

a tetraglycidyl amine of 4,4'-diamino-alphamethylstilbene, 4,4-diaminostilbene, 4,4'-diaminobenzanilide, 4,4'-diaminoazobenzene, 4,4'-diamino-alpha-cyanostilbene; an advanced diglycidyl ether resulting from advancing the aforementioned diglycidyl ethers with aromatic dihydroxyl or dicarboxylic acid containing compounds including all of the previously listed diphenol precursors to the diglycidyl ethers; or any combination thereof;

(b) component (2) is 4-aminodiphenyl, 4-aminostilbene, 4-amino-4'-methoxystilbene, 4-amino-4'-methylstilbene, 4-amino-4-chlorostilbene, 4-amino-4'-nitrostilbene, 4-amino-4'-cyanostilbene, 4-aminodiphenylacetylene, 4-aminodiphenylazomethine, 4-aminoazobenzene, 4-aminoazoxybenzene, 4-amino-alpha-methylstilbene, 4-aminobenzanilide, 4aminochalcone, 4-amino-alpha-cyanostilbene, 4-aminophenyl-4-methoxybenzoate, 4-amino-2,2',6,6'-tetramethyl-alpha-methylstilbene, 4-amino-2,6-dimethyl-alpha-methylstilbene, 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alphamethylstilbene, 3,3',5,5'-tetramethyl-4,4'-dihydroxydiphenyl, 3,3',5 5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alphacyanostilbene, 4-hydroxyphenyl-4-hydroxybenzoate, 4,4'-dihydroxy-3,3',5,5'-tetrabromo-alpha-methylstilbene, 4,4'-bis(4-(4hydroxyphenoxy)phenylsulfone)stilbene, 1,4-bis(4-hydroxyphenyl)-trans-cyclohexane, N,N'-bis(4-hydroxyphenyl)terephthalamide, 4,4'-dicarboxydiphenyl, 4,4'-dicarboxystilbene, 4,4'-dicarboxydiphenylacetylene, 4,4'-dicarboxyazobenzene, 4,4'-bis(4-carboxyphenoxy)diphenyl, 4,4'-dicarboxy-alphamethylstilbene, 3,3',5,5'-tetramethyl-4,4'-dicarboxydiphenyl, 3,3',5,5'-tetrachloro-4,4'-dicarboxydiphenyl, 2,2',6,6'-tetramethyl-4,4'-dicarboxydiphenyl, 4,4'-dicarboxybenz anilide, 4,4'-dicarboxy-alpha-cyanostilbene, 4,4'-dicarboxy-3,3',5,5-tetrabromo-alpha-methylstilbene, bis(4-carboxyphenyl)terephthalamide, 4,4'-bis(4-(4carboxyphenoxy)phenylsulfone)stilbene, 1,4-bis(4-carboxyphenyl)-trans-cyclohexane; or any combination thereof; and (c) component (3) is styrene, alpha-methylstyrene, vinyl toluenes, halogenated styrenes, t-butylstyrenes, divinylbenzenes, methyl,-ethyl, n-butyl, isopropyl, actyl, stearyl esters of acrylic or methacrylic acid, acrylic acid, methacrylic acid, crotonic acid, acrylamide, N-alkylacrylamides, diallylphthalate, triallylisocyanurate, diallylmaleate, dimethallylfumarate; or any combination thereof.

8. A polymer modified adduct of claim 1 containing one or more rodlike mesogneic moieties which is prepared by
(A) reacting
   (1) one or more epoxy resins containing an average of more than one vicinal epoxide group per molecule and which are free of rodlike mesogenic moieties, with
   (2) one or more compounds containing (a) one or more rodlike mesogenic moieties and (b) two or more hydrogen atoms which are reactive with an epoxide group;
   thereby forming an adduct essentially free of epoxy groups and containing active hydrogen atoms reactive with an epoxy group;
(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsaturated group; and
(C) copolymerizing the partially vinylized adduct from step (B) with (3) one or more polymerizable ethylenically unsaturated monomers, said monomers being employed in an amount of from about 1 to about 30 percent by weight based on the combined weight of said monomers and adduct.

9. A polymer modified adduct of claim 8 wherein
(a) component (1) is a diglycidyl ether, diglycidyl ester or glycidyl amine or a combination of any two or more of such compounds;
(b) component (2) is a compound containing two amine hydrogen, phenolic hydroxyl or carboxyl groups per molecule or a combination of any two or more of such compounds; and
(c) component (3) is a polymerizable monomer which contains a polymerizable vinyl or allyl group.

10. A polymer modified adduct of claim 8 wherein
(a) component (1) is a diglycidyl ether of resorcinol, 4,4'-isopropylidenediphenol (bisphenol A), 4,4'-dihydroxybenzophenone (bisphenol K)1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide, 3-phenylbisphenol A, 3,3'5,5'-tetrachlorobisphenol A, 3,3'-dimethoxybisphenol A, dipropylene glycol, poly(propylene glycol)s, thiodiglycol; a triglycidyl ether of tris(hydroxyphenyl)methane; a triglycidyl ether of p-aminophenol; a tetraglycidyl ether of 4,4'-diaminodiphenylmethane; a polyglycidyl ether of a phenol or substituted phenoi-aldehyde condensation product (novolac); a polyglycidyl ether of a dicyclopentadiene or an oligomer thereof and phenol or substituted phenol condensation product; an advanced diglycidyl ether resulting from advancing the aforesaid diglycidyl ethers with bisphenol A (4,4'-isopropylidenediphenol), o-, m-, pdihydroxybenzene, 2,4-dimethylresorcinol, 4chlororesorcinol, tetramethylhydroquinone, 1,1bis(4-hydroxyphenyl)ethane, bis(4,4'-dihydroxyphenyl)methane, 4,4'-dihydroxydiphenyl ether, 3,3',5,5'-tetramethyl-dihydroxydiphenyl ether, 3,3',5,5'-dichlorodihydroxydiphenyl ether, 4,4'-bis(p-hydroxyphenyl isopropyl)diphenyl ether, 4,4'-bis(p-hydroxyphenoxy)benzene, 4,4'-bis(phydroxyphenoxy)-diphenyl ether, 4,4'-bis(4(4hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid, mixtures thereof; or any combination thereof;
(b) component (2) is 4-aminodiphenyl, 4-aminostilbene, 4-amino-4'-methoxystilbene, 4-amino-4'-methylstilbene, 4-amino-4'-chlorostilbene, 4-amino-4'-nitrostilbene, 4-amino-4'-cyanostilbene, 4-aminodiphenylacety 4-aminodiphenylazomethine, 4-aminoazobenzene, 4-aminoazoxybenzene, 4-amino-alpha-methylstilbene, 4-aminobenzanilide, 4-aminochalcone, 4-amino-alpha-cyanostilbene, 4-aminophenyl-4-methoxybenzoate, 4-amino-2,2',6,6'-tetramethyl-alpha-methylstilbene, 4-amino-2,6-dimethyl-alpha-methylstilbene, 4,4'-dihydroxybiphenyl, 4,4 '-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alphamethylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alphacyanostilbene, 4-hydroxyphenyl-4-hydroxybenzoate, 4,4'-dihydroxy-3,3',5,5'-tetrabromo-alpha-methylstilbene, 4,4'-bis(4-(4-hydroxyphenoxy)phenylsulfone)stilbene, 1,4-bis(4-hydroxyphenyl)-trans-cyclohexane, N,N'-bis(4hydroxyphenyl)terephthalamide, 4,4'-dicarboxydiphenyl, 4,4'-dicarboxystilbene, 4,4'-dicarboxydiphenylacetylene, 4,4'-dicarboxyazobenzene, 4,4'-bis(4carboxyphenoxy)dipheny 1, 4,4'-dicarboxy-alpha-methyl-stilbene, 3,3',5,5'-tetramethyl-4,4'-dicarboxydiphenyl, 3,3',5,5'-tetrachloro-4,4'-dicarboxydiphenyl, 2,2',6,6'-tetramethyl-4,4'-dicarboxydiphenyl, 4,4'-dicarboxy-benzanilide, 4,4'-dicarboxy-alpha-cyanostilbene, 4,4'-dicarboxy-3,3',5,5'-tetrabromo-alpha-methylstilbene, N,N'-bis(4-carboxyphenyl)terephthalamide, 4,4'-bis(4-(4carboxyphenoxy)phenylsulfone)stilbene, 1,4-bis(4-carboxyphenyl)-trans-cyclohexane; or any combination thereof; and
(c) component (3)is styrene, alpha-methylstyrene, vinyl toluenes, halogenated styrenes, t-butylstyrenes, divinylbenzenes, methyl, ethyl, n-butyl, isopropyl, actyl, stearyl esters of acrylic or methacrylic acid, acrylic acid, methacrylic acid, crotonic acid, acrylamide N-alkylacrylamides, diallylphthalate, triallylisocyanurate, diallylmaleate, dimethallylfumarate; or any combination thereof.

11. A polymer modified adduct containing one or more rodlike mesogenic moieties which is prepared by
(A) reacting
   (1) one or more epoxy resins containing (a) an average of more than one vicinal epoxide group per molecule and (b) one or more rodlike mesogenic moieties, with
   (2) one or more compounds which (a) are free of rodlike mesogenic moieties and (b) contain two or more hydrogen atoms which are reactive with an epoxide group; thereby forming an adduct essentially free of epoxy groups and containing active hydrogen atoms reactive with an epoxy group;

(B) partially vinylizing the resultig adduct prepared in step (A) by reactign from about 0.05 to about 5 mole percent of the reactive hydrogen atoms contained in said adduct with a compound containing (1) a group reactive with said reactive hydrogen atoms and (2) a polymerizable ethylenic unsaturated group; and (C) copolymerizing the partially vinylized adduct prepared in step (B) with (3) one or more polymerizable ethylenically unsaturated monomers, a part of all of which monomer(s) contain one or more rodlike mesogenic moieties, said monomers being employed in an amount of from about 1 to about 30 percent by weight based on the combined weight of said monomers and adduct.

12. A polymer modified adduct of claim 11 wherein
(a) component (1) is a diglycidyl ether, diglycidyl ester or glycidyl amine or a combination of any two or more of such compounds;

(b) component (2) is a compound containing two amine hydrogen, phenolic hydroxyl or carboxyl groups per molecule or a combination of any two or more of such compounds; and (c) component (3) is a polymerizable monomer which contains a polymerizable vinyl or allyl group.

13. A polymer modified adduct of claim 11 wherein
(a) component (1) is a diglycidyl ether of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4'-bis((4-hydroxy)-phenoxy)diphenyl, 4,4'-dihydroxy-alpha-methylstilbene, 3,3',5,5'-tetramethyl 4,4'-dihydroxydiphenyl, 3,3',5,5'-tetrachloro 4,4'-dihydroxydiphenyl, 2,2',6,6'-tetramethyl 4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4hydroxybenzoate, 4,4'-dihydroxy-3,3',5,5'-tetrabromo-alpha-methylstilbene, N,N'-bis(4-hydroxyphenyl)-terephthalamide; a diglycidyl ether of a dihydric phenol represented by the following formulas:

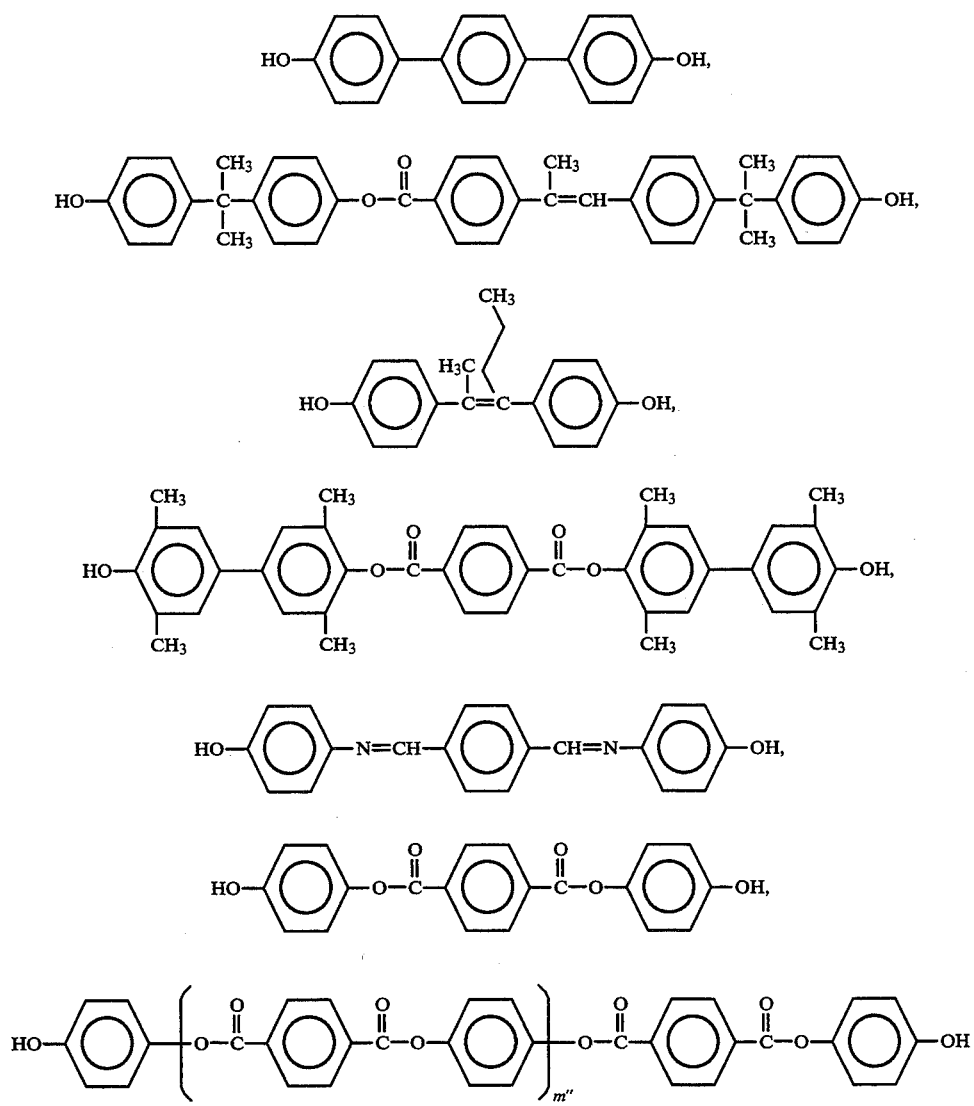

where m" has a value from 1 to about 10,

-continued
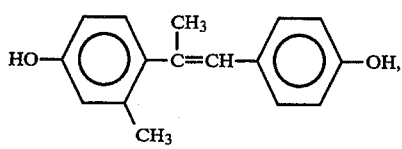
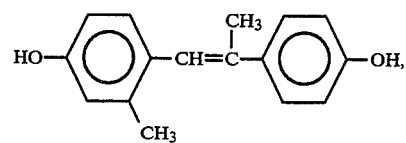
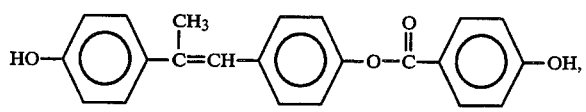
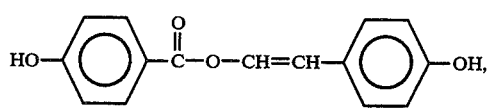
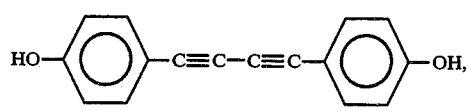
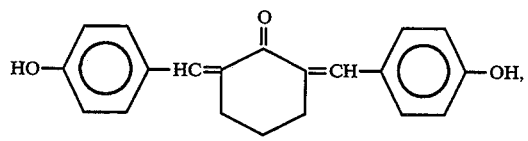
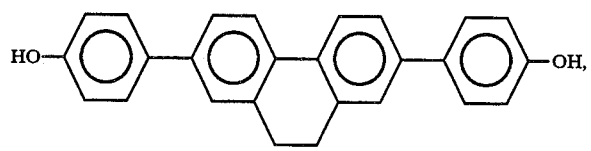
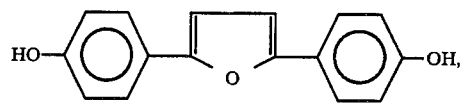
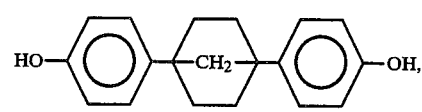
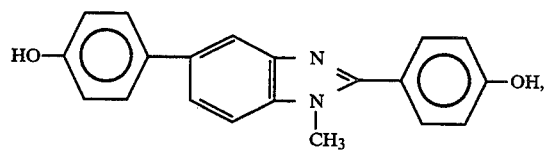
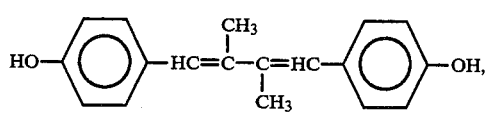
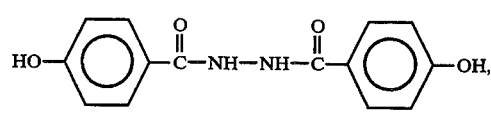
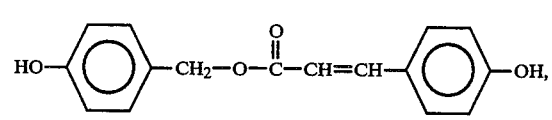
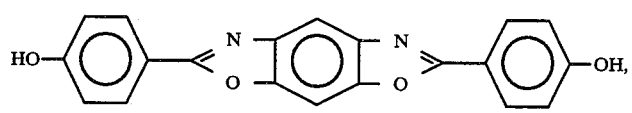
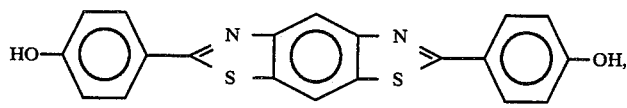
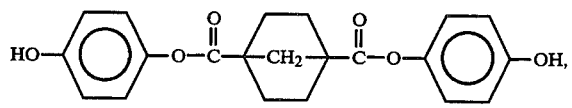
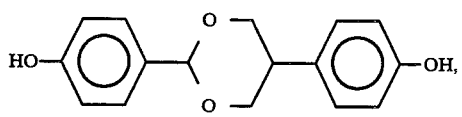
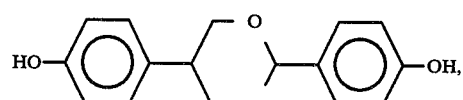
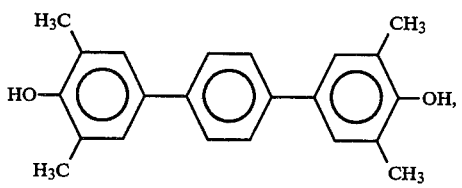

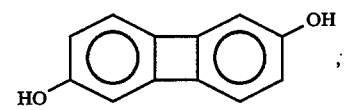

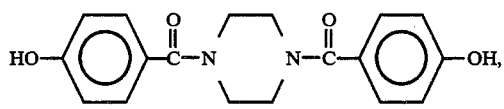

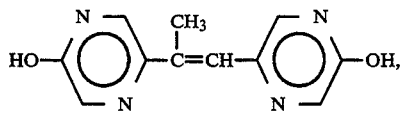

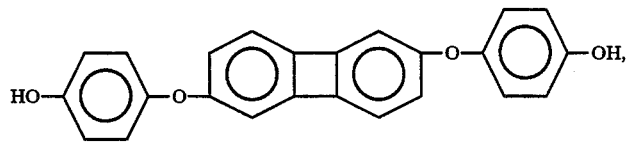

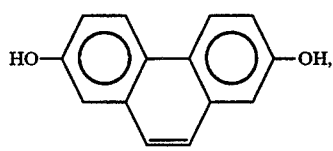

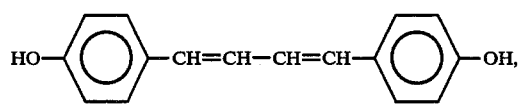

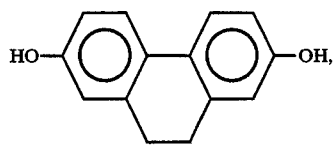

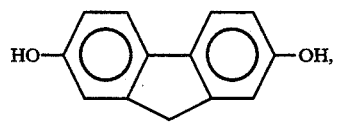

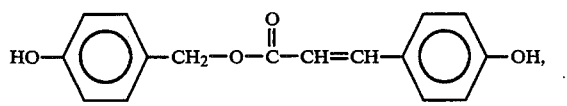

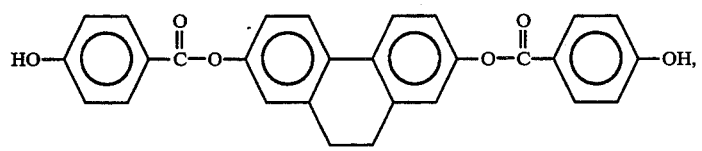

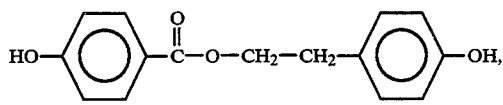

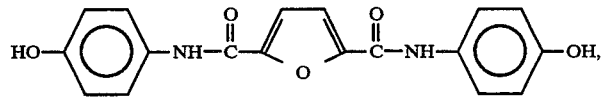

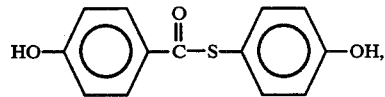

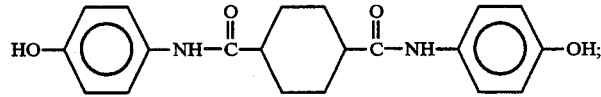

a tetraglycidyl amine of 4,4′-diamino-alphamethylstilbene, 4,4′-diaminostilbene, 4,4′-diaminobenzanilide, 4,4′-diaminoazobenzene, 4,4′-diamino-alpha-cyanostilbene; an advanced diglycidyl ether resulting from advancing the aforementioned diglycidyl ethers with aromatic dihydroxyl or dicarboxylic acid containing compounds including all of the previously listed diphenol precursors to the diglycidyl ethers; or any combination thereof;

(b) component (2) is aniline, 4-methoxyaniline, 4-chloroaniline, 4-methylaniline, 4-cyanoaniline, 2,6-dimethylaniline, 4-aminodiphenyl oxide, 4-aminodiphenylmethane, 4-aminodiphenylsulfone, 4-aminodiphenylsulfide, methylamine, 4-aminobenzophenone, n-hexylamine, cyclohexylamine, aminonorbornane, ammonia, resorcinol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 4,4'-bis(4-(4-hydroxyphenoxy)-phenylsulfone)diphenyl ether, 1,1-bis(4-hydroxyphenyl)cyclohexane, tris(hydroxyphenyl)methane, phenol or substituted phenol-aldehyde condensation products (novolacs), dicyclopentadiene or an oligomer thereof and phenol or substituted phenol condensation products, 4,4'-dicarboxydiphenylmethane, 4,4'-isopropylidenedicarboxylic acid, 3,3',5,5'-tetrabromo-4,4'-isopropylidenedicarboxylic acid, terephthalic acid, isophthalic acid, 1,4-cyclohexanedicarboxylic acid, 1,6-hexanedicarboxylic acid, dicyclopentadienedicarboxylic acid, tris(carboxyphenyl)methane, 4,4'-bis(4-(4-carboxyphenoxy)phenylsulfone)diphenyl ether, 1,1-bis(4-carboxyphenyl)cyclohexane; or a combination thereof; and (c) component (3) is

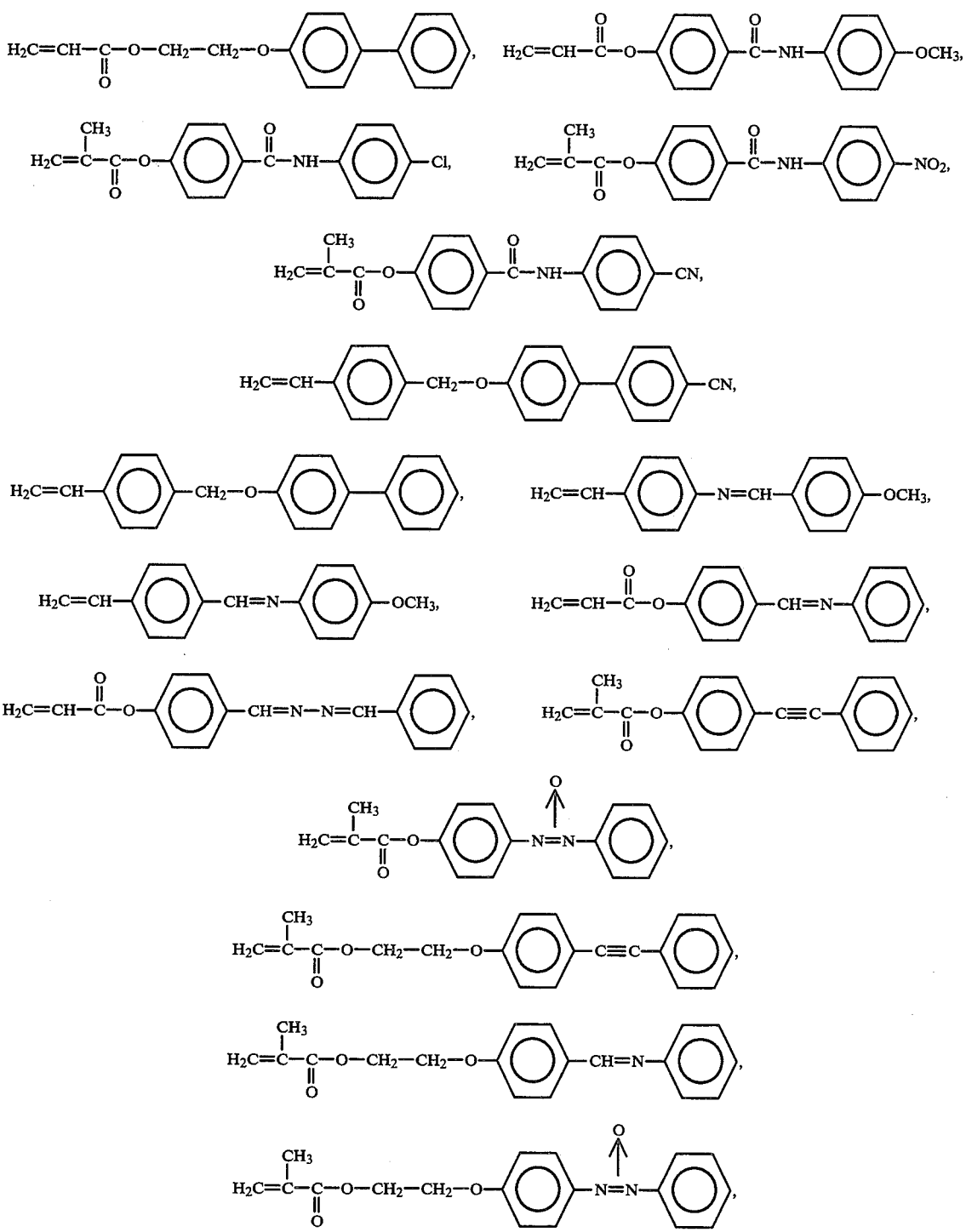

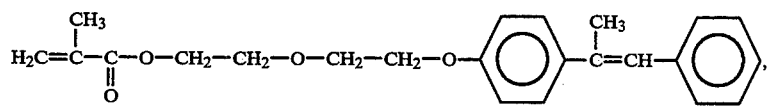
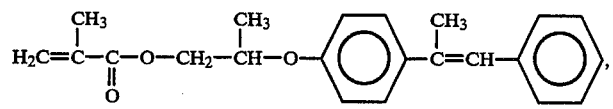
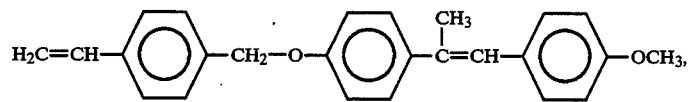
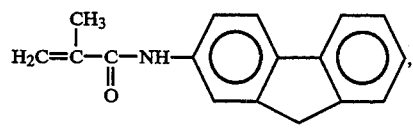
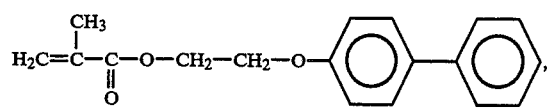
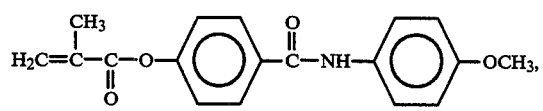
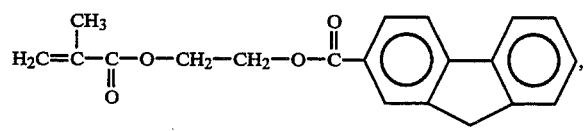
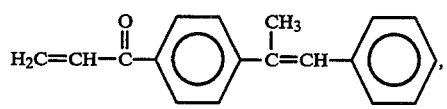
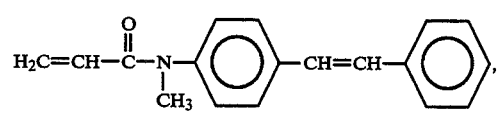
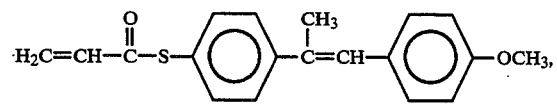
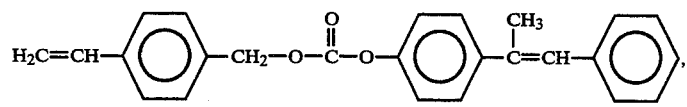
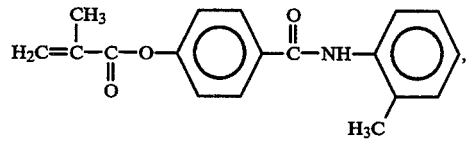
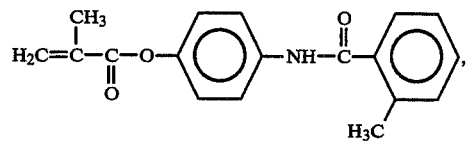
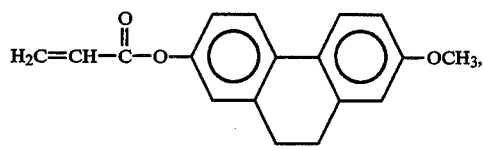
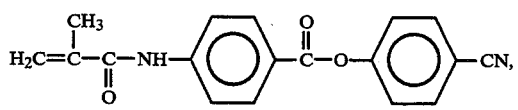
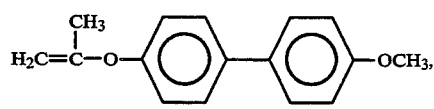
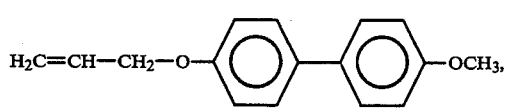
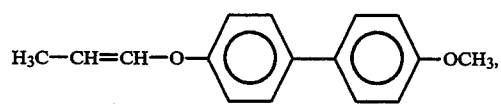
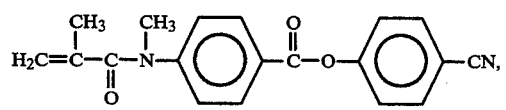

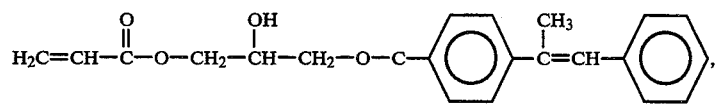
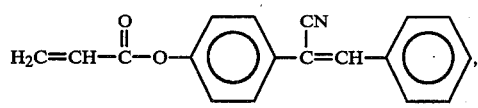
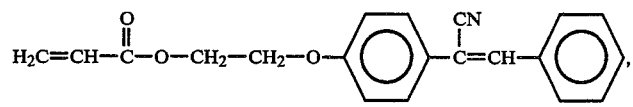
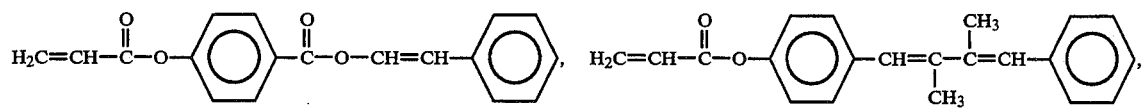
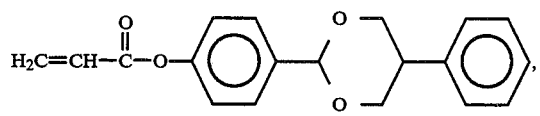
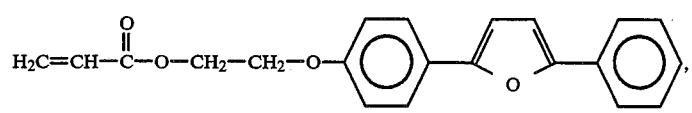
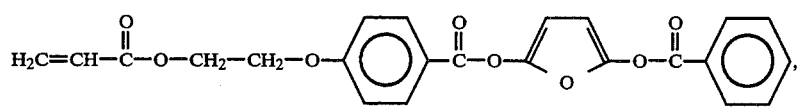
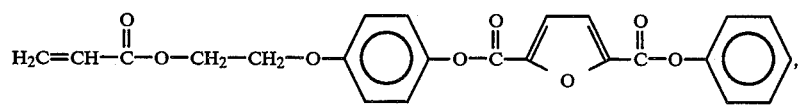
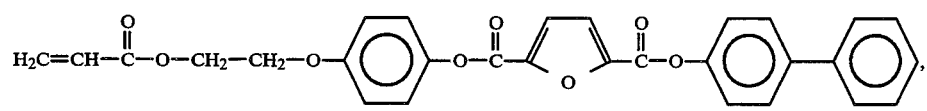
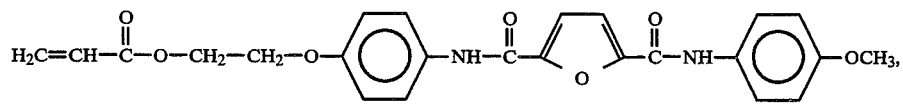
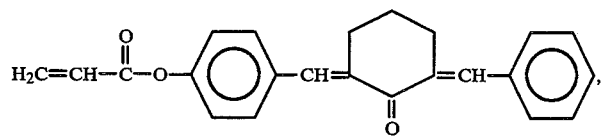
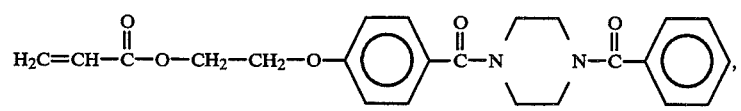
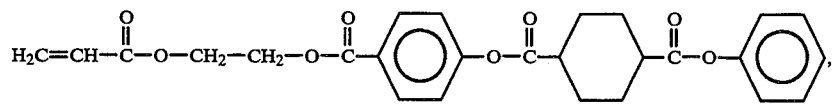

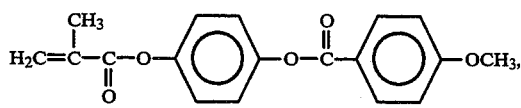
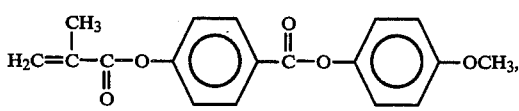
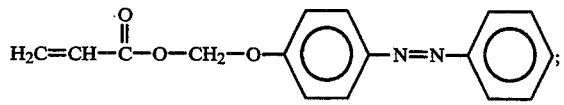

or any combination thereof.

14. A polymer modified adduct of claim 1 containing one or more rodlike mesogenic moieties which is prepared by
(A) reacting
(1) one or more epoxy resins containing an average of more than one vicinal epoxide group per molecule and containing one or more rodlike mesogenic moieties per molecule, with
(2) one or more compounds containing (a) one or more rodlike mesogenic moieties and (b) two or more hydrogen atoms which are reactive with an epoxide group;
thereby forming an adduct essentially free of epoxy groups and containing active hydrogen atoms reactive with an epoxy group;
(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsaturated group; and
(C) copolymerizing the partially vinylized adduct from step (B) with (3) one or more polymerizable ethylenically unsaturated monomers, a part or all of which monomer(s) contain one or more rodlike mesogenic moieties, said monomers being employed in an amount of from about 1 to about 30 percent by weight based on the combined weight of said monomers and adduct.

15. A polymer modified adduct of claim 14 wherein
(a) component (1) is a diglycidyl ether, diglycidyl ester or glycidyl amine or a combination of any two or more of such compounds;
(b) component (2) is a compound containing two amine hydrogen, phenolic hydroxyl or carboxyl groups per molecule or a combination of any two or more of such compounds; and
(c) component (3) is a polymerizable monomer which contains a polymerizable vinyl or allyl group.

16. A polymer modified adduct of claim 14 where
(a) component (1) is a diglyeidyl ethers of 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis((4-hydroxy)-phenoxy)diphenyl, 4,4'-dihydroxy-alpha-methylstilbene, 3,3',5,5'-tetramethyl-4,4'-dihydroxydiphenyl, 3,3',5,5'-tetrachloro-4,4'-dihydroxy-diphenyl, 2,2',6,6'-tetramethyl-4,4'-dihydroxydiphenyl, 4,4'-dihydroxybenzanilide, 4,4'-dihydroxychalcone, 4,4'-dihydroxy-alpha-cyanostilbene, 4-hydroxyphenyl-4-hydroxybenzoate, 4,4'-dihydroxy-3,3',5,5'-tetrabromo-alpha-methylstilbene, N,N'-bis(4-hydroxyphenyl)terephthalamide; a diglycidyl ether of a dihydric phenol represented by the following formulas:

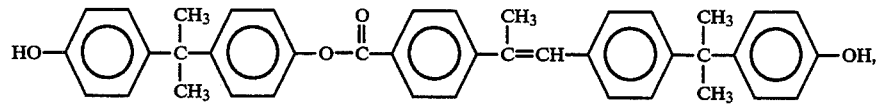

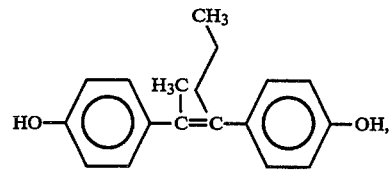

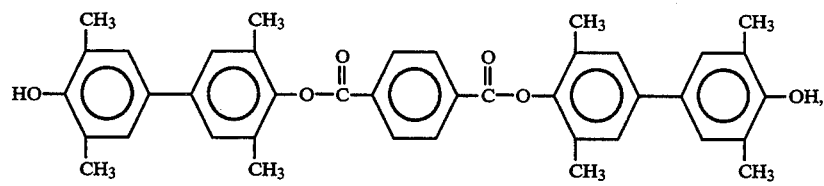

-continued
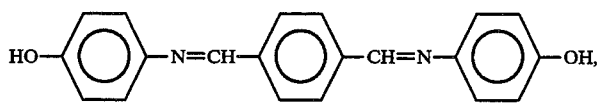
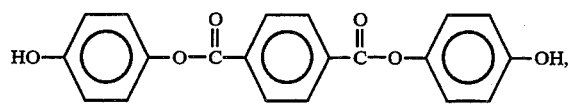
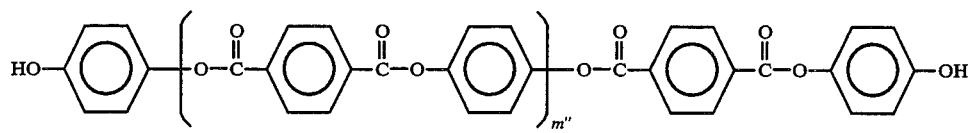
where m" has a value from 1 to about 10,
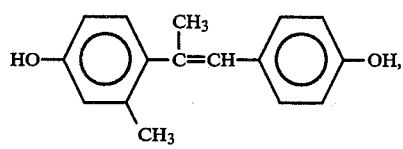 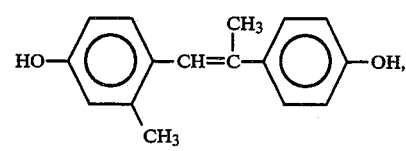
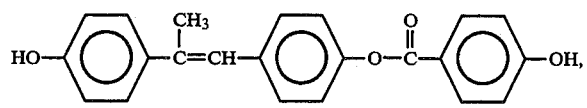
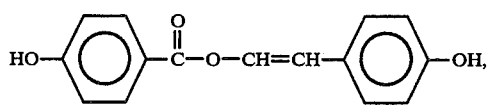 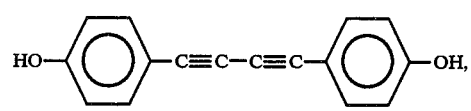
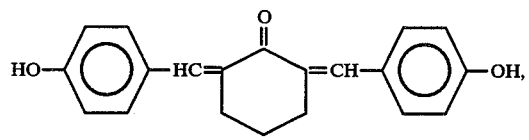
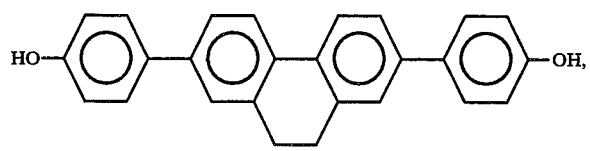
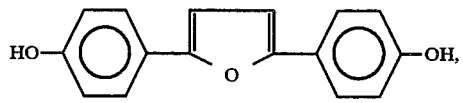 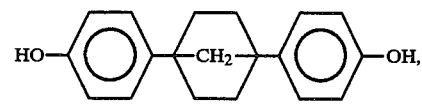
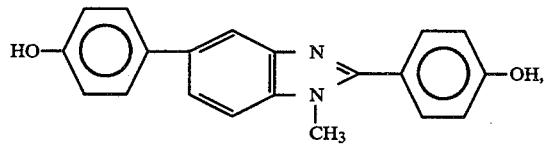 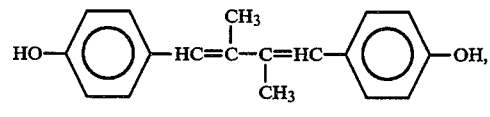
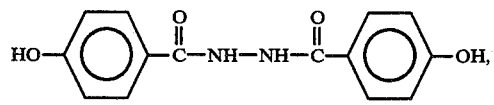 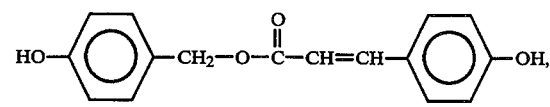
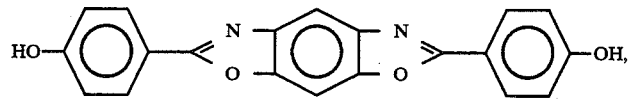

-continued
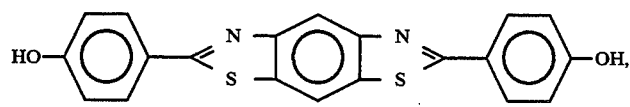
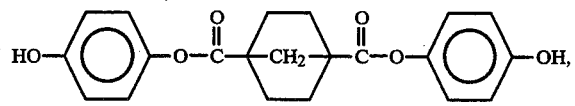
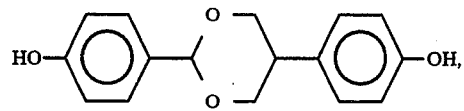
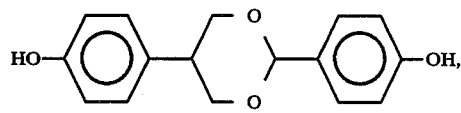
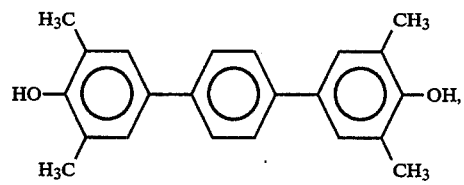
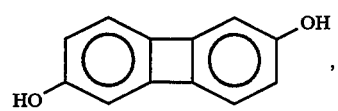
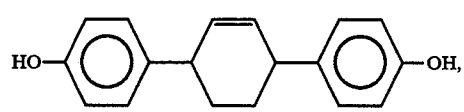
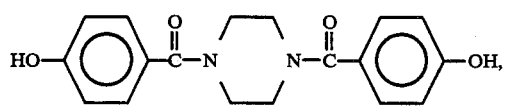
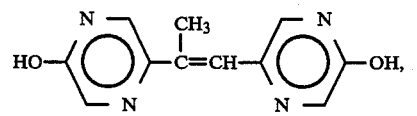
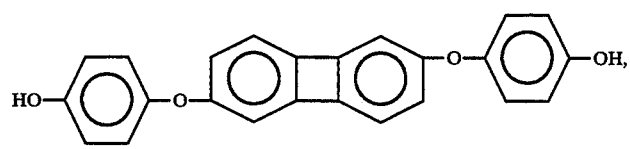
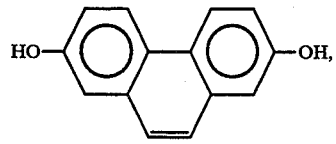
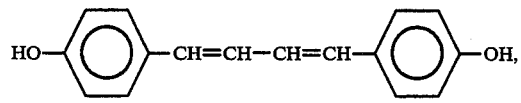
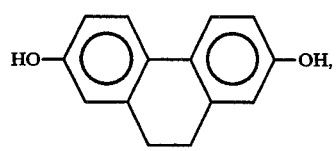
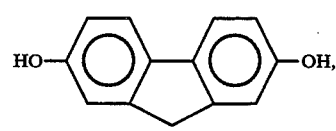
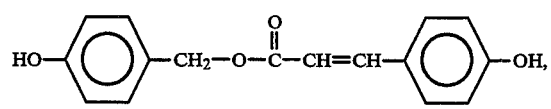
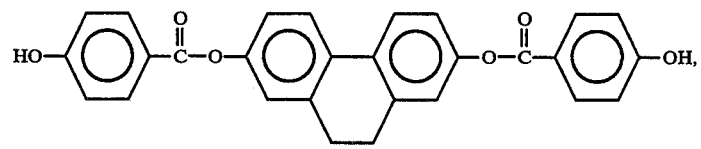
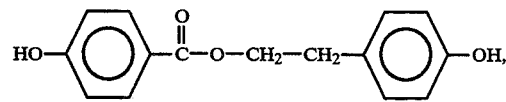
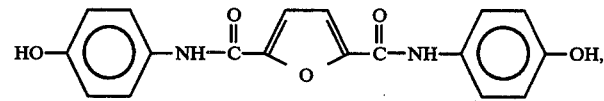

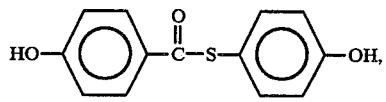

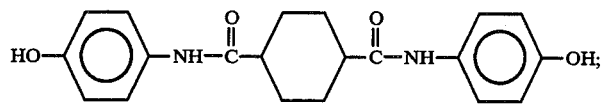

a tetraglycidyl amine of 4,4'-diamino-alphamethylstilbene, 4,4'- diaminostilbene, 4,4'-diaminobenzanilide, 4,4'-diaminoazobenzene, 4,4'-diamino-alpha-cyanostilbene; an advanced diglycidyle ether resulting from advancing the aforementioned diglycidyl ethers with aromatic dihydroxyl or dicarboxylic acid containing compounds including all of the previously listed diphenol precursors to the diglycidyl ethers; or any combination thereof;

(b) component (2) is 4-aminodiphenyl, 4-aminostilbene, 4-amino-4'-methoxystilbene, 4-amino-4'-methylstilbene, 4-amino-4'-chlorostilbene, 4-amino-4'-nitrostilbene, 4-amino-4'-cyanostilbene, 4-aminodiphenylacetylene, 4-aminodiphenylazomethine, 4-aminoazobenzene, 4-aminoazoxybenzene, 4-amino-alpha-methylstilbene, 4-aminobenzanilide, 4-aminochalcone, 4-amino-alpha-cyanostilbene, 4-aminophenyl-4-methoxybenzoate, 4-amino-2,2',6,6'-tetramethyl-alpha-methylstilbene, 4-amino-2,6-dimethyl-alpha-methylstilbene, 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alphamethylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, 4,4'-dihydroxychalcone, 4,4'-dihydroxy-alphacyanostilbene, 4-hydroxyphenyl-4-hydroxybenzoate, 4,4'-dihydroxy-3,3',5,5'-tetrabromo-alpha-methylstilbene, 4,4'-bis(4-(4-hydroxyphenoxy)phenylsulfone)stilbene, 1,4-bis(4-hydroxyphenyl)-trans-cyclohexane, N,N'-bis(4-hydroxyphenyl)terephthalamide 4,4'-dicarboxydiphenyl, 4,4'-dicarboxystilbene, 4,4'-dicarboxydiphenylacetylene, 4,4'-dicarboxyazobenzene, 4,4'-bis (4-carboxyphenoxy)diphenyl, 4,4'-dicarboxy-alphamethylstilbene, 3,3',5,5'-tetramethyl-4,4'-dicarboxydiphenyl, 3,3',5,5'-tetrachloro-4,4'-dicarboxydiphenyl, 2,2',6,6'-tetrametal-4,4'-dicarboxydiphenyl, 4,4'-dicarboxybenzanilide, 4,4'-dicarboxy-alphacyanostilbene , 4,4'-dicarboxy-3,3',5,5'-tetrabromo-alpha-methylstilbene, N,N'-bis(4-carboxyphenyl)-terephthalamide, 4,4'-bis(4-(4-carboxyphenoxy)-phenylsulfone)stilbene, 1,4-bis(4-carboxyphenyl)-trans-cyclohexane; or any combination thereof; and (c) component (3) is

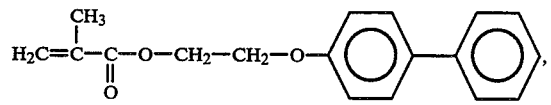

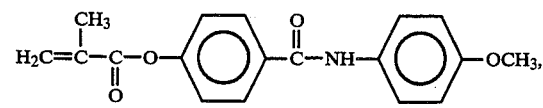

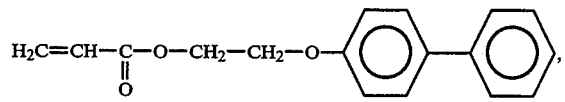

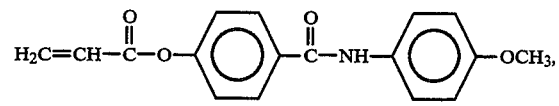

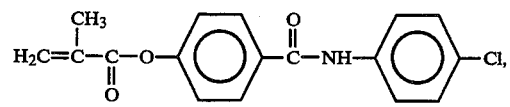

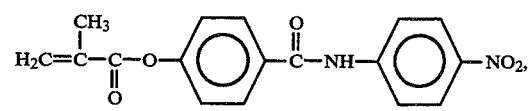

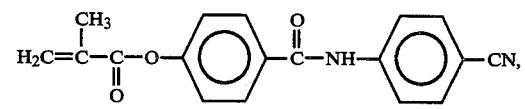

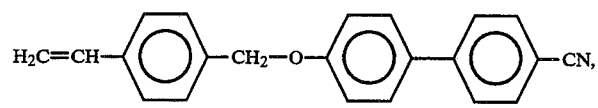

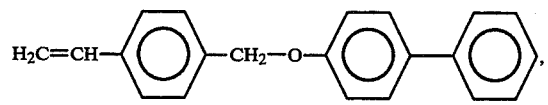

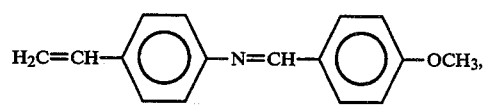

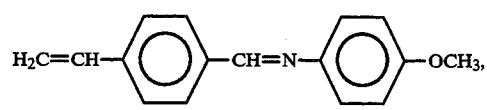
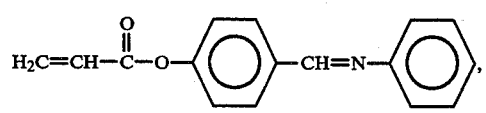
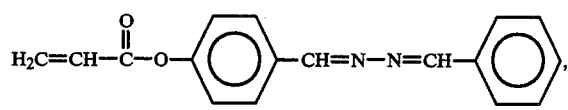
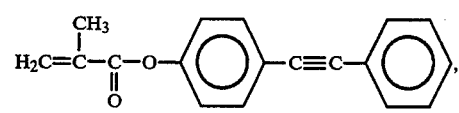
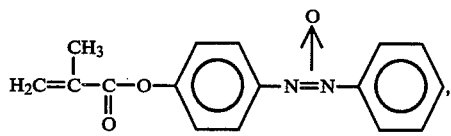
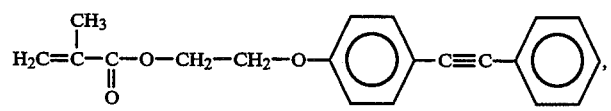
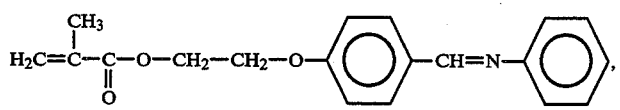
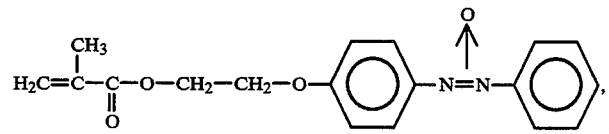
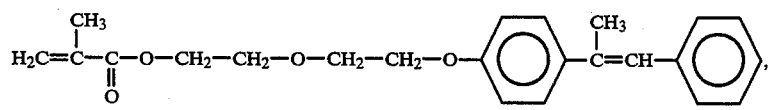
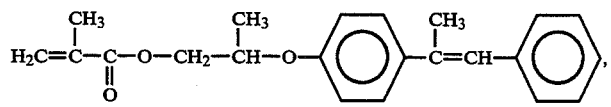
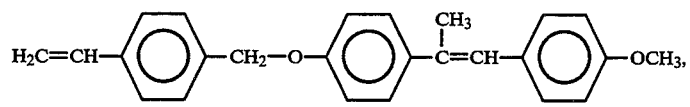
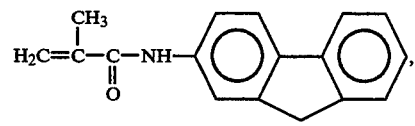
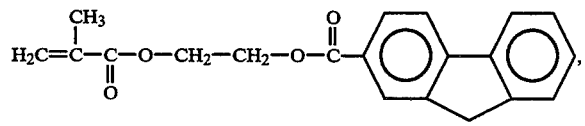
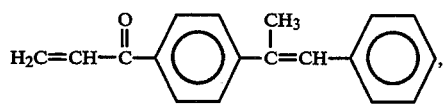
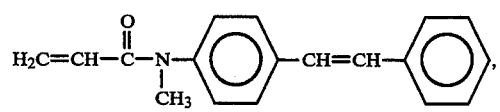
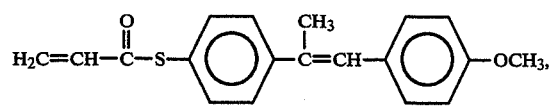

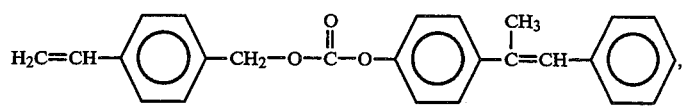
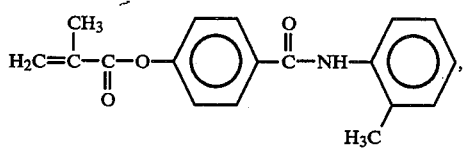
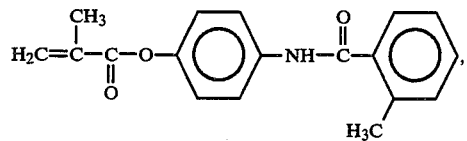
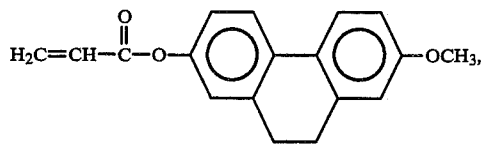
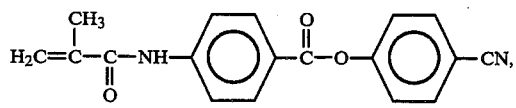
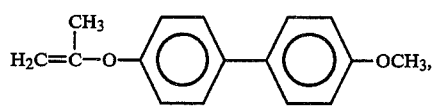
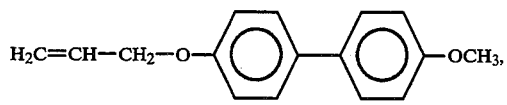
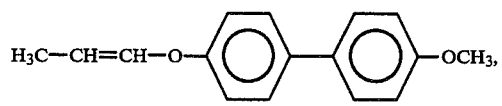
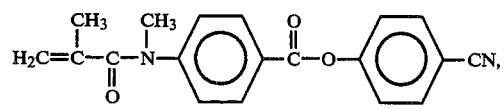
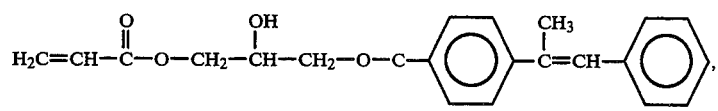
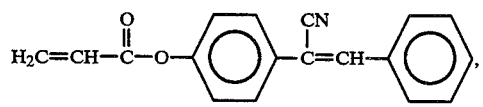
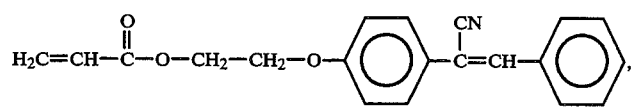
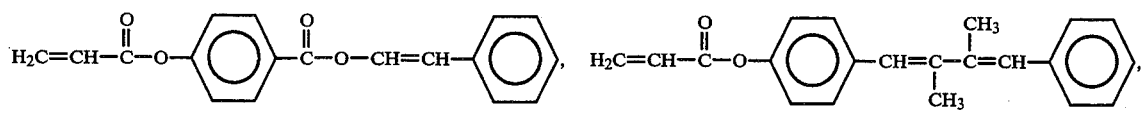
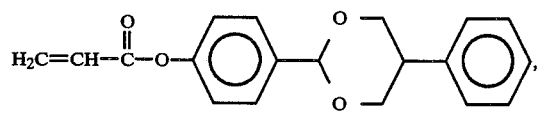
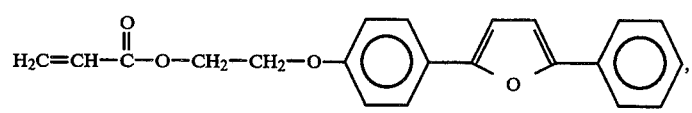
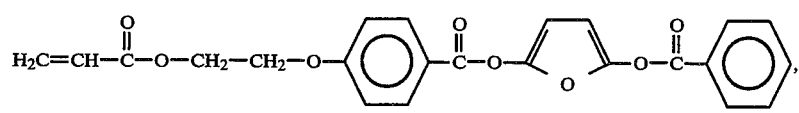
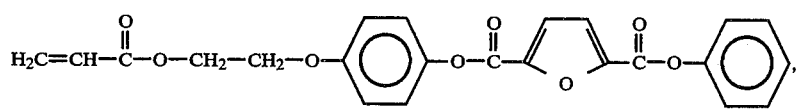

-continued

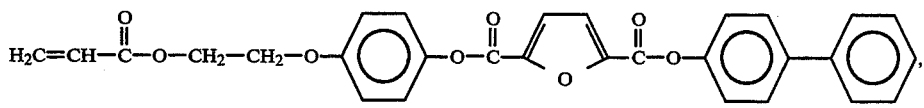

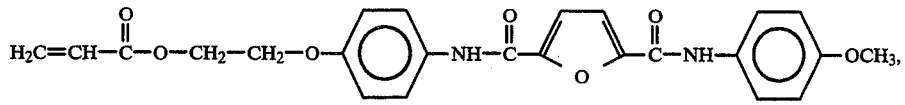

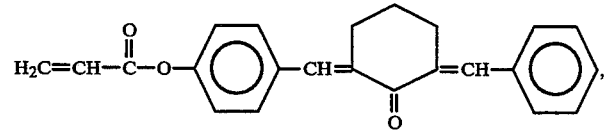

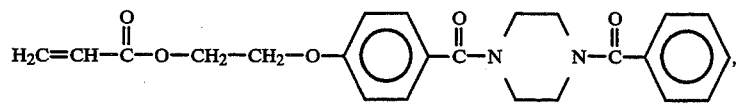

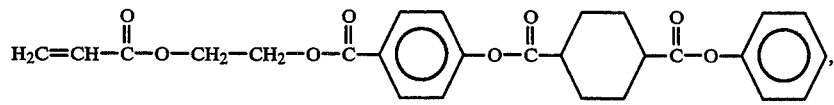

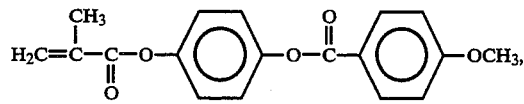   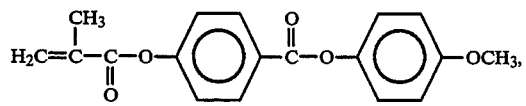

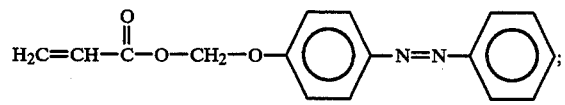

or combination thereof.

17. A polymer modified adduct of claim 1 containing one or more rodlike mesogenic moieties which is prepared by
(A) reacting
  (1) one or more epoxy resins containing an average of more than one vicinal epoxide group per molecule and which are free of rodlike mesogenic moieties, with
  (2) one or more compounds containing (a) one or more rodlike mesogenic moieties and (b) two or more hydrogen atoms which are reactive with an epoxide group;
thereby forming an adduct essentially free of epoxy groups and containing active hydrogen atoms reactive with an epoxy group;
(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsaturated group; and
(C) copolymerizing the partially vinylized adduct from step (B) with (3) one or more polymerizable ethylenically unsaturated monomers, a part or all of which monomer(s) contain one or more rodlike mesogenic moieties, said monomers being employed in an amount of from about 1 to about 30 percent by weight based on the combined weight of said monomers and adduct.

18. A polymer modified adduct of claim 17 wherein
(a) component (1) is a diglycidyl ether, diglycidyl ester or glycidyl amine or a combination of any two or more of such compounds;
(b) component (2) is a compound containing two amine hydrogent phenolic hydroxyl or carboxyl groups per molecule or a combination of any two or more of such compounds; and
(c) component (3) is a polymerizable monomer which contains a polymerizable vinyl or allyl group.

19. A polymer modified adduct of claim 17 wherein
(a) component (1) is a diglycidyl ether of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A, 4,4'-thiodiphenol (bisphenol S), 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, dipropylene glycol, poly(propylene glycol)s, thiodiglycol; a triglycidyl ether of tris(hydroxyphenyl)methane; a triglycidyl ether of p-aminophenol; a tetraglycidyl ether of 4,4'-diaminodiphenylmethane; a polyglycidyl ether of a phenol or substituted phenol-aldehyde condensation product (novolac); a polyglycidyl ether of a dicyclopentadiene or an oligomer thereof and phenol or substituted phenol condensation product; an advanced diglycidyl ether resulting from advancing the aforesaid diglycidyl ethers with bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyl-dihydroxydiphenyl ether, 3,3',5,5'-dichlorodihydroxydiphenyl ether, 4,4'-bis(p-hydroxyphenyl isopropyl)diphenyl ether, 4,4'-bis(p-hydroxyphenoxy)benzene, 4,4'- bis(p-hydroxyphenoxy)diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid, mixtures thereof, or any combination thereof;

(b) component (2) is 4-aminodiphenyl, 4-aminostilbene, 4-amino-4'-methoxystilbene, 4-amino-4'-methylstilbene, 4-amino-4'-chlorostilbene, 4-amino-4'-nitrostilbene, 4-amino-4'-cyanostilbene, 4-aminodiphenylacet 4-aminodiphenylazomethine, 4-aminoazobenzene, 4-aminoazoxybenzene, 4-amino-alpha-methylstilbene, 4-aminobenzanilide, 4aminochalcone, 4-amino-alpha-cyanostilbene, 4-aminophenyl-4-methoxybenzoate, 4-amino-2,2',6,6'-tetramethyl-alpha-methylstilbene, 4-amino-2,6-dimethyl-alpha-methylstilbene, 4,4'-dihydroxybiphenyl, 4,4'-dihydroxystilbene, 4,4'-dihydroxydiphenylacetylene, 4,4'-dihydroxydiphenylazomethine, 4,4'-dihydroxyazobenzene, 4,4'-dihydroxyazoxybenzene, 4,4'-bis(4-hydroxyphenoxy)diphenyl, 4,4'-dihydroxy-alphamethylstilbene, 3,3',5,5'-tetramethyl-4,4'-dihydroxydiphenyl, 3,3',5,5'-tetrachloro-4,4'-dihydroxydiphenyl, 2,2',6,6'-tetramethyl-4,4'-dihydroxydiphenyl, 4,4'-dihydroxybenzanilide, dihydroxychalcone, 4,4'-dihydroxy-alphacyanostilbene, 4-hydroxyphenyl-4-hydroxybenzoate, 4,4'-dihydroxy-3,3',5,5'-tetrabromo-alpha-methylstilbene, 4,4'-bis(4-(4-hydroxyphenoxy)phenylsulfone)-stilbene, 1,4-bis(4-hydroxyphenyl)-trans-cyclohexane, N,N'-bis(4-hydroxyphenyl)terephthalamide, mixtures thereof and the like 4,4'-dicarboxy-diphenyl, 4,4'-dicarboxystilbene, 4,4'-dicarboxy-diphenylacetylene, 4,4'-dicarboxyazobenzene, 4,4'-bis(4-carboxyphenoxy)diphenyl, 4,4'-dicarboxy-alphamethylstilbene, 3,3',5,5'-tetramethyl-4,4'-dicarboxydiphenyl, 3,3',5,5'-tetrachloro-4,4'-dicarboxydiphenyl, 2,2',6,6'-tetramethyl-4,4'-dicarboxydiphenyl, 4,4'-dicarboxybenzanilide, 4,4'-dicarboxy-alphacyanostilbene , 4,4'-dicarboxydiphenyl, 3,3',5,5'-tetrabromo-alpha-methylstilbene, N,N'-bis(4-carboxyphenyl)terephthalamide, 4,4'-bis(4-(4carboxyphenoxy)phenylsulfone)stilbene, 1,4-bis(4-carboxyphenyl)-trans-cyclohexane; or any combination thereof; and (c) component (3) is

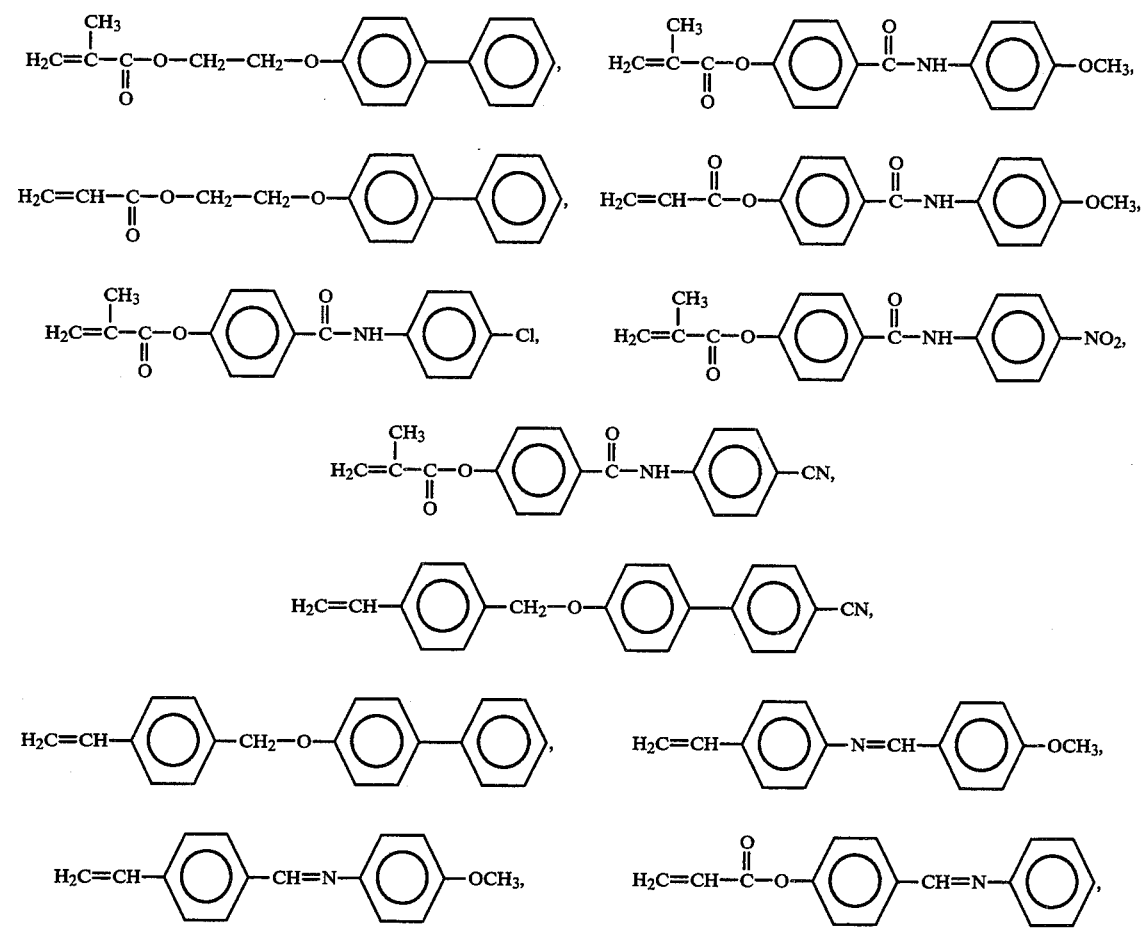

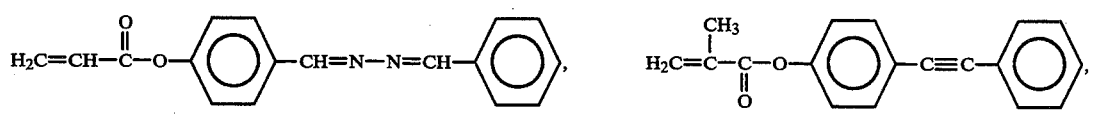
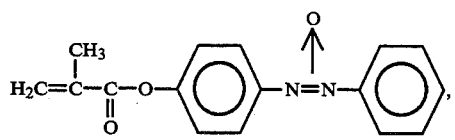
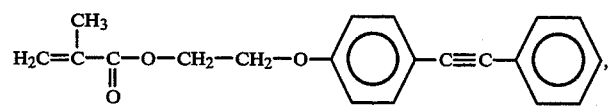
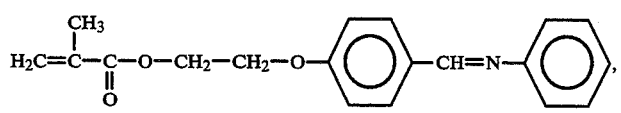
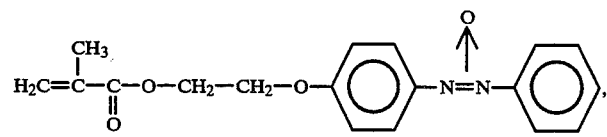
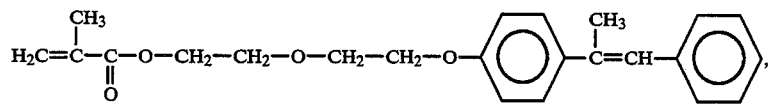
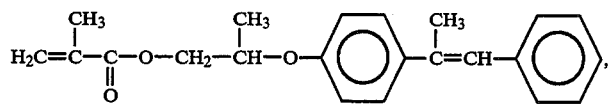
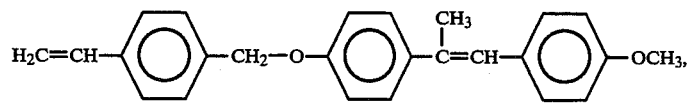
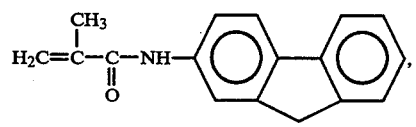
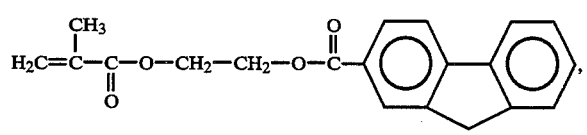
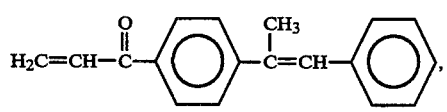
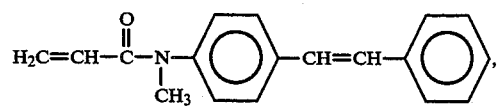
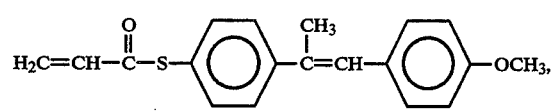
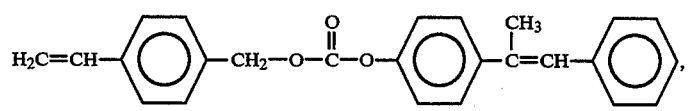

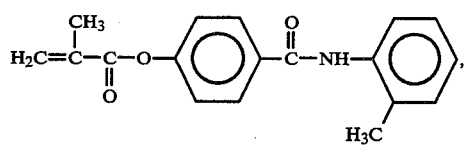 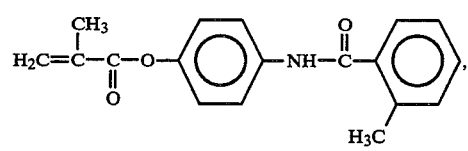
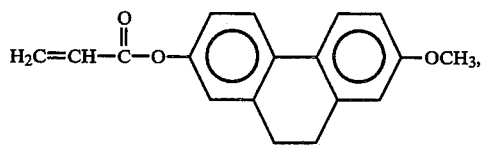 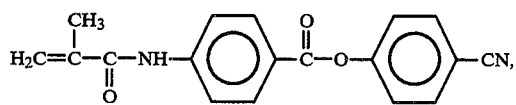
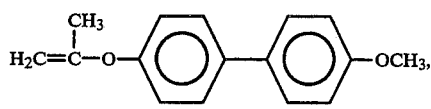 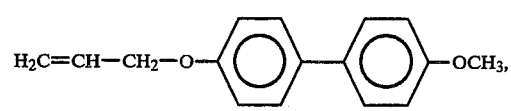
 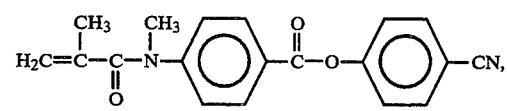
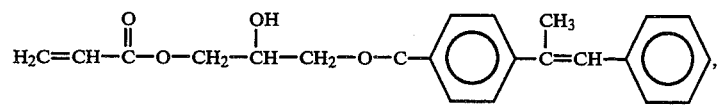
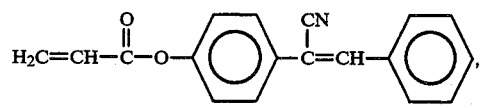
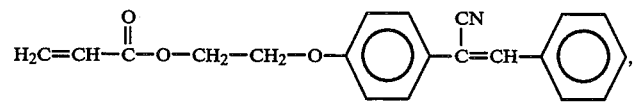
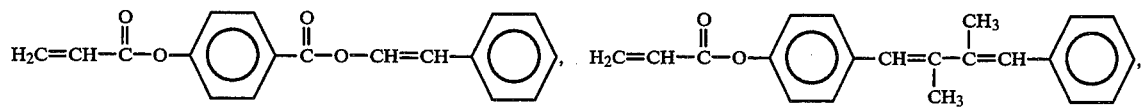
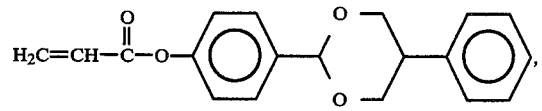
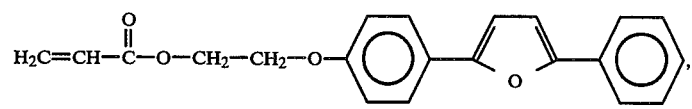
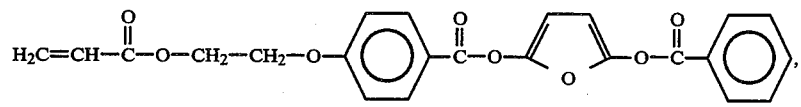
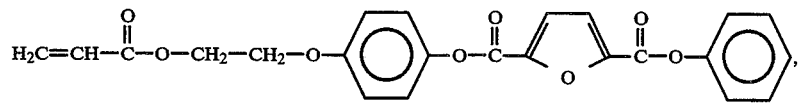
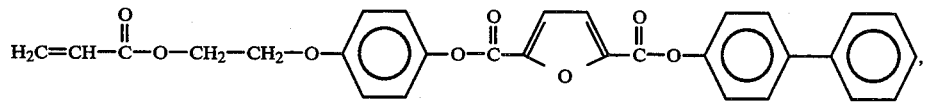

-continued

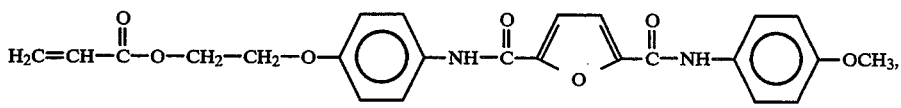

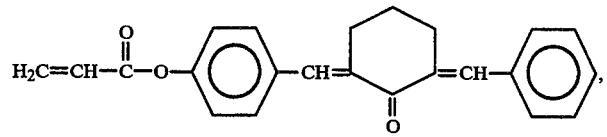

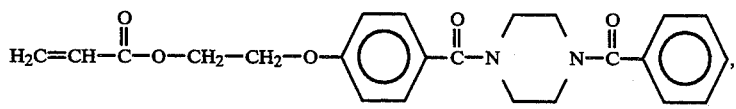

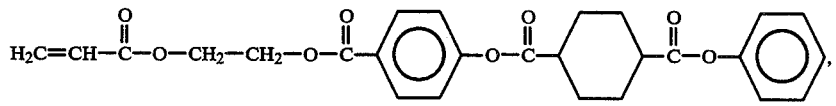

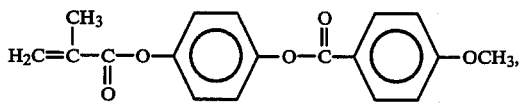 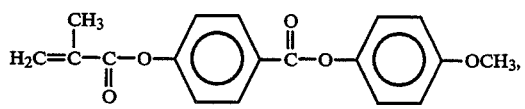

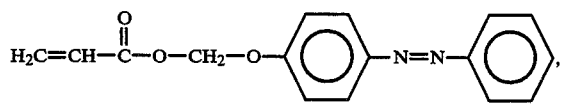

or combination thereof.

20. A polymer modified adduct of claim 1 containing one or more rodlike mesogenic moieties which is prepared by
(A) reacting
  (1) one or more epoxy resins containing an average of more than one vicinal epoxide group per molecule and which are free of rodlike mesogenic moieties, with
  (2) one or more compounds which (a) are free of rodlike mesogenic moieties and (b) contain two or more hydrogen atoms which are reactive with an epoxide group;
thereby forming an adduct essentially free of epoxy groups and containing active hydrogen atoms reactive with an epoxy group;
(B) partially vinylizing the adduct prepared in step (A) by reacting from about 0.05 to about 5 mole percent of the reactive hydrogen atoms contained in said adduct with a compound containing (1) a group reactive with said reactive hydrogen atoms and (2) a polymerizable ethylenic unsaturated group; and
(C) copolymerizing the partially vinylized adduct from step (B) with (3) one or more polymerizable ethylenically unsaturated monomers, a part or all of which monomer(s) contain one or more rodlike mesogenic moieties, said monomers being employed in an amount of from about 1 to about 30 percent by weight based on the combined weight of said monomers and adduct.

21. A polymer modified adduct of claim 20 wherein
(a) component (1) is a diglycidyl ether, diglycidyl ester or glycidyl amine or a combination of any two or more of such compounds;
(b) component (2) is a compound containing two amine hydrogen, phenolic hydroxyl or carboxyl groups per molecule or a combination of any two or more of such compounds; and
(c) component (3) is a polymerizable monomer which contains a polymerizable vinyl or allyl group.

22. A polymer modified adduct of claim 20 wherein (a) component (1) is a diglycidyl ether of resorcinol, 4,4'-isopropylidenediphenol (bisphenol A), 4,4'-dihydroxybenzophenone (bisphenol K), 1,1-bis(4-hydroxyphenyl)-1-phenylethane (bisphenol AP), dihydroxydiphenylmethane (bisphenol F), 3,3',5,5'-tetrabromobisphenol A 4,4'-thiodiphenol (bisphenol S), 4,4'-sulfonyldiphenol, 4,4'-dihydroxydiphenyl oxide, 3-phenylbisphenol A, 3,3',5,5'-tetrachlorobisphenol A, 3,3'-dimethoxybisphenol A, dipropylene glycol, poly(propylene glycol)s, thiodiglycol; a triglycidyl ether of tris(hydroxyphenyl)methane; a triglycidyl ether of p-aminophenol; a tetraglycidyl ether of 4,4'-diaminodiphenylmethane; a polyglycidyl ether of a phenol or substituted phenol-aldehyde condensation product (novolac); a polyglycidyl ether of a dicyclopentadiene or an oligomer thereof and phenol or substituted phenol condensation product; an advanced diglycidyl ether resulting from advancing the aforesaid diglycidyl ethers with bisphenol A (4,4'-isopropylidenediphenol), o-, m-, p-dihydroxybenzene, 2,4-dimethylresorcinol, 4-chlororesorcinol, tetramethylhydroquinone, 1,1-bis(4-hydroxyphenyl)ethane, bis(4,4'-dihydroxyphenyl)methane, 4,4'-dihydroxydiphenyl ether, 3,3',5,5'-tetramethyl-dihydroxydiphenyl ether, 3,3,5,5'-dichlorodihydroxydiphenyl ether, 4,4'-bis(p-hydroxyphenyl isopropyl)diphenyl ether, 4,4'-bis(p-hydroxyphenoxy)benzene, 4,4'-bis(p-hydroxyphenoxy)-diphenyl ether, 4,4'-bis(4(4-hydroxyphenoxy)phenyl sulfone)diphenyl ether, 4,4'-dihydroxydiphenyl sulfone, 4,4'-dihydroxydiphenyl sulfide, 4,4'-dihydroxydiphenyl disulfide, 2,2'-dihydroxydiphenyl sulfone, 4,4'-dihydroxydiphenyl methane, 1,1-bis(p-hydroxyphenyl)cyclohexane, 4,4'-dihydroxybenzophenone, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, p-hydroxybenzoic acid, mixtures thereof; or any combination thereof;

(b) component (2) is aniline, 4-methoxyaniline, 4-chloroaniline, 4-methylaniline, 4-cyanoaniline, 2,6-dimethylaniline, 4-aminodiphenyl oxide, 4-aminodiphenylmethane, 4-aminodiphenylsulfone, 4-aminodiphenylsulfide, methylamine, 4-aminobenzophenone, n-hexylamine, cyclohexylamine, aminonorbornane, ammonia, resorcinol, hydroquinone, bisphenol A, 4,4'-dihydroxydiphenylmethane, 3,3',5,5'-tetrabromobisphenol A, 4,4'-thiodiphenol, 4,4'-sulfonyldiphenol, 4,4'-dihydroxydiphenyl oxide, 4,4'-bis(4-(4-hydroxyphenoxy)-phenylsulfone)diphenyl ether, 1,1-bis(4-hydroxyphenyl)cyclohexane, tris(hydroxyphenyl)methane, phenol or substituted phenol-aldehyde condensation products (novolacs), dicyclopentadiene or an oligomer thereof and phenol or substituted phenol condensation products, 4,4'-dicarboxydiphenylmethane, 4,4'-isopropylidenedicarboxylic acid, 3,3',5,5'-tetrabromo-4,4'-isopropylidenedicarboxylic acid, terephthalic acid, isophthalic acid, 1,4-cyclohexanedicarboxylic acid, 1,6-hexanedicarboxylic acid, dicyclopentadienedicarboxylic acid, tris(carboxyphenyl)-methane, 4,4'-bis(4-(4-carboxyphenoxy)phenylsulfone)-diphenyl ether, 1,1-bis(4-carboxyphenyl)cyclohexane; or a combination thereof; and (c) component (3) is

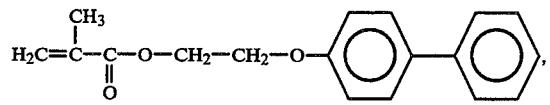

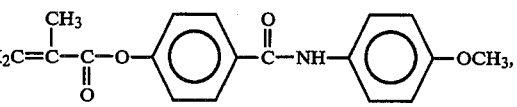

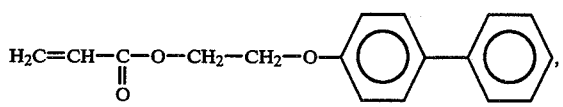

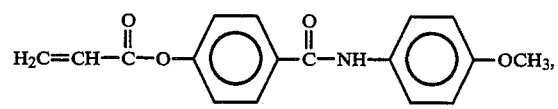

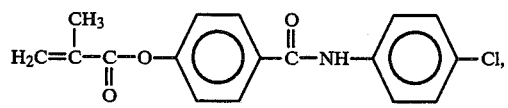

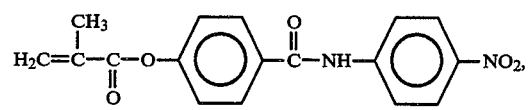

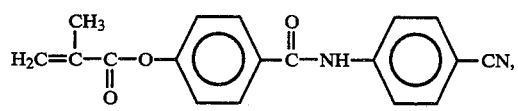

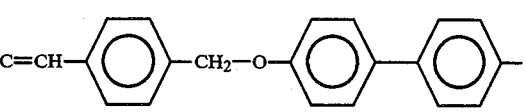

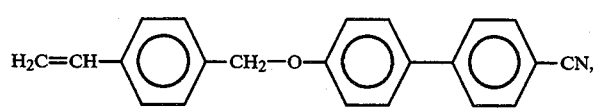

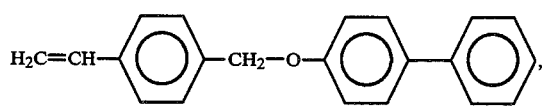

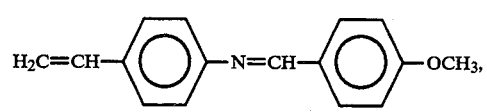

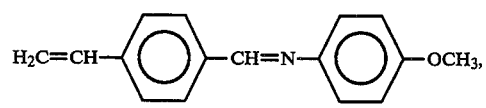

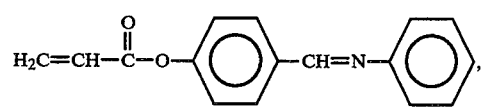

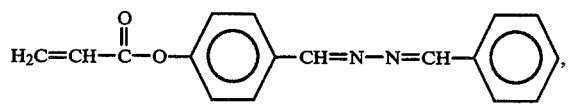

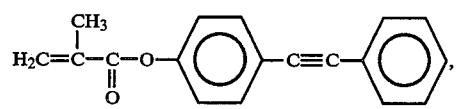

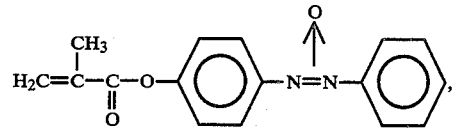

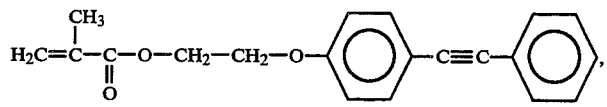

-continued
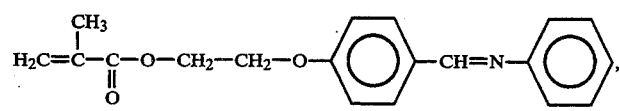
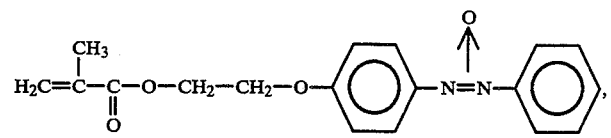
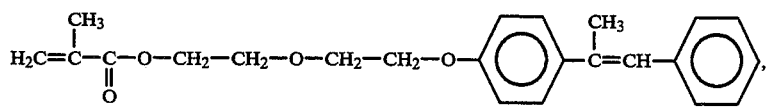
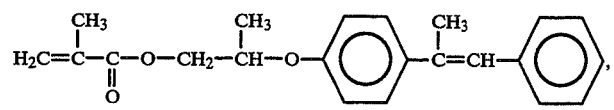
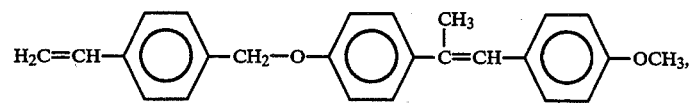
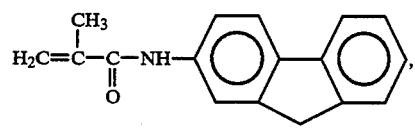
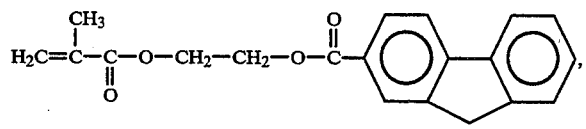
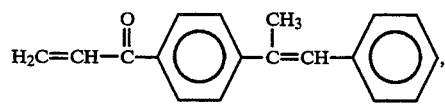
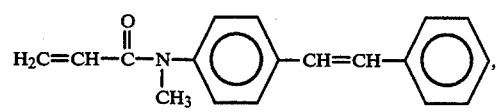
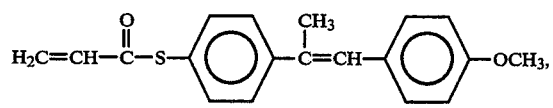
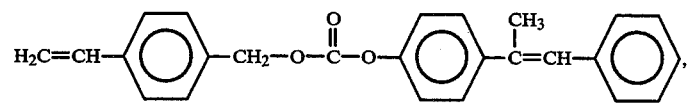
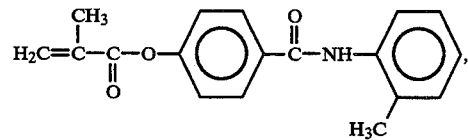
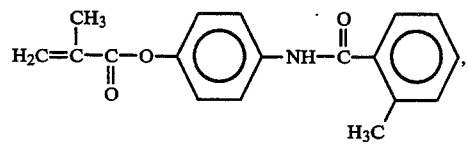
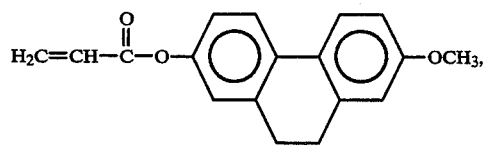
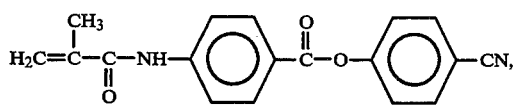

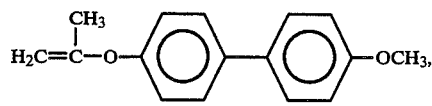
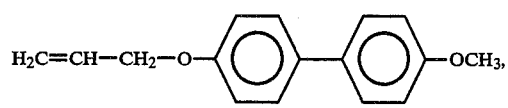
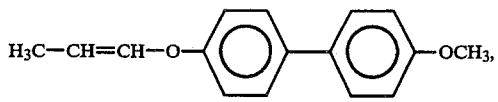
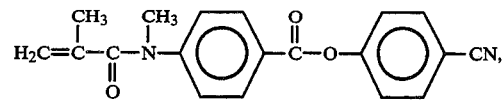
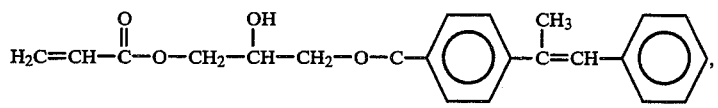
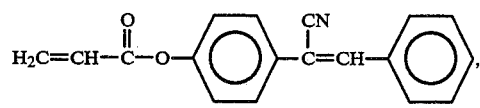
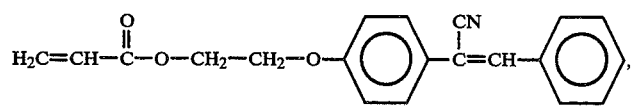
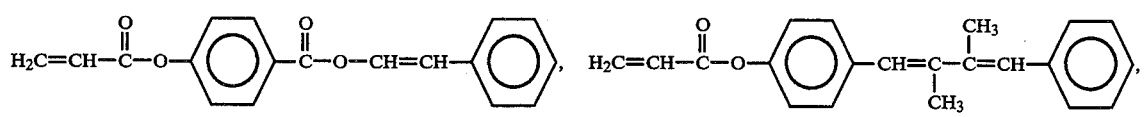
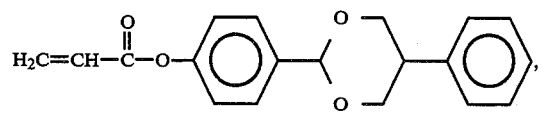
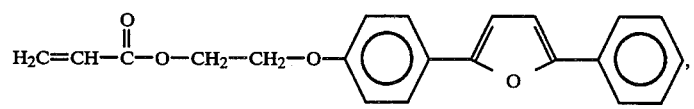
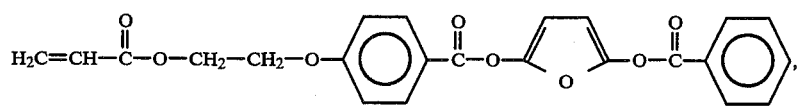
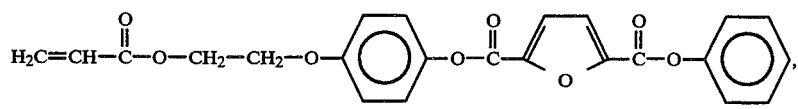
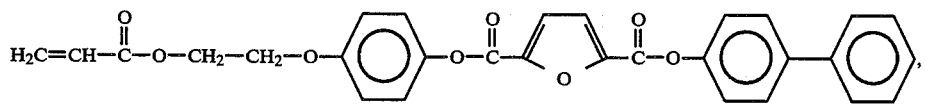
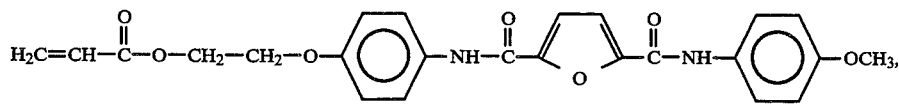
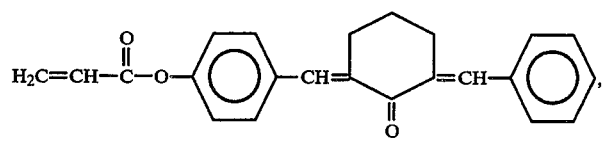

-continued
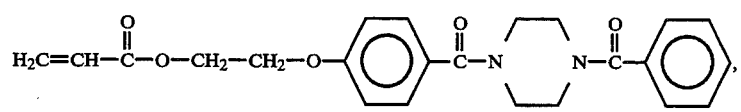
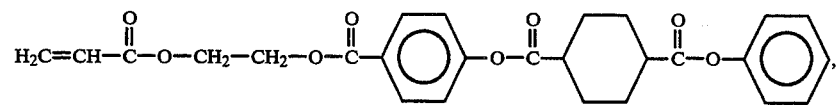
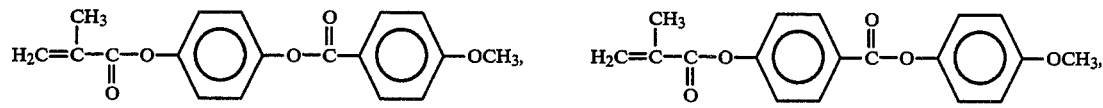
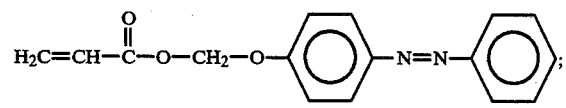
or combination thereof.

UNITED STATES PATENT AND TRADEMARK OFFICE
CERTIFICATE OF CORRECTION

PATENT NO. : 5,342,904

DATED : August 30, 1994

INVENTOR(S) : Robert E. Hefner, Jr. et al.

It is certified that error appears in the above-indentified patent and that said Letters Patent is hereby corrected as shown below:

In column 85, claim 1, line 20, "ad" should read --and--.

In column 85, claim 1, line 24, "formign" should read --forming--.

In column 85, claim 1, line 32, "unsatruated" should read --unsaturated--.

In column 86, claim 2, line 15, "unsatruated" should read --unsaturated--.

In column 86, claim 2, line 16, "copolymerizzing" should read --copolymerizing--.

In column 86, claim 2, line 41, after "4,4'-dihydroxydiphenyl,", insert --4,4'-dihydroxybenzanilide,--.

In column 91, claim 4, line 39, "4aminodiphenlysulfide," should read --4-aminodiphenlysulfide,--.

In column 91, claim 4, line 61, "styrone.," should read --styrene--, "alpha-mothylstyrene," should read --alpha-methylstyrene,--.

In column 91, claim 4, line 62, "styrenos," should read --styrenes,--, line 63, "divinylbenzenos," should read --divinylbenzenes,--, lines 64 and 65, mothacrylic acid," should read --methacrylic acid,--.

In column 92, claim 7, line 63, "dihydroxydiphenlyazomethine," should read --4,4'dihydroxydiphenlyazomethine,--.

In column 92, claim 7, line 66, "4,4'-dihydroxyalphamethylstilbene," should read --4,4'-dihydroxy-alpha-methylstilbene,--.

UNITED STATES PATENT AND TRADEMARK OFFICE
CERTIFICATE OF CORRECTION

PATENT NO. : 5,342,904

DATED : August 30, 1994

INVENTOR(S) : Robert E. Hefner, Jr. et al.

Page 2 of 4

It is certified that error appears in the above-indentified patent and that said Letters Patent is hereby corrected as shown below:

In column 92, claim 7, line 68, "4,4'dihydroxydiphenyl," should read --4,4'dihydroxy-diphenyl,--.

In column 93, claim 7, line 2, "4,4'-dihydroxyehalcone," should read --4,4'-dihydroxychalcone,--.

In column 94, claim 7, line 3, "represente d" should read --represented--.

In column 97, claim 7, line 41, "4,4-diaminostilbene," should read --4,4'-diaminostilbene,--.

In column 97, claim 7, line 51, "4-amino-4-chlorostilbene," should read --4-amino-4'-chlorostilbene,--.

In column 97, claim 7, line 56, "4aminochalcone," should read --4-aminochalcone,--.

In column 97, claim 7, line 66, "3,3'5   5'-tetrachloro" should read --3,3'5,5'-tetrachloro--.

In column 98, claim 7, line 54, "4,4'-dicarboxybenz anilide," should read --4,4'-dicarboxybenzanilide,--.

In column 98, claim 7, line 56, "3,3',5,5" should read --3,3',5,5'--.

In column 98, claim 7, line 56, "bis(4-carboxyphenyl)" should read --N,N'-bis(4-carboxyphenyl)--.

In column 98, claim 7, line 57, "4,4'-bis(4-(4carboxyphenoxy)" should read --4,4'-bis(4-(4-carboxyphenoxy)--.

In column 99, claim 8, line 2, "mesogneic" should read --mesogenic--.

UNITED STATES PATENT AND TRADEMARK OFFICE
CERTIFICATE OF CORRECTION

PATENT NO. : 5,342,904

DATED : August 30, 1994

INVENTOR(S) : Robert E. Hefner, Jr. et al.

It is certified that error appears in the above-indentified patent and that said Letters Patent is hereby corrected as shown below:

In column 100, claim 10, line 16, "4-aminodiphenylacety" should read --4-aminodiphenylacetylene,--.

In column 100, claim 10, line 21, "2,2',6,6' " should read --2,2'6,6'--.

In column 100, claim 10, line 40, "dipheny 1," should read --diphenyl,--.

In column 101, claim 11, line 5, "reactign" should read --reacting--.

In column 102, claim 13, line 12, "4'bis((4-hydroxy)-" should read -- —4,4'-bis((4-hydroxy)- —.

In column 102, claim 13, line 14, "tetramethyl" should read --tetramethyl- --.

In column 102, claim 13, line 15, "tetrachloro" should read --tetrachloro- --.

In column 102, claim 13, line 16, "tetramethyl" should read --tetramethyl- --.

In column 102, claim 13, line 19, "4hydroxybenzoate" should read --4-hydroxybenzoate--.

UNITED STATES PATENT AND TRADEMARK OFFICE
CERTIFICATE OF CORRECTION

PATENT NO. : 5,342,904
DATED : August 30, 1994
INVENTOR(S) : Robert E. Hefner, Jr. et al.

It is certified that error appears in the above-indentified patent and that said Letters Patent is hereby corrected as shown below:

In column 114, claim 16, line 24, "where" should read --wherein--.

In column 114, claim 16, line 25, "diglyeidyl" should read --diglycidyl--.

In column 120, claim 16, line 29, "tetramethal" should read --tetramethyl--.

In column 134, claim 22, line 63, "3,3," should read --3,3',--.

In column 135, claim 22, line 8, "tricy clopendtadiene" should read --tricyclopendtadiene--.

Signed and Sealed this

Fifteenth Day of August, 1995

Attest:

BRUCE LEHMAN

Attesting Officer     Commissioner of Patents and Trademarks